United States Patent
Yanagida et al.

(10) Patent No.: US 11,942,657 B2
(45) Date of Patent: Mar. 26, 2024

(54) INTER-TERMINAL CONNECTION STRUCTURE

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Taiji Yanagida, Mie (JP); Hiroki Shimoda, Mie (JP); Nobuyuki Matsumura, Mie (JP); Yoshinori Ikai, Mie (JP); Yasuhiro Kudou, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 258 days.

(21) Appl. No.: 17/602,582

(22) PCT Filed: May 20, 2020

(86) PCT No.: PCT/JP2020/019929
§ 371 (c)(1),
(2) Date: Oct. 8, 2021

(87) PCT Pub. No.: WO2020/241412
PCT Pub. Date: Dec. 3, 2020

(65) Prior Publication Data
US 2022/0181747 A1    Jun. 9, 2022

(30) Foreign Application Priority Data

| | | |
|---|---|---|
| May 24, 2019 | (JP) | 2019-097856 |
| Aug. 21, 2019 | (JP) | 2019-151327 |
| Nov. 26, 2019 | (JP) | 2019-213749 |

(51) Int. Cl.
| | |
|---|---|
| *H01M 50/503* | (2021.01) |
| *H01R 4/30* | (2006.01) |
| *H01R 11/09* | (2006.01) |

(52) U.S. Cl.
CPC .......... *H01M 50/503* (2021.01); *H01R 11/09* (2013.01); *H01R 4/308* (2013.01)

(58) Field of Classification Search
CPC ............. H01M 50/503; H01M 50/258; H01M 50/505; H01M 50/296; H01M 50/209;
(Continued)

(56) References Cited

U.S. PATENT DOCUMENTS 8,974,950 B2 * 3/2015 Komazawa ....... H01M 10/0481
429/158
9,508,464 B2  11/2016 Nakayama
(Continued)

FOREIGN PATENT DOCUMENTS

| | | |
|---|---|---|
| CN | 109103613 | 12/2018 |
| DE | 10 2015 216 541 | 3/2017 |

(Continued)

OTHER PUBLICATIONS

International Search Report issued in International Pat. Appl. No. PCT/JP2020/019929, dated Aug. 18, 2020, along with an English translation thereof.
(Continued)

*Primary Examiner* — Briggitte R. Hammond
(74) *Attorney, Agent, or Firm* — GREENBLUM & BERNSTEIN, P.L.C.

(57) ABSTRACT

An inter-terminal connection structure electrically connecting terminal portions via a conductive component. The conductive component includes a conductive member hav-
(Continued)

ing connection portions that are fastened so as to be connected to the respective terminal portions, and a case having insulation properties while accommodating the conductive member, an insulating cover covering at least one of the terminal portions and the connection portions, an opening window provided to the insulating cover and exposing at least one of the terminal portions and the connection portions, and a relay portion provided to the connection portion or the terminal portion fastened to the at least one of the terminal portions and the connection portions covered by the insulating cover while being inserted through the opening window to be connected to the at least one of the terminal portions and the connection portions.

16 Claims, 34 Drawing Sheets

(58) Field of Classification Search
CPC ............ H01M 50/227; H01M 50/249; H01M 2220/20; H01R 11/09; H01R 4/308; H01R 4/34; H01R 4/70; H01R 9/24; H01R 4/38; Y02E 60/10; H01G 11/12; H01G 11/74

See application file for complete search history.

(56) References Cited

U.S. PATENT DOCUMENTS

| | | | |
|---|---|---|---|
| 10,381,752 B2 | 8/2019 | Kaehny et al. | |
| 10,516,149 B2* | 12/2019 | Okazaki | H01M 10/425 |
| 10,608,230 B2* | 3/2020 | Nakayama | H01M 50/516 |
| 2010/0047686 A1 | 2/2010 | Tsuchiya et al. | |
| 2017/0250394 A1 | 8/2017 | Wakimoto et al. | |
| 2019/0051882 A1 | 2/2019 | Nakayama et al. | |

FOREIGN PATENT DOCUMENTS

| | | |
|---|---|---|
| JP | 2013-037988 A | 2/2013 |
| JP | 2015-115311 A | 6/2015 |
| JP | 2016-081916 A | 5/2016 |
| JP | 2016-192322 A | 11/2016 |
| JP | 2016-197534 A | 11/2016 |

OTHER PUBLICATIONS

Office Action issued in Japanese Counterpart Patent Appl. No. 2020-554313, dated Oct. 30, 2020, along with an English translation thereof.

Written Opinion of the International Searching Authority issued in International Pat. Appl. No. PCT/JP2020/019929, dated Aug. 18, 2020, along with an English translation thereof.

International Preliminary Report on Patentability issued in International Pat. Appl. No. PCT/JP2020/019929, dated Nov. 16, 2021, along with an English translation thereof.

Chinese Office Action issued in Chinese Patent Application No. 202080036337.1, dated Oct. 12, 2023.

* cited by examiner

FIG.28
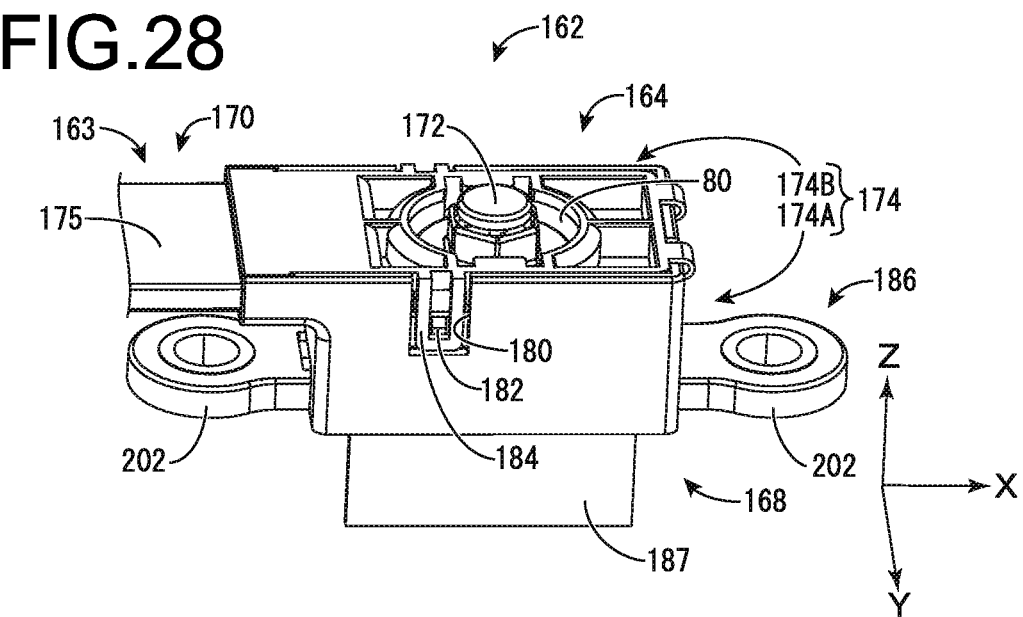
FIG.29
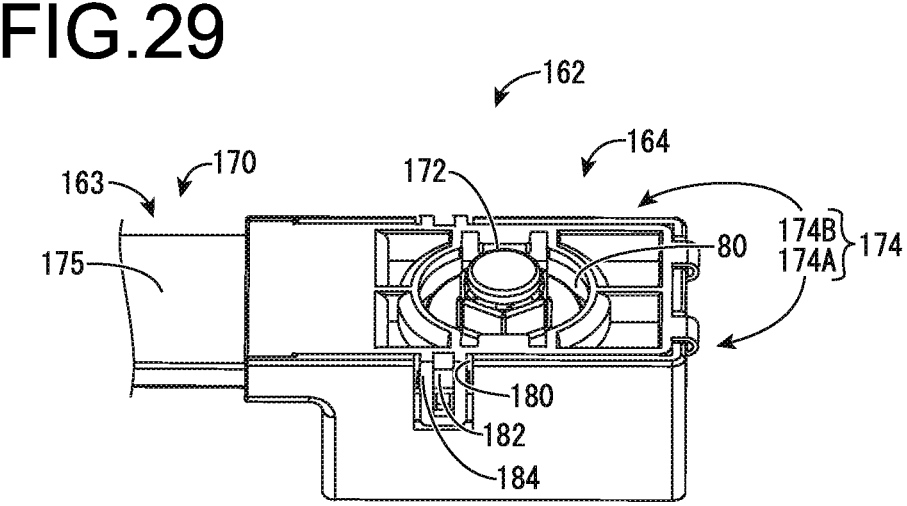
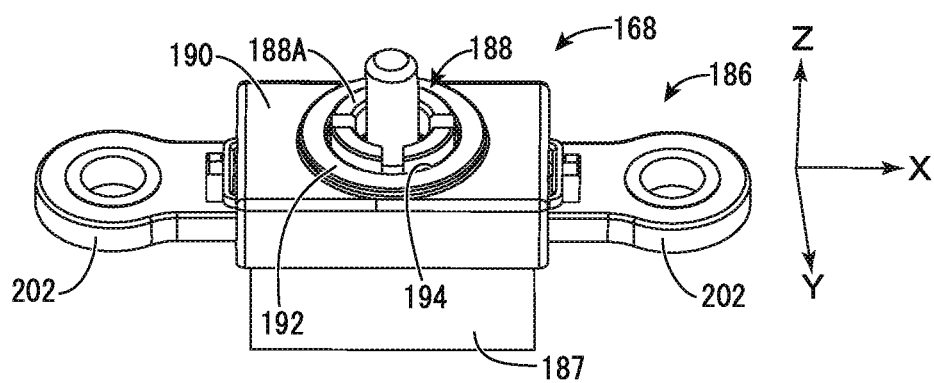

INTER-TERMINAL CONNECTION STRUCTURE

TECHNICAL FIELD

The present disclosure relates to an inter-terminal connection structure in which terminal portions of a plurality of devices are connected to each other in an electrically conductive state via a conductive member such as a wire harness or a bus bar arranged between the terminal portions.

BACKGROUND ART

There is known an inter-terminal connection structure as a connection structure that electrically connects devices mounted on an automobile. The inter-terminal connection structure includes terminal portions of two devices and two connection portions provided on a conductive member such as a wire harness or the bus bar that extends to link the terminal portions, and the two connection portions are bolted to the respective terminal portions so as to be electrically connected. For example, Patent Document 1 discloses a structure in which, in a battery module mounted on an electric automobile, a hybrid automobile, or the like, a pair of connection portions provided on a dedicated bus bar are bolted to respective terminal portions having opposite polarities included in adjacent cell groups so that the terminal portions are electrically connected.

Meanwhile, since the terminal portion of the cell group is a live portion, if the bus bar extending to link the terminal portions is left exposed, a tool for fastening bolts or the like may be brought into contact with the bus bar, which may result in a short-circuit of the battery module. Therefore, Patent Document 1 proposes a structure for covering the bus bar with a main body portion that covers the bus bar while exposing the connection portion of the bus bar, and a case having a lid portion that covers an upper surface of the connection portion so as to be freely opened and closed. This configuration makes it possible to cover the bus bar with the case to improve insulation properties. Besides, when the bus bar is bolted to link the terminal portions, the upper surface of the connection portion can be exposed so as to perform the bolt fastening work.

BACKGROUND ART DOCUMENT

Patent Document

Patent Document 1: Japanese Unexamined Patent Publication No. JP-A-2013-037988

SUMMARY OF THE INVENTION

Problem the Invention Attempts to Solve

In the configuration of Patent Document 1, the terminal portion of each cell group, which serves as the live portion, is exposed before the bus bar is bolted. At this time, it may be desired to take measures that can inhibit the operator or the like from touching the terminal portion. Besides, even in the case where it is not necessary to take measures to inhibit the touch to the terminal portion of the cell group, when one connection portion of the bus bar is fastened to the terminal portion, the other end portion of the bus bar serves as the live portion. At that time, it may also be desired to take measures that can inhibit the operator or the like from touching the connection portion.

Therefore, it is an object to provide an inter-terminal connection structure with a novel structure which is able to inhibit the operator or the like from touching at least one of the terminal portion and the connection portion that can be a live portion.

Means for Solving the Problem

The present disclosure provides an inter-terminal connection structure comprising: a plurality of terminal portions; a conductive component via which the plurality of terminal portions are electrically connected, the conductive component including a conductive member including a plurality of connection portions being fastened to the respective terminal portions in a connected state, and a case having insulation properties while accommodating the conductive member; an insulating cover covering at least one of the terminal portions and the connection portions; an opening window provided to the insulating cover and exposing the at least one of the terminal portions and the connection portions; and a relay portion provided to the connection portion or the terminal portion fastened to the at least one of the terminal portions and the connection portions covered by the insulating cover while being inserted through the opening window to be connected to the at least one of the terminal portions and the connection portions.

Effect of the Invention

According to the present disclosure, it is possible to provide the inter-terminal connection structure that can inhibit the operator or the like from touching at least one of the terminal portion and the connection portion.

BRIEF DESCRIPTION OF THE DRAWINGS

FIG. 28 is an overall perspective view showing an inter-terminal connection structure according to Variation 13.

FIG. 29 is an exploded perspective view in which the inter-terminal connection structure shown in FIG. 28 is disassembled into a terminal portion and a connection portion.

EMBODIMENTS FOR CARRYING OUT THE INVENTION

Figure 1:
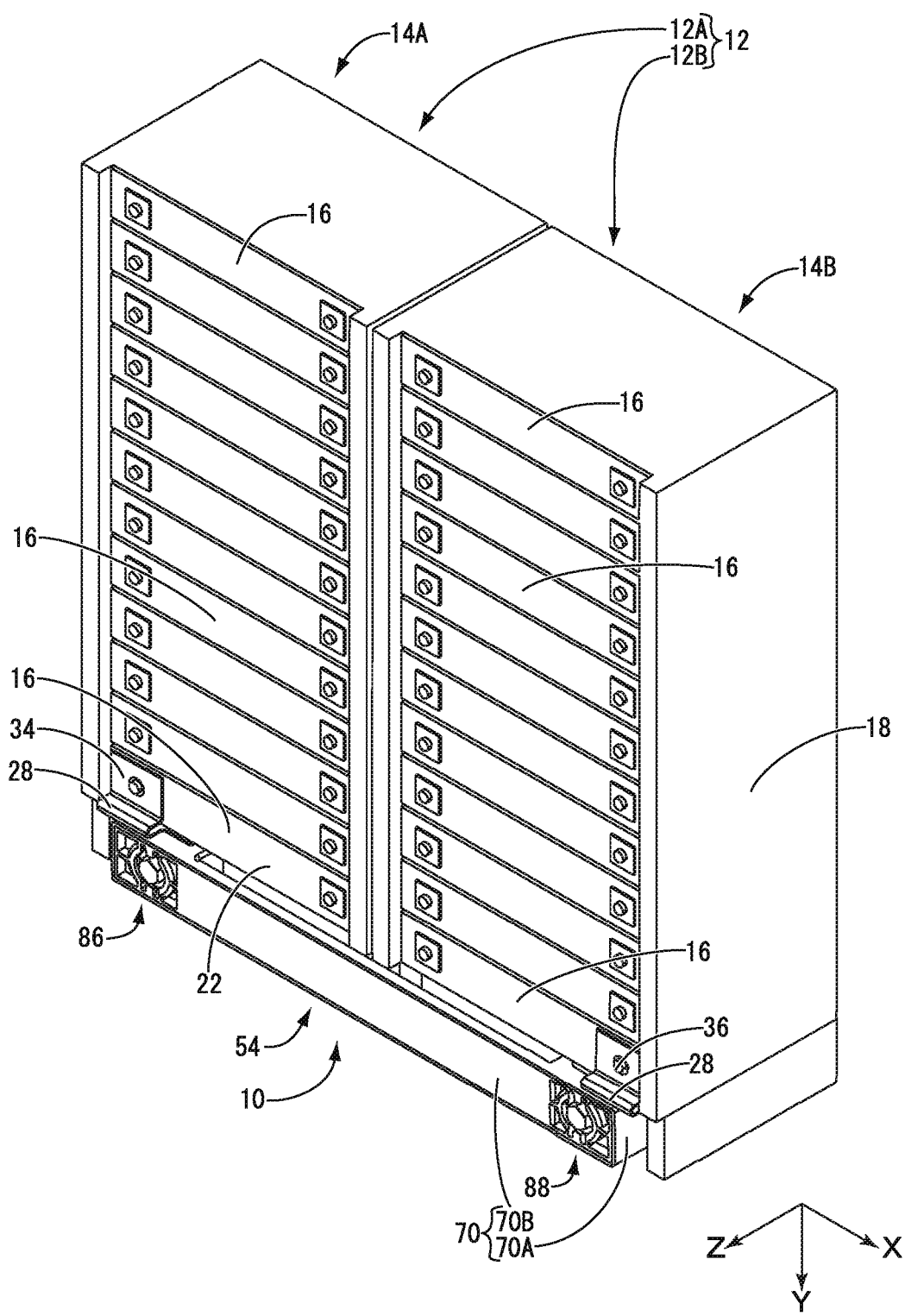
FIG. 1 is a perspective view showing a state in which terminal portions of two cell groups are connected to each other via a bus bar fastened to them by using an inter-terminal connection structure according to Embodiment 1.

Explanation of Embodiments of the Present Disclosure

First, preferred embodiments of the present disclosure will be listed and described.

(1) The present disclosure provides an inter-terminal connection structure comprising: a plurality of terminal portions; a conductive component via which the plurality of terminal portions are electrically connected, the conductive component including a conductive member including a plurality of connection portions being fastened to the respective terminal portions in a connected state, and a case having insulation properties while accommodating the conductive member; an insulating cover covering at least one of the terminal portions and the connection portions; an opening window provided to the insulating cover and exposing the at least one of the terminal portions and the connection portions; and a relay portion provided to the connection portion or the terminal portion fastened to the at least one of the terminal portions and the connection portions covered by the insulating cover while being inserted through the opening window to be connected to the at least one of the terminal portions and the connection portions.

According to the inter-terminal connection structure of the present disclosure, at least one of the plurality of terminal portions and the connection portions is covered by the insulating cover, and at least one of the terminal portions and the connection portions are exposed through the opening window provided to the insulating cover. Therefore, when the terminal portion or the connection portion can be a live portion or the like, by covering at least one of the terminal portions and the connection portions, which require measures against electric shock, with the insulating cover, it is possible to inhibit the operator or the like from touching the terminal portion or the connection portion. Besides, the relay portion connected to the terminal portion or the connection portion by being inserted through the opening window provided to the insulating cover is provided to the connection portion or the terminal portion that is fastened to the terminal portion or the connection portion covered by the insulating cover. Therefore, even if the terminal portion or the connection portion is covered by the insulating cover, an electrical connection between the terminal portion and the connection portion can be realized.

With regard to the inter-terminal connection structure of the present disclosure, it is acceptable as long as the insulating cover is provided to the terminal portion or the connection portion for which measures against electric shock are desired, and the relay portion is provided to the connection portion or the terminal portion fastened to the terminal portion or the connection portion, thereby improving the degree of freedom of design. For example, when the connection portion or the terminal portion that can be a live portion includes only one connection portion, it is acceptable as long as the insulating cover and the relay portion are respectively provided to one connection portion and the terminal portion fastened to the one connection portion, making it possible to take measures to prevent electric shock while reducing the cost. In addition, for example, when the terminal portion that can be a live portion includes two terminal portions, by providing the insulating cover to the two terminal portions while providing the relay portion to two connection portions, excellent measures to prevent electric shock can be taken. Besides, it is preferable to provide the opening window with such a size as to permit insertion of the relay portion as well as to prevent insertion of the operator's finger.

The conductive component includes those in which the conductive member includes a bus bar and those in which the conductive member includes a wire harness provided with the connection portions at opposite ends. When the conductive component comprises a wire harness, included is a configuration in which the connection portion, which is provided on one end side of the wire harness and is connected to the terminal portion for which measures to prevent electric shock are taken by the insulating cover, is covered by the case having insulation properties, and the relay portion provided to the connection portion projects to the outside from the case.

(2) It is preferable that the insulating cover includes a terminal portion cover covering at least one of the terminal portions, the opening window includes a terminal portion opening window provided to the terminal portion cover to partially expose the terminal portion, and the relay portion is provided to the connection portion fastened to the terminal portion covered by the terminal portion cover, and the relay portion includes at least one connection-portion-side relay portion projecting to an outside of the case and inserted through the terminal portion opening window to be connected to the terminal portion.

At least one of the plurality of terminal portions is covered by the terminal portion cover having insulation properties, and the terminal portion is configured to be exposed through the terminal portion opening window provided to the terminal portion cover having insulation properties. Therefore, when the terminal portion can be a live portion or the like, by covering at least one of the plurality of terminal portions, which require measures against electric shock, with the terminal portion cover, it is possible to inhibit the operator or the like from touching the terminal portion. Besides, the connection-portion-side relay portion connected to the terminal portion by being inserted through the terminal portion opening window provided to the terminal portion cover is provided to the connection portion that is fastened to the terminal portion covered by the terminal portion cover. Therefore, even if the terminal portion is covered by the terminal portion cover, an electrical connection between the terminal portion and the connection portion can be realized.

(3) It is preferable that with the above-mentioned structure (2), with regard to the connection portion provided with the connection-portion-side relay portion, the connection portion is accommodated in the case and surrounded by the case.

With regard to the connection portion of the conductive member provided with the connection-portion-side relay portion, as long as the connection-portion-side relay portion projects to the outside of the case, the connection between the terminal portion and the connection portion can be realized. Therefore, by the connection portion being surrounded by the case so as not to be exposed to the outside of the case, it is possible to advantageously inhibit the operator or the like from touching the connection portion, in comparison with the conventional structure in which the entire lower surface of the connection portion is exposed from the case.

(4) It is preferable that with the above-mentioned structure (2) or (3), the conductive member comprises a bus bar, the plurality of connection portions comprise two connection portions that are provided to opposite end portions in a longitudinal direction of the bus bar, and the bus bar includes a crank-shaped bent portion bent in a plate thickness direction of the bus bar.

With this configuration, due to the crank-shaped bent portion provided between the two connection portions, the tolerance in the plate thickness direction of the bus bar generated between the two terminal portions to which the respective connection portions are connected can be advantageously absorbed. It is acceptable as long as at least one crank-shaped bending portion is provided. However, when it is necessary to provide two connection portions at the same position in the plate thickness direction of the bus bar, by providing a pair of the crank-shaped bending portions having opposite directions of bending, the two connection portions can be set at the same position. Further, it is also possible to provide a plurality of crank-shaped bent portions or a plurality of sets of a pair of crank-shaped bent portions having opposite directions of bending.

(5) It is preferable that with any one of the above-mentioned structures (2)-(4), the terminal portion and the connection portion are configured to be fastened by using a bolt, a bolt insertion hole provided to the connection portion and the connection-portion-side relay portion includes a first space permitting displacement of the bolt in a predetermined direction, and the case of the conductive component includes a second space permitting displacement of the bolt and the connection-portion-side relay portion in the predetermined direction.

With this configuration, when bolting the terminal portion and the connection portion, in a predetermined direction in which the tolerances of the remote distances between one terminal portion and the other terminal portion are accumulated, the tolerances can be absorbed by the first space and the second space. The part where the first space and the second space are provided may be set in a predetermined direction that requires tolerance absorption, and can be desirably set according to the part to which the inter-terminal connection structure is applied.

(6) It is preferable that with the above-mentioned structure (5), the bolt is accommodated in the case of the conductive component, an upper surface opening portion is provided to an upper surface of the case, the upper surface opening portion exposing a head portion of the bolt having an insulating covering thereon, and a lower surface opening portion is provided to a lower surface of the case, the lower surface opening portion exposing a screw portion of the bolt and the connection-portion-side relay portion.

Since the bolt for bolting is accommodated in the case of the conductive component, the components in the tightening process of the terminal portion and the connection portion can be unitized, thereby improving the workability. Furthermore, since the head of the bolt exposed from the upper surface opening portion provided to the case has an insulating covering thereon, the measures to prevent electric shock on the upper surface side of the case are also compatibly achieved. Besides, since the screw portion of the bolt and the connection-portion-side relay portion are only exposed from the lower surface opening portion provided to the case, the contact between the operator and the connection portion on the lower surface side of the case is advantageously inhibited (7) It is preferable that with the above-mentioned structure (5), the bolt is accommodated in the case of the conductive component, and an upper surface opening portion is provided to an upper surface of the case, the upper surface opening portion exposing a head portion of the bolt, a tool fitting hole opens onto an upper surface of the head portion of the bolt, the tool fitting hole being configured to be fitted with a tip part of a fastening tool, and in plan view, the tool fitting hole is exposed to an outside via the upper surface opening portion, and an outer peripheral portion of the head portion is covered by the upper surface of the case.

This is because, by adopting a type of bolt with a tool fitting hole opening onto the upper surface of the head portion of the bolt, the opening area of the upper surface opening portion of the case is reduced to such a size as to allow the tip part of the fastening tool to be inserted, and the outer peripheral portion of the head portion can be covered by the upper surface of the case. By so doing, it is possible to advantageously inhibit or prevent touch to the bolt, which serves as a live portion, even if the head portion of the bolt does not have an insulating covering thereon. The cross-sectional shape of the tool fitting hole may be any shape, namely, a circular cross section, and non-circular cross sections including a polygonal shape such as a hexagon, a star shape, + and −, and the like.

(8) It is preferable that with the above-mentioned structure (7), in the upper surface of the case, a part covering the outer peripheral portion of the head portion of the bolt is remote upward from the head portion.

The part of the upper surface of the case that covers the outer peripheral portion of the head portion of the bolt is remote upward from the head portion to increase the remote distance between the upper surface opening portion of the case and the head portion of the bolt, thereby further reducing possibility of touch to the bolt via the upper surface opening portion. As a result, it is possible to surely obtain a certain size of the upper surface opening portion in consideration of workability.

(9) It is preferable that with any one of the above-mentioned structures (2)-(8), the terminal portion and the connection portion are configured to be fastened by using a bolt, and the case of the conductive component includes a guide wall provided around the connection-portion-side relay portion and a screw portion of the bolt, and the guide wall is a wall higher than the connection-portion-side relay portion.

Since the guide wall is a wall higher than the connection-portion-side relay portion, touch of the operator to the connection-portion-side relay portion and the connection portion is more advantageously inhibited. Furthermore, when the screw portion of the bolt accommodated in the case of the conductive component is screwed to the terminal portion, the guide wall advantageously inhibits the touch of the operator to the bolt as well, thereby improving safety during bolt fastening work. More preferably, the guide wall projects with a projecting dimension equal to or greater than the tip part of the screw portion of the bolt.

(10) It is preferable that with the above-mentioned structure (9), the guide wall is provided near the connection portion, and displacement of the conductive component is limited by the guide wall being in contact with a member provided on a side of the terminal portion.

This configuration makes it possible to provide the guide wall with a displacement limiting function as well, thereby achieving improvement in both safety and workability during bolt fastening work with a small number of parts.

(11) It is preferable that with any one of the above-mentioned structures (2)-(10), the connection-portion-side relay portion and the conductive member are integrally formed.

This is because, by integrating the connection-portion-side relay portion and the conductive member, the connection-portion-side relay portion, which is relatively small, can be easily handled, thereby improving the assembly workability or the like. The method of integrally forming the connection-portion-side relay portion with the conductive member is not limited, but any method can be adopted. For example, when the conductive member is formed by a metal flat plate, the connection-portion-side relay portion can be projected by subjecting the connection portion to a burring process. Besides, the conductive member and the connection-portion-side relay portion formed as separate components may be integrated by welding or the like. It would also be acceptable to integrally provide the conductive member and the connection-portion-side relay portion as a die-cast product made of aluminum or the like.

(12) It is preferable that with any one of the above-mentioned structures (2)-(10), the connection-portion-side relay portion and the conductive member are separately formed, and the connection-portion-side relay portion is held by the case.

By separating the conductive member and the connection-portion-side relay portion, the degree of freedom in selecting materials thereof can be improved. Moreover, since the connection-portion-side relay portion is held by the case, the connection-portion-side relay portion, which is relatively small, can be easily handled. It is possible to adopt any structure as the structure in which the connection-portion-side relay portion is held by the case, such as a support structure using a concave-convex fitting or a flange. It would also be acceptable that the connection-portion-side relay portion is held by being insert-molded into the case.

(13) It is preferable that with the above-mentioned structure (12), the connection-portion-side relay portion includes a tube portion projecting to the outside of the case and a flange portion projecting to an outer peripheral side from one end portion of the tube portion, and the connection-portion-side relay portion is held by the case by the tube portion of the connection-portion-side relay portion being inserted through an opening hole penetrating the case and by the flange portion being engaged with a peripheral edge of the opening hole from an inside of the case.

This is because, this configuration enables the tube portion of the connection-portion-side relay portion to project out of the case and enables the flange portion side to be accommodated and held in the case, whereby the connection-portion-side relay portion can project out of the case and can be held by the case with a simple structure.

(14) It is preferable that with the above-mentioned structure (12), the connection-portion-side relay portion is held by the case by being press-fitted into an opening hole penetrating the case.

This is because, by simply press-fitting the connection-portion-side relay portion into the opening hole provided to the case, the connection-portion-side relay portion can project out of the case and can be held by the case, thereby simplifying the structures of the case and the connection-portion-side relay portion.

(15) It is preferable that with any one of the above-mentioned structures (2)-(14), the at least one connection-portion-side relay portion comprises a plurality of connection-portion-side relay portions that project from the connection portion and are remote from each other.

This is because the connection-portion-side relay portions can be arranged separately at a plurality of locations, so that the degree of freedom in arranging the connection-portion-side relay portion, selecting the material thereof, and the like can be improved. The plurality of connection-portion-side relay portions may be provided integrally with or separately from the conductive member.

(16) It is preferable that with any one of the above-mentioned structures (2)-(15), the terminal portion and the connection portion are configured to be fastened by using a bolt, and the terminal portion cover includes an inner peripheral portion covering an inner peripheral surface of a bolt insertion hole provided to the terminal portion.

This is because, since the inner peripheral surface of the bolt insertion hole of the terminal portion is covered by the inner peripheral portion of the terminal portion cover, it is possible to advantageously inhibit the touch of the operator or the like to the inner peripheral surface of the bolt insertion hole of the terminal portion. The inner peripheral portion of the terminal portion cover may be integrated with other parts of the terminal portion cover, or may be provided separately and held by the bolt insertion hole of the terminal portion to constitute the terminal portion cover.

(17) It is preferable that with the above-mentioned structure (16), the inner peripheral portion of the terminal portion cover is integrated with another part of the terminal portion cover.

This is because, the inner peripheral portion of the terminal portion cover, which is relatively small, can be easily handled.

(18) It is preferable that with any one of the above-mentioned structures (2)-(17), the terminal portion and the connection portion are configured to be fastened by using a bolt, the terminal portion opening window is formed in an annular shape around a bolt insertion hole of the terminal portion, and the connection-portion-side relay portion has an annular shape and is arranged around the bolt insertion hole of the connection portion.

With this configuration, the terminal portion and the connection portion are stably fastened and fixed by using a bolt. Furthermore, by utilizing the bolt insertion hole required for bolting, the terminal portion opening window and the connection-portion-side relay portion can be provided with compact size, thereby downsizing the inter-terminal connection structure. Besides, the connection-portion-side relay portion can be configured in an annular shape, making it possible to surely obtain the strength of the connection-portion-side relay portion.

(19) It is preferable that with the above-mentioned structure (18), the terminal portion opening window of annular shape is defined between an inner peripheral portion of the terminal portion cover and an outer peripheral portion of the terminal portion cover that is remote radially outward from the inner peripheral portion, and the inner peripheral portion covers an inner peripheral surface of the bolt insertion hole of the terminal portion, while the outer peripheral portion covers a surface of the terminal portion around the bolt insertion hole.

Since the inner peripheral surface of the bolt insertion hole of the terminal portion is covered by the inner peripheral portion of the terminal portion cover that defines the terminal portion opening window of annular shape, touch of the operator or the like to the inner peripheral surface of the bolt insertion hole of the terminal portion can also be advantageously inhibited.

(20) It is preferable that with any one of the above-mentioned structures (2)-(17), the terminal portion and the connection portion are configured to be fastened by using a bolt, and the terminal portion opening window opens with such a size as to expose a bolt insertion hole of the terminal portion and a peripheral portion thereof, and a projecting portion projecting toward the connection-portion-side relay portion is provided to a peripheral edge portion of the terminal portion opening window.

This is because, even when the terminal portion opening window opens with such a size as to include the bolt insertion hole of the terminal portion and its peripheral portion, since the projecting portion is provided on the peripheral edge portion of the terminal portion opening window so as to project toward the connection-portion-side relay portion, the height of the projecting portion can advantageously reduce the possibility of touch of the operator or the like to the inside of the terminal portion opening window, for example, the inner peripheral surface of the bolt insertion hole. Therefore, by adjusting the height of the projecting portion, without using the inner peripheral portion of the terminal portion cover defined in the fifteenth and eighteenth preferred embodiments, it is possible to inhibit or prevent the operator or the like from touching the inner peripheral surface of the bolt insertion hole, thereby reducing the number of parts as well.

(21) It is preferable that with the above-mentioned structure (20), with the terminal portion and the connection portion fastened by using the bolt, the projecting portion is remote from the conductive component.

This configuration avoids the situation in which, when the terminal portion and the connection portion are bolted, the projecting portion comes into contact with any part of the conductive component so that the axial force due to the bolting is dispersed to the terminal portion cover via the projecting portion. This makes it possible to stably realize a strong connection between the terminal portion and the connection portion while reliably obtaining the function of preventing the touch to the terminal portion by means of the projecting portion.

(22) It is preferable that with any one of the above-mentioned structures (2)-(21), a peripheral edge portion of the terminal portion opening window is flexible, and the connection-portion-side relay portion is permitted to be inserted through the terminal portion opening window by the peripheral edge portion being pressed by the connection-portion-side relay portion such that the terminal portion opening window is expanded.

By the connection-portion-side relay portion expanding the peripheral edge portion of the terminal portion opening window, the connection-portion-side relay portion is permitted to be inserted through the terminal portion opening window. Thus, the opening area of the terminal portion opening window that exposes the terminal portion to the outside can be decreased. This makes it possible to further advantageously reduce the possibility of touch of the operator or the like to the terminal portion.

(23) It is preferable that with any one of the above-mentioned structures (2)-(22), a first one of the plurality of terminal portions is covered by the terminal portion cover, and the connection-portion-side relay portion is provided to a first one of the plurality of connection portions fastened to the terminal portion that is covered by the terminal portion cover, the insulating cover includes the terminal portion cover and a connection portion cover having insulation properties that covers a second one of the plurality of connection portions, the opening window includes the terminal portion opening window and a connection portion opening window provided to the connection portion cover to partially expose the second one of the connection portions, and the relay portion includes the connection-portion-side relay portion and a terminal-portion-side relay portion provided to a second one of the plurality of terminal portions fastened to the second one of the connection portions that is covered by the connection portion cover, and the terminal-portion-side relay portion is inserted through the connection portion opening window to be connected to the second one of the connection portions.

Since the first one of the plurality of terminal portions is covered by the terminal portion cover, touch of the operator or the like to the terminal portion can be inhibited by applying such configuration to the terminal portion of a battery module, which serves as a live portion, for example, thereby realizing the required measures against electric shock. Further, after the first one of the plurality of connection portions of the conductive member is fastened to the terminal portion that serves as the live portion, the second one of the connection portions of the conductive member becomes the live portion. Here, in the present preferred embodiment, since the second one of the connection portions is covered by the connection portion cover, it is possible to inhibit the operator or the like from touching the second one of the connection portions that serves as the live portion. This makes it possible to fasten the plurality of terminal portions by means of the conductive member under excellent measures against electric shock.

It is preferable that the connection portion opening window provided on the connection portion cover is provided in such a size as to permit the insertion of the terminal-portion-side relay portion as well as to prevent the insertion of the operator's finger.

(24) It is preferable that with the above-mentioned structure (23), the second one of the terminal portions and the second one of the connection portions are configured to be fastened by using a bolt and a nut, on a side of the second one of the connection portions of the conductive component, the nut is accommodated in the case, the nut and a tip part of the bolt fastened to the nut have an insulating covering thereon and are positioned in an upper surface opening portion provided to an upper surface of the case, the connection portion cover comprises a base wall of the case, and the connection portion opening window penetrates the base wall, and the bolt and the terminal-portion-side relay portion are arranged in the second one of the terminal portions.

The nut for fastening is accommodated in the case on the side of the second one of the connection portions of the conductive component, while the bolt for fastening and the terminal-portion-side relay portion are both arranged in the second one of the terminal portions. This configuration makes it possible to unitize the second one of the terminal portions and the second one of the connection portions including the components for fastening, thereby further improving handleability of the components and workability. Moreover, since the nut located in the upper surface opening portion of the case and the tip part of the bolt fastened to the nut have an insulating covering thereon, measures against electric shock on the upper surface side of the case are also achieved in a compatible manner. In addition, the bolt and the terminal-portion-side relay portion are arranged on the second one of the terminal portions. Therefore, by applying such configuration to a terminal portion that does not serve as a live portion, such as a terminal portion of an electrical junction box connected to the battery module, the problem of electric shock cannot occur.

Any configuration can be adopted as the configuration for applying an insulating covering on the nut located in the upper surface opening portion of the case and the tip part of the bolt fastened to the nut. For example, a bag-shaped nut cover or the like can be adopted.

(25) It is preferable that with any one of the above-mentioned structures (2)-(24), a connection blocking portion that blocks connection between the connection portion and the terminal portion is provided to the case of the conductive component, and the connection blocking portion is displaceable to a permitting position that permits the connection between the connection portion and the terminal portion.

The case of the conductive component is provided with the connection blocking portion that blocks the connection between the connection portion and the terminal portion. This configuration makes it possible to prevent a trouble that, for example, during the connection work between the terminal portions, one connection portion and the terminal portion of the conductive component may be connected due to misoperation and another connection portion of the conductive component may accidentally become a live portion. Moreover, since the connection blocking portion is displaceable to the permitting position that permits the connection between the connection portion and the terminal portion, the connection between the connection portion and the terminal portion can be controlled by one component. In addition, the connection work involves the work of displacing the connection blocking portion to the permitting position, so that the operator can consciously execute the connection between the connection portion and the terminal portion in a reliable manner, thereby surely preventing the trouble of the other connection portion of the conductive component accidentally becoming a live portion.

(26) It is preferable that with the above-mentioned structure (25), the connection blocking portion includes a fitting portion that is configured to fit in a fit target portion on a side of the terminal portion when the connection blocking portion is displaced to the permitting position.

The connection blocking portion has a fitting portion and the fitting portion is fitted in the fit target portion on the side of the terminal portion when the connection blocking portion is displaced to the permitting position. Thus, the connection blocking portion can also serve as a fixing structure of the terminal portion and the connection portion, thereby concomitantly ensuring excellent connection stability between the terminal portion and the connection portion with a small number of parts as well.

(27) It is preferable that with the above-mentioned structure (26), the fitting portion and the fit target portion are configured to be fitted in a proper connection position of the terminal portion and the connection portion.

This is because the operator is able to detect the proper connection between the terminal portion and the connection portion by means of fitting the fitting portion and the fit target portion.

(28) It is preferable that with any one of the above-mentioned structures (25)-(27), a bolt for fastening the connection portion to the terminal portion is accommodated in the case of the conductive component, an upper surface opening portion is provided to an upper surface of the case, the upper surface opening portion exposing a head portion of the bolt having an insulating covering thereon, and a lower surface opening portion is provided to a lower surface of the case, the lower surface opening portion exposing a screw portion of the bolt and the connection-portion-side relay portion, and the connection blocking portion is displaceable to a blocking position that covers the lower surface opening portion to cover the screw portion of the bolt and the connection-portion-side relay portion, and to the permitting position that opens the lower surface opening portion to permit connection of the screw portion of the bolt and the connection-portion-side relay portion to the terminal portion.

This is because the connection blocking portion can cover the lower surface opening portion at the blocking position to reliably prevent the screw portion of the bolt and the connection-portion-side relay portion from being exposed, thereby providing better measures against electric shock.

(29) It is preferable that with any one of the above-mentioned structures (2)-(28), the plurality of connection portions comprise two connection portions that are provided to opposite end portions in a longitudinal direction of the conductive member, the case of the conductive component includes an insulating covering that covers an intermediate portion in the longitudinal direction of the conductive member, and an end portion case that covers at least one of the two connection portions exposed from the insulating covering, the end portion case is attached to the conductive member displaceably in the longitudinal direction, and the connection portion and the terminal portion are configured to be fastened by using a bolt and a nut, and a bolt insertion hole penetrating the connection portion includes a displacement permitting gap that permits displacement of the end portion case with respect to the conductive member in the longitudinal direction.

Since the case having insulation properties accommodating the conductive member includes the insulating covering that covers the intermediate portion in the longitudinal direction of the conductive member and the end portion case that covers at least one of the connection portions, it is possible to provide the case more compactly and at low cost. Moreover, the end portion case is attached to the conductive member displaceably in the longitudinal direction, and the bolt insertion hole penetrating the connection portion also includes the displacement permitting gap that permits displacement of the end portion case with respect to the conductive member in the longitudinal direction. Accordingly, when fastening the connection portion and the terminal portion by using the bolt and the nut, the tolerance of the distance between the two terminal portions can be absorbed by the displacement of the end portion case with respect to the conductive member on the conductive component side.

(30) It is preferable that with the above-mentioned structure (1), the insulating cover includes a connection portion cover covering at least one of the connection portions, the opening window includes a connection portion opening window provided to the connection portion cover to partially expose the connection portion, and the relay portion is provided to the terminal portion fastened to the connection portion covered by the connection portion cover, and the relay portion includes a terminal-portion-side relay portion inserted through the connection portion opening window to be connected to the connection portion.

At least one connection portion is covered by the connection portion cover, and the connection portion is partially exposed through the connection portion opening window provided to the connection portion cover.

Therefore, when the connection portion can be a live portion or the like, by covering at least one connection portion, which requires measures against electric shock, with the connection portion cover, it is possible to inhibit touch between the operator or the like and the connection portion which requires measures against electric shock. Besides, the terminal-portion-side relay portion connected to the connection portion by being inserted through the connection portion opening window provided to the connection portion cover is provided to the terminal portion that is fastened to the connection portion covered by the connection portion cover. Therefore, even if the connection portion is covered by the connection portion cover, an electrical connection between the connection portion and the terminal portion can be realized.

DETAILS OF EMBODIMENTS OF THE PRESENT DISCLOSURE

A specific example of the inter-terminal connection structure of the present disclosure will be described below with reference to the drawings. The present disclosure is not limited to these examples, but is indicated by the scope of the claims, and all changes that come within the meaning and range of equivalency of the claims are intended to be embraced therein.

Embodiment 1

Hereinafter, Embodiment 1 of the present disclosure will be described with reference to FIGS. 1 to 7. FIGS. 1 to 7 show an example in which an inter-terminal connection structure 10 according to Embodiment 1 of the present disclosure is applied to the battery module 12. The battery module 12 is used as a drive source for vehicles such as electric automobiles and hybrid automobiles. As shown in FIG. 1, the battery module 12 includes a first battery module 12A and a second battery module 12B, which are connected to each other via the inter-terminal connection structure 10 of the present disclosure. In FIG. 1, the first battery module 12A is shown on the left side, and the second battery module 12B is shown on the right side. In the following description, the Z direction will be described as upward, the Y direction as forward, and the X direction as rightward. Besides, for a plurality of the same members, a reference numeral may be added to only a part of the members, and the reference numeral may be omitted for other members.

First Battery Module 12A and Second Battery Module 12B

Figure 2:
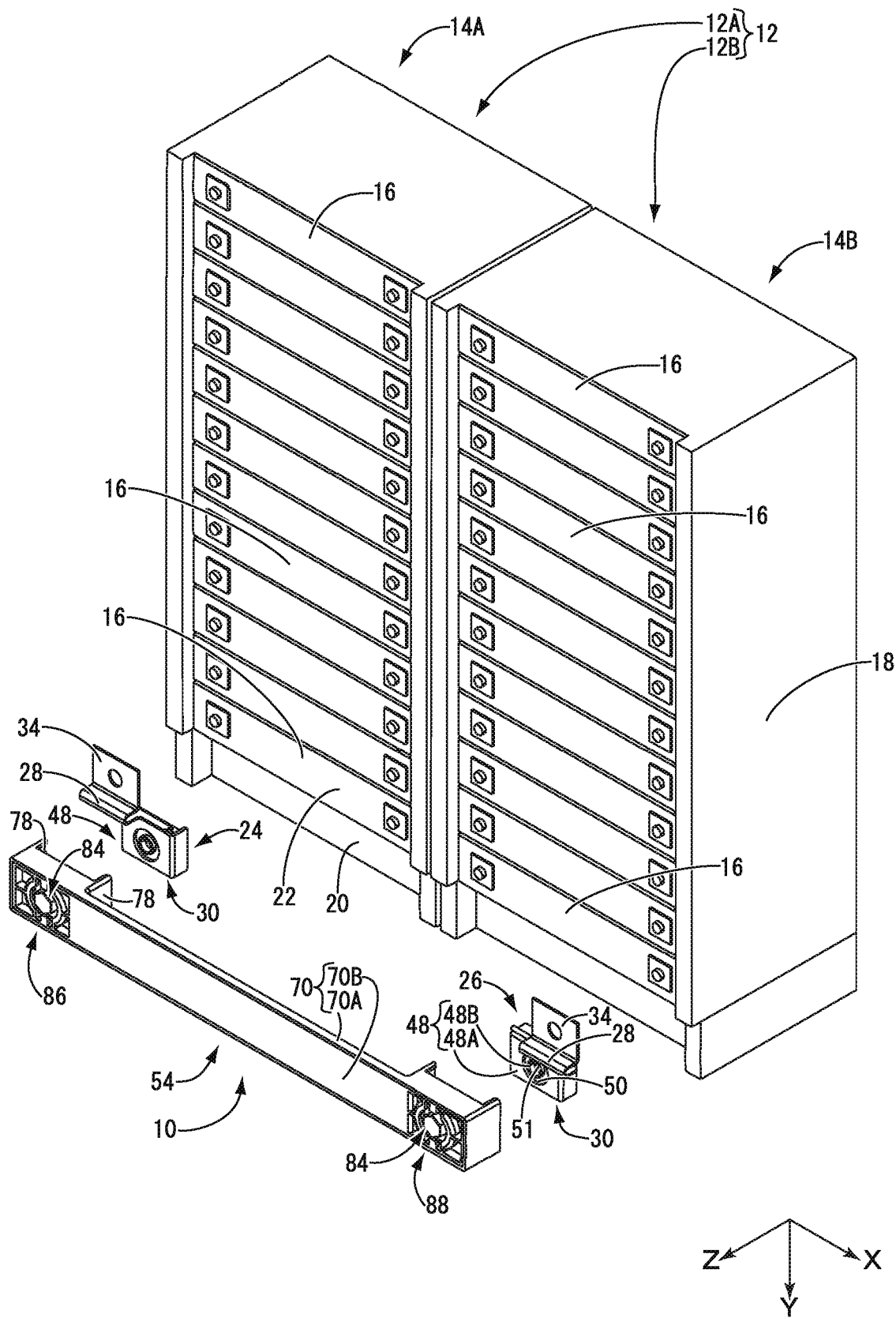
FIG. 2 is an exploded perspective view in which the inter-terminal connection structure of FIG. 1 is disassembled.
Figure 3:
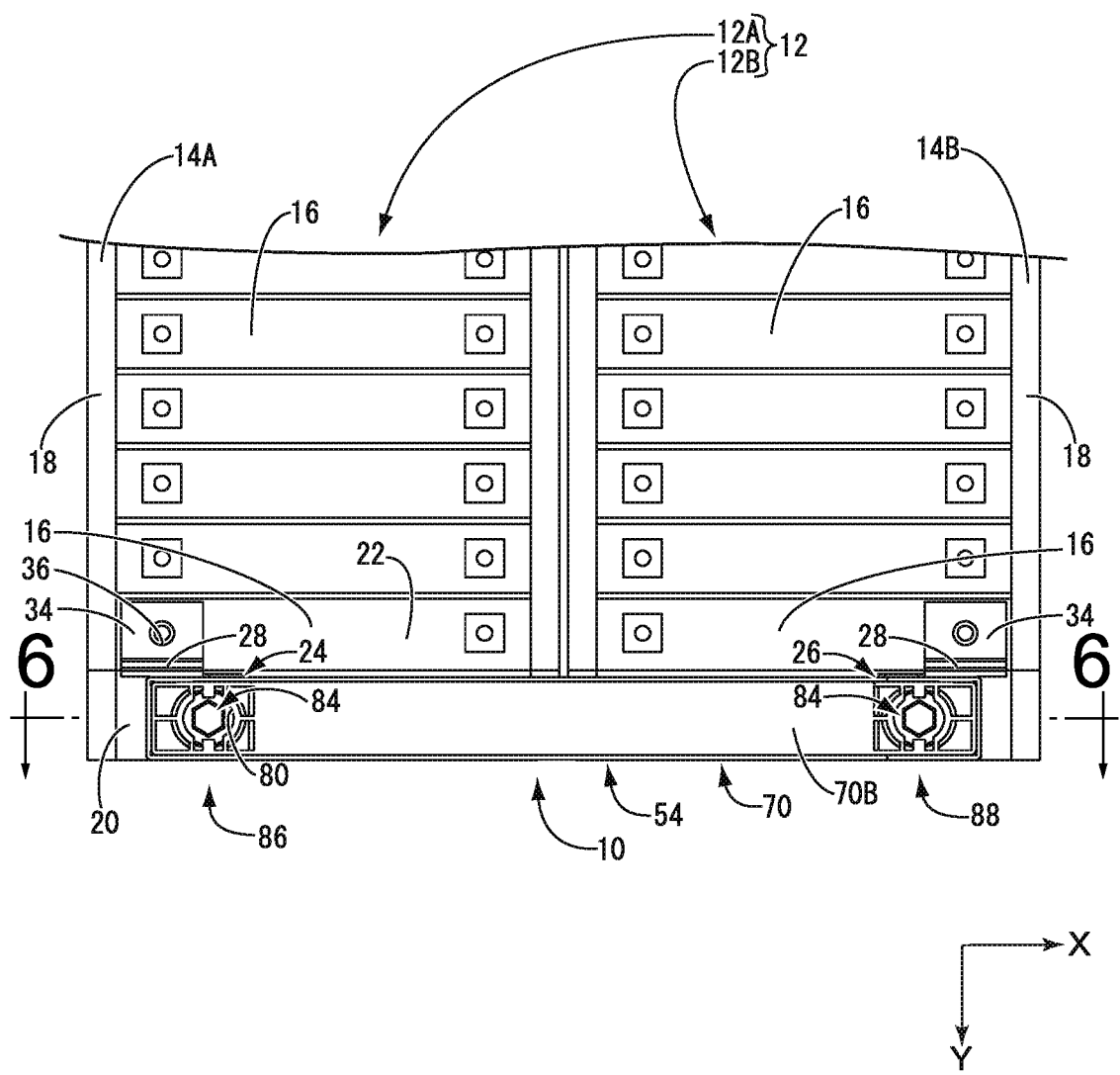
FIG. 3 is a plan view of FIG. 1.

As shown in FIGS. 1 to 3, each of the first battery module 12A and the second battery module 12B accommodate a plurality of rechargeable cells 16 in the respective cabinets 14A and 14B. The battery modules 12A and 12B connect the plurality of cells 16 in series by using a bus bar or the like (not shown), and the output voltage is, for example, 100V to 400V. Besides, in the battery modules 12A, 12B, it is also possible to connect a plurality of cells 16 in parallel to increase the current capacity. As such a cell 16, a lithium ion secondary battery, a lithium polymer secondary battery, a nickel hydrogen battery, or the like can be used. Instead of or in addition to the cell 16, a capacitor such as an electric double layer capacitor (EDLC) can also be used. In the present description, a capacitor is also included.

The cabinets 14A, 14B are constituted by members having insulation properties such as synthetic resin. The cabinets 14A, 14B have a generally rectangular box shape that opens upward, and has a base wall and a peripheral wall 18 that surrounds the base wall. The peripheral wall 18 on the front side of the cabinets 14A, 14B is thick. The upper end portion of the peripheral wall 18 on the front side is cut out over its entirety, so that an upper end portion 20 of the peripheral wall 18 on the front side is located below an upper end portion 22 of the cell 16.

Inter-Terminal Connection Structure 10

In each of the first battery module 12A and the second battery module 12B, the cells 16 are connected in series by a member such as a bus bar (not shown). Furthermore, the first battery module 12A and the second battery module 12B in which the cells 16 are connected in series in this way are connected to each other in series by using the inter-terminal connection structure 10 that electrically connects a terminal portion 32 of a first-terminal-portion-side unit 24 and a terminal portion 32 of a second-terminal-portion-side unit 26 via a conductive component 54.

First-Terminal-Portion-Side Unit 24

Figure 4:
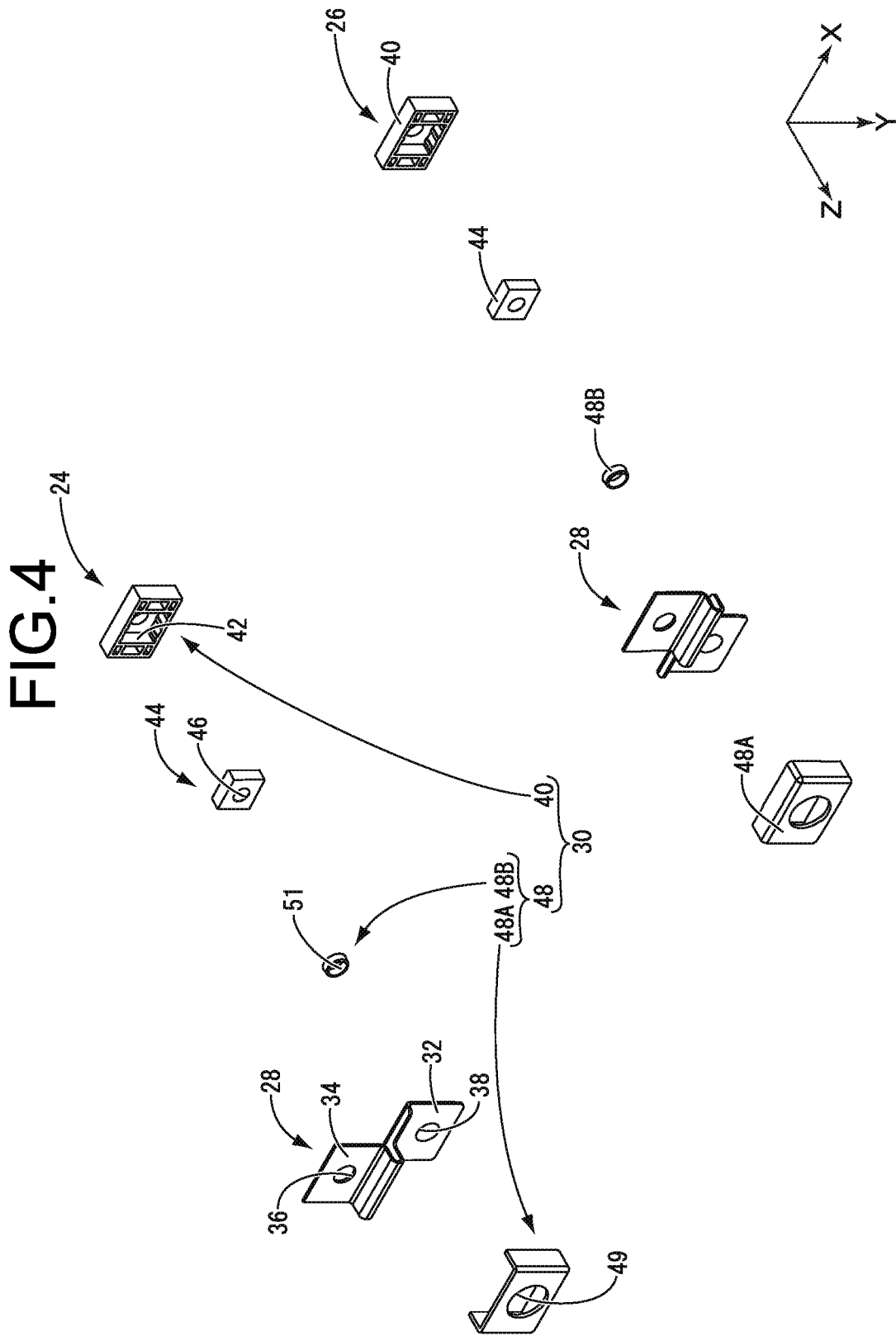
FIG. 4 is an exploded perspective view of the terminal portion shown in FIG. 2.

As shown in FIG. 4, the first-terminal-portion-side unit 24 having one of the two terminal portions includes a connection terminal 28 that can be connected to an external device connecting terminal and a housing 30 holding the connection terminal 28. The connection terminal 28 comprises a plate-shaped metal such as copper, copper alloy, aluminum, and aluminum alloy, and has a shape in which the intermediate portion in the longitudinal direction is bent in an inverted U shape and the opposite end portions are bent in an L shape. The front end portion, which is one end portion in the longitudinal direction, is the terminal portion 32 connected to a connection portion 60 of a first-connection-portion-side unit 86 of the conductive component 54, which will be described later. Meanwhile, the rear end portion, which is the other end portion in the longitudinal direction, is a terminal fastening portion 34 connected to the terminal of the cell 16 of the first battery module 12A. As shown in FIG. 2, the terminal portion 32 is provided on the first battery module 12A side with respect to the terminal fastening portion 34. Further, the terminal portion 32 is provided below the terminal fastening portion 34. The terminal fastening portion 34 includes a through hole 36 for connecting to the terminal of the cell 16 of the first battery module 12A.

The terminal portion 32 is penetrated by a bolt insertion hole 38 through which a screw portion 84A of a bolt 84 of the conductive component 54 described later can be inserted. The bolt insertion hole 38 has a circular shape having a size such that a predetermined gap (a gap in which an inner peripheral portion 48B described later is arranged) is formed between the screw portion 84A of the bolt 84 and the inner wall of the bolt insertion hole 38.

Figure 7:
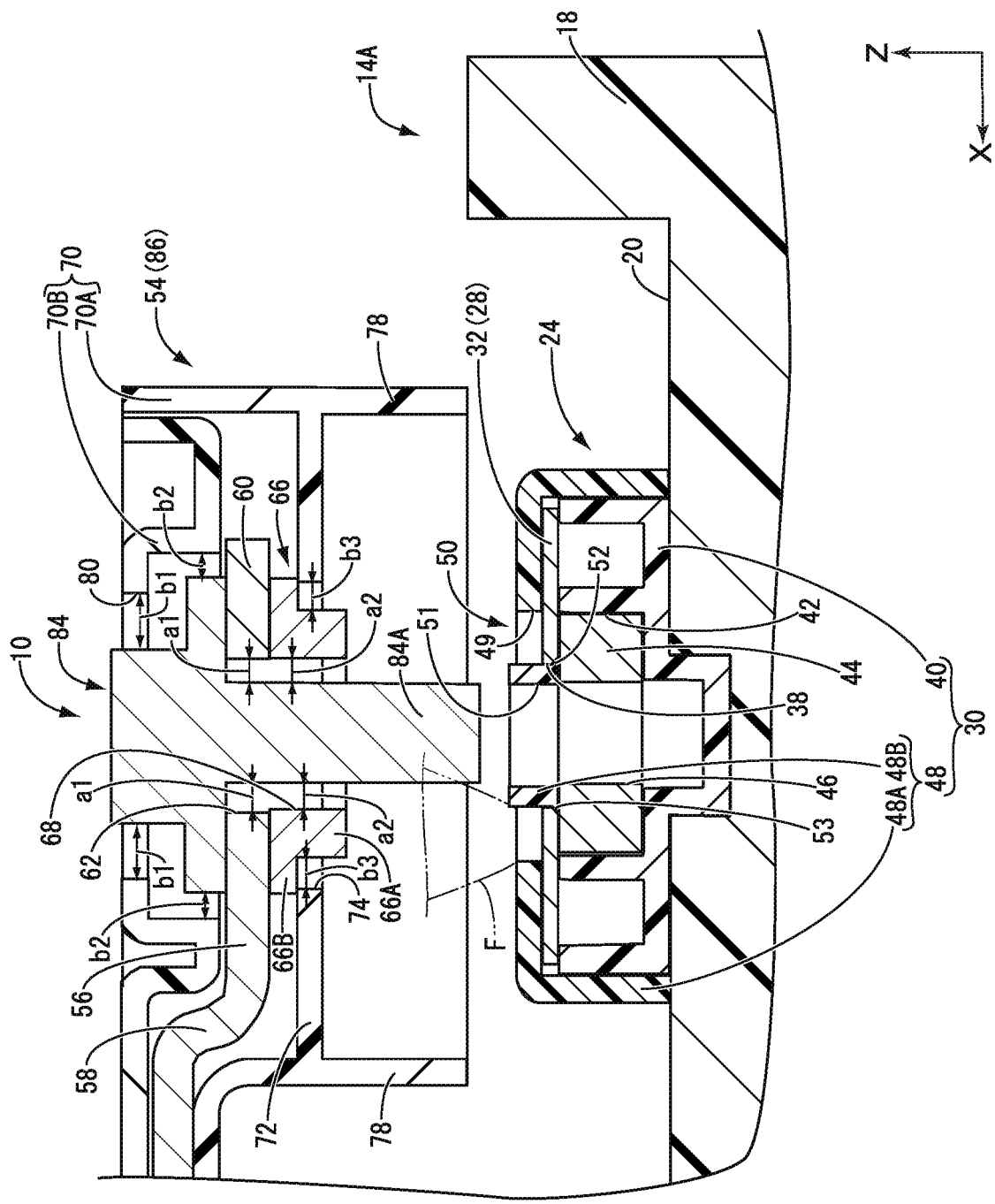
FIG. 7 is an exploded view of FIG. 6, corresponding to FIG. 2.

The housing 30 is made of synthetic resin having insulation properties, and as shown in FIG. 7, the housing 30 holds the connection terminal 28 inside in an accommodated state. The housing 30 includes a terminal holding portion 40 holding the connection terminal 28, and a terminal portion cover 48 serving as an insulating cover that covers the terminal portion 32. As shown in FIG. 4, the terminal holding portion 40 has a generally rectangular block shape, and an accommodating portion 42 accommodating a nut 44 opens in the central portion of the terminal holding portion 40. A screw hole 46 through which the screw portion 84A of the bolt 84 of the conductive component 54, which will be described later, is screwed is formed in the center of the nut 44.

As shown in FIG. 4, the terminal portion cover 48 having insulation properties has a generally rectangular box shape overall, and includes an outer peripheral portion 48A constituting the outer peripheral portion of the terminal portion cover 48 and an inner peripheral portion 48B constituting the inner peripheral portion of the terminal portion cover 48. As shown in FIG. 7, the outer peripheral portion 48A covers the upper surface of the terminal portion 32, and is formed with such a thickness as to be capable of inhibiting or preventing electric shock with respect to the terminal portion 32 by means of synthetic resin having insulation properties. A through hole 49 is formed in the center of the outer peripheral portion 48A. The inner peripheral portion 48B is coaxially arranged in the central portion of the through hole 49, and a terminal portion opening window 50 serving as an opening window that partially exposes the terminal portion 32 of the connection terminal 28 is provided between radially opposed faces of the peripheral edge portion of the through hole 49 and the inner peripheral portion 48B. As shown in FIG. 7, the terminal portion opening window 50 is provided in an annular region around the through hole 49, and with the terminal portion cover 48 having insulation properties, the inside of the terminal portion opening window 50 serves as the inner peripheral portion 48B, while the outside of the terminal portion opening window 50 serves as the outer peripheral portion 48A.

Figure 6:
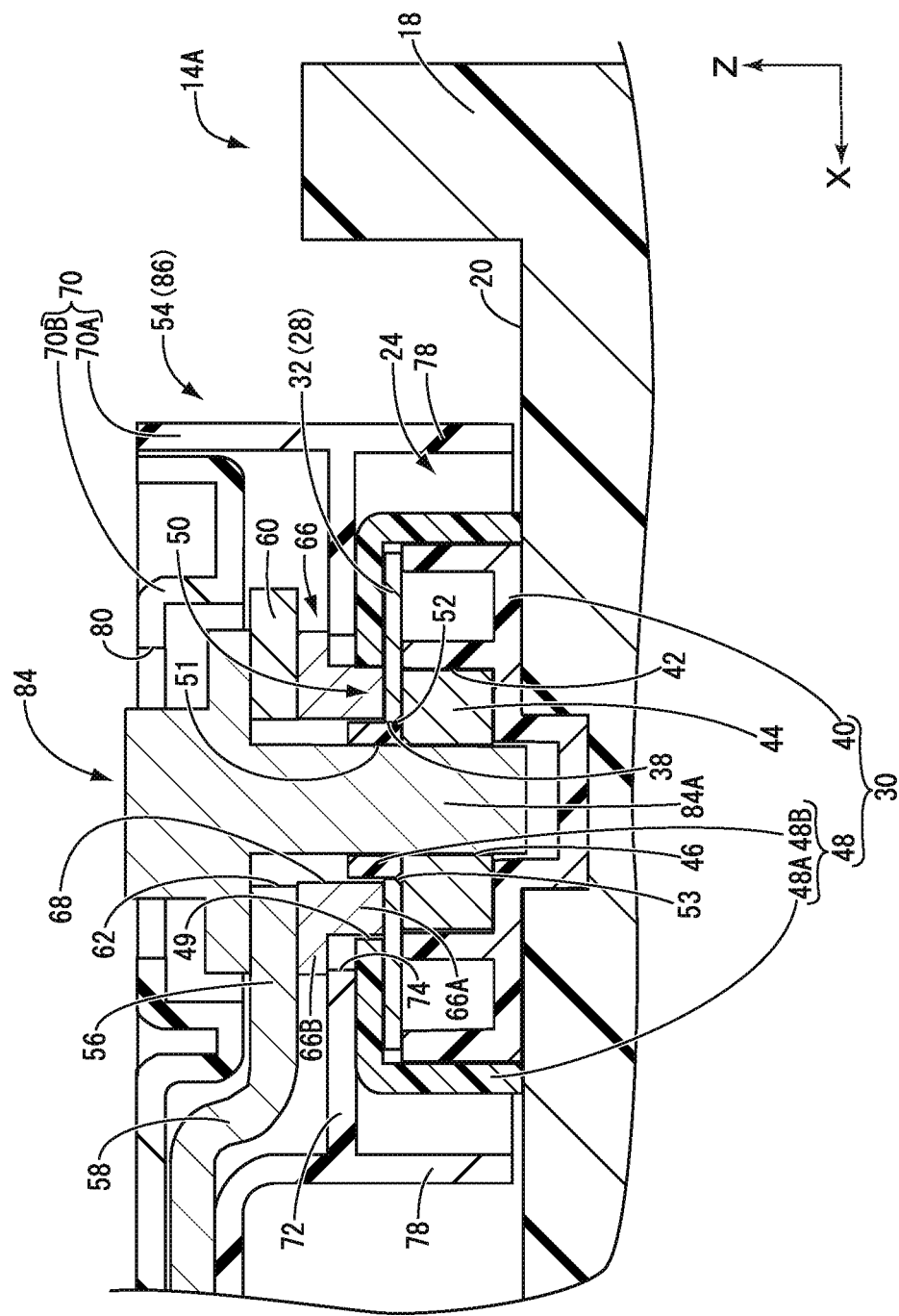
FIG. 6 is an enlarged cross-sectional view taken along line 6-6 of FIG. 3.

Besides, as shown in FIG. 6, the inner peripheral portion 48B is formed so as to cover the inner wall of the bolt insertion hole 38 penetrating the terminal portion 32. In this way, the inner peripheral portion 48B is provided in a cylindrical shape on the inner wall of the bolt insertion hole 38, and is formed with such a thickness as to be capable of inhibiting or preventing electric shock with respect to the inner wall of the bolt insertion hole 38. The inner surface of the inner peripheral portion 48B serves as the inner surface of an insertion hole 51 through which the screw portion 84A of the bolt 84, which will be described later, is inserted. As shown in FIGS. 6 and 7, an annular projecting portion 52 projecting outwardly and diagonally downward is provided at the lower end portion of the inner peripheral portion 48B. A tapered surface 53 extending diagonally downward is provided at the lower end portion of the inner peripheral edge portion of the bolt insertion hole 38, and the inner peripheral portion 48B is inserted into the bolt insertion hole 38 of the terminal portion 32 and fixed in a pressed state against the terminal portion 32.

Second-Terminal-Portion-Side Unit 26

As shown in FIG. 2, the second-terminal-portion-side unit 26 having the other of the two terminal portions has generally the same structure as that of the first-terminal-portion-side unit 24. Thus, in the present embodiment, the description thereof will be omitted.

Conductive Component 54

Figure 5:
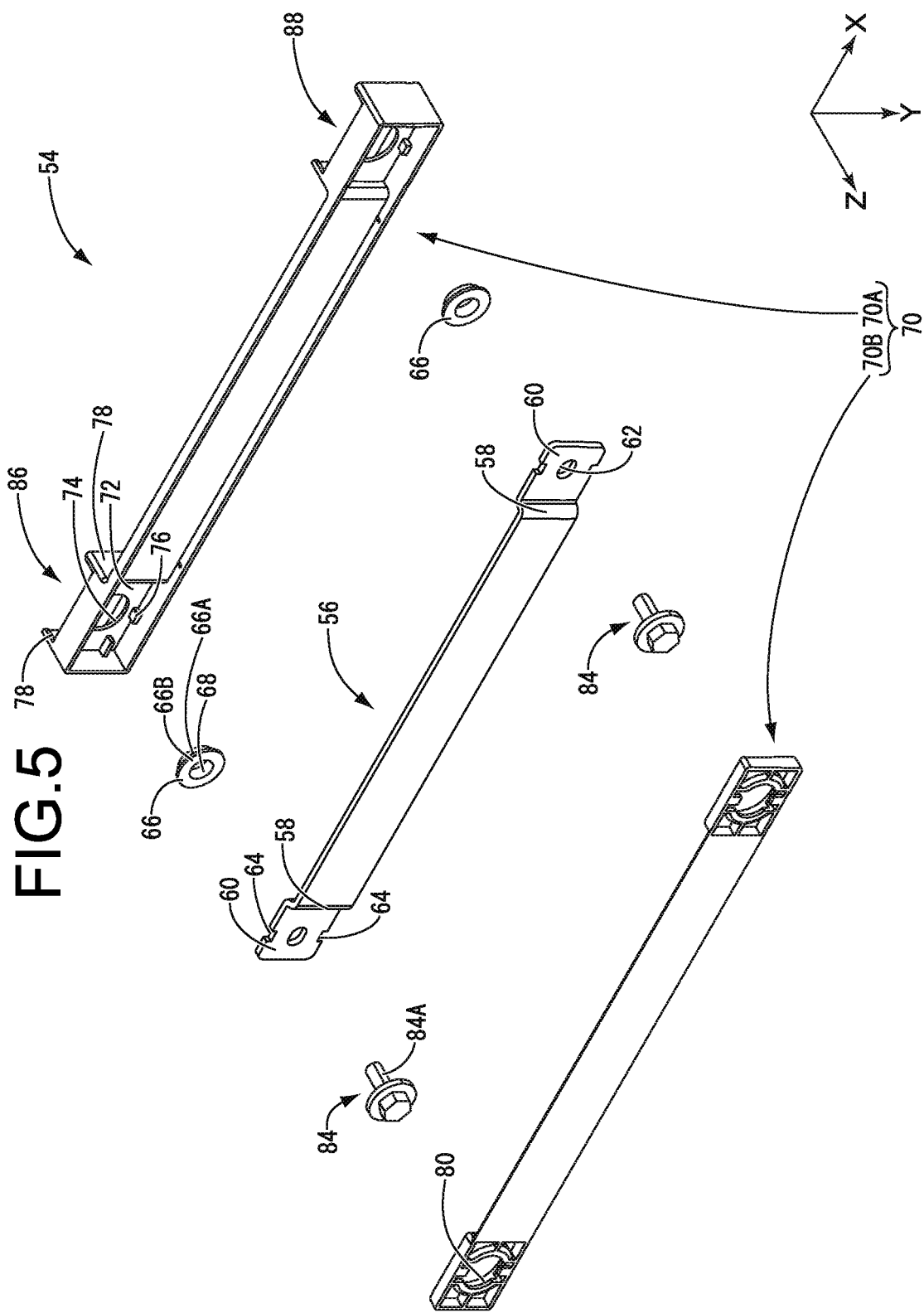
FIG. 5 is an exploded perspective view of a conductive component shown in FIG. 2.

As shown in FIG. 5, the conductive component 54 includes a bus bar 56 constituting the conductive member, a connection-portion-side relay portion 66 serving as a relay portion, and a case 70 having insulation properties that accommodates the conductive member.

Bus Bar 56

The bus bar 56 constituting the conductive member comprises a plate-shaped metal such as copper, copper alloy, aluminum, and aluminum alloy, and includes a pair of crank-shaped bent portions 58, 58 bent in the plate thickness direction of the bus bar 56 at an arbitrary part in the intermediate portion in the longitudinal direction. The bus bar 56 includes connection portions 60, 60 having the same shape formed at the opposite end portions in the longitudinal direction. A bolt insertion hole 62 penetrates the center of the connection portion 60 and has a generally elliptical shape whose major axis is aligned with the longitudinal direction formed in the center. Positioning concave portions 64 are formed on the opposite sides in the width direction of the connection portion 60. The connection portions 60, constitute a first-connection-portion-side unit 86 and a second-connection-portion-side unit 88, which will be described later. Here, the intermediate portion in the longitudinal direction refers to a portion between the opposite end portions in the longitudinal direction, namely, between the connection portions 60, 60 in the longitudinal direction of the bus bar 56.

Connection-Portion-Side Relay Portion 66

As shown in FIG. 5, the connection-portion-side relay portion 66 is constituted by an annular metal member, and is made of, for example, a metal such as copper, copper alloy, aluminum, aluminum alloy, and iron. The connection-portion-side relay portion 66 includes a tube portion 66A having a cylindrical shape, and a flange portion 66B projecting to the outer peripheral side from the upper end portion of the tube portion 66A in a flange shape. The inside of the connection-portion-side relay portion 66 serves as a bolt insertion hole 68 through which the screw portion 84A of the bolt 84 is inserted. Like the bolt insertion hole 62 of the bus bar 56, the bolt insertion hole 68 has a generally elliptical shape whose major axis is aligned with the longitudinal direction of the bus bar 56. The flange portion 66B projects in a stepped shape with a constant dimension about the entire circumference of the outer wall of the connection-portion-side relay portion 66 on the upper side of the bolt insertion hole 68 in the axial direction.

Case 70

As shown in FIG. 5, the case 70 having insulation properties and accommodating the bus bar 56 includes a case main body 70A and a lid body 70B. Both the case main body 70A and the lid body 70B are made of synthetic resin having insulation properties and are separately formed. The case main body 70A and the lid body 70B may be integrally formed.

The case main body 70A has a generally rectangular box shape extending in the longitudinal direction, and the intermediate portion in the longitudinal direction is made shallow depending on the shape of the bus bar 56 accommodated therein. Lower surface opening holes 74 are provided to the opposite end portions in the longitudinal direction of the base wall 72 constituting the lower surface of the case 70. The tube portion 66A of the connection-portion-side relay portion 66 is inserted through the lower surface opening hole 74, and the peripheral edge portion of the lower surface opening hole 74 holds the flange portion 66B of the connection-portion-side relay portion 66. That is, the tube portion 66A of the connection-portion-side relay portion 66 is inserted through the lower surface opening hole 74 penetrating the case main body 70A, and by the flange portion 66B of the connection-portion-side relay portion 66 being engaged with the peripheral edge of the lower surface opening hole 74 from the inside of the case main body 70A, the connection-portion-side relay portion 66 is held by the case 70. Positioning protrusions 76 that engage with the positioning concave portions 64 of the bus bar 56 are formed inward on the opposite sides in the width direction of the base wall 72. Besides, guide walls 78 extend downward from the opposite end portions in the longitudinal direction of the base wall 72 over the entire length in the width direction.

As shown in FIG. 5, the lid body 70B constituting the upper surface of the case 70 has a generally rectangular flat-plate shape extending in the longitudinal direction overall. At the opposite end portions of the lid body 70B in the longitudinal direction, formed are upper surface opening portions 80 that expose the heads of the bolts 84 having an insulation coating thereon. Insulation coating is performed, for example, by means of fluororesin coating, nylon powder coating, or the like.

As shown in FIG. 7, the tube portion 66A of the connection-portion-side relay portion 66 is held in the lower surface opening hole 74 of the case main body 70A configured in this way. The bus bar 56 is placed above the flange portion 66B of the connection-portion-side relay portion 66. The bus bar 56 is positioned by the positioning concave portion 64 of the bus bar 56 being fitted into the positioning protrusion 76 of the case main body 70A. The bolt 84 is held by the connection portion 60 of the bus bar 56 in a state where the screw portion 84A of the bolt 84 having an insulation coating thereon is inserted through the bolt insertion hole 62 of the connection portion 60 of the bus bar 56. The case main body 70A that accommodates the connection-portion-side relay portion 66, the bus bar 56, and the bolt 84 in this way is covered by the lid body 70B, so as to constitute the conductive component 54.

As shown in FIG. 2, the conductive component 54 includes the first-connection-portion-side unit 86 provided at the end portion on the first battery module 12A side in the longitudinal direction, and the second-connection-portion-side unit 88 provided at the end portion on the second battery module 12B side in the longitudinal direction. Both the first-connection-portion-side unit 86 and the second-connection-portion-side unit 88 include the connection-portion-side relay portion 66, the connection portion 60 of and the bus bar 56, and the bolt 84 accommodated in the case 70 having insulation properties.

In the conductive component 54 configured in this way, as shown in FIG. 7, the tube portion 66A of the connectionportion-side relay portion 66 penetrates the lower surface opening hole 74 of the base wall 72 of the case main body 70A constituting the lower surface of the case 70 and protrudes to the outside. Besides, the screw portion 84A of the bolt 84 penetrates the lower surface opening hole 74 and protrudes to the outside. In addition, the tube portion 66A of the connection-portion-side relay portion 66 and the screw portion 84A of the bolt 84 are surrounded by the guide wall 78 as shown in FIGS. 6 and 7. That is, the portions constituting the first-connection-portion-side unit 86 and the second-connection-portion-side unit 88 other than the tube portions 66A of the connection-portion-side relay portions 66, and the bus bar 56 including the connection portions 60, 60 are all accommodated in the case 70 having insulation properties, and are not exposed to the outside of the case 70, but are surrounded by the case 70. Further, around the tube portion 66A of the connection-portion-side relay portion 66 and the screw portion 84A of the bolt 84, the guide wall 78 extends beyond the tip part of the connection-portion-side relay portion 66 and is formed with generally the same dimension as that of the tip part of the screw portion 84A. That is, the guide wall 78 is a wall higher than the connection-portion-side relay portion 66. Moreover, the guide wall 78 is provided near the connection portion 60, and as shown in FIG. 6 or the like, displacement of the conductive component 54 with respect to the terminal-portion-side units 24, 26 is limited by the pair of guide walls 78, 78 being in contact with the respective connection terminals 28 provided to the terminal-portion-side units 24, 26 side.

The bolt insertion holes of the connection-portion-side units 86, 88 is constituted by including the bolt insertion holes 62 provided in the connection portions 60, 60 of the bus bar 56 and the bolt insertion holes 68 provided in the connection-portion-side relay portions 66, which constitute the first-connection-portion-side unit 86 and the second-connection-portion-side unit 88. These bolt insertion holes 62, 68 have a generally elliptical shape whose major axis is aligned with the longitudinal direction of the bus bar 56. Therefore, to explain the first-connection-portion-side unit 86 shown in FIG. 7 as an example, in a state where the screw portion 84A of the bolt 84 is coaxially arranged in the bolt insertion holes 62, 68, there are provided first spaces a1, a2 permitting displacement of the bolt 84 in the longitudinal direction of the bus bar 56 on the opposite sides of the screw portion 84A in one diametrical direction, which is the longitudinal direction of the bus bar 56. Meanwhile, as shown in FIG. 7, the case main body 70A and the lid body 70B constituting the conductive component 54 include second spaces b1, b2, and b3 permitting displacement of the bolt 84 and the connection-portion-side relay portion 66 in the longitudinal direction of the bus bar 56.

Connection Between Conductive Component and Terminal Portion

As shown in FIGS. 1 and 2, the conductive component 54 having such a configuration is attached to the first-terminal-portion-side unit 24 and the second-terminal-portion-side unit 26. By so doing, the connection portion 60 of the first-connection-portion-side unit 86 is fastened by a bolt to the terminal portion 32 of the first-terminal-portion-side unit 24 in a connected state via the connection-portion-side relay portion 66, and the connection portion 60 of the second-connection-portion-side unit 88 is fastened by a bolt to the terminal portion 32 of the second-terminal-portion-side unit 26 in a connected state via the connection-portion-side relay portion 66. Bolt fastening is performed by tightening the components with the bolts 84 and the nuts 44. The process of attaching the first-connection-portion-side unit 86 to the first-terminal-portion-side unit 24 can be performed in generally the same as the process of attaching the second-connection-portion-side unit 88 to the second-terminal-portion-side unit 26. Therefore, here, only the process of attaching the first-connection-portion-side unit 86 to the first-terminal-portion-side unit 24 will be described.

First, the terminal fastening portions 34 of the connection terminals 28 of the first-terminal-portion-side unit 24 and the second-terminal-portion-side unit 26 shown in FIG. 2 are fastened to the terminals of the cells 16 on the front side of the first battery module 12A and the second battery module 12B by using a fastening member (not shown). Besides, in that state, the upper portion of the cell 16 is covered by an upper case (not shown) over generally the entire surface.

In this state, as shown in FIG. 7, the terminal portion 32 (terminal portion 32) of the connection terminal 28 of the first-terminal-portion-side unit 24 (second-terminal-portion-side unit 26) is each covered by the outer peripheral portion 48A and the inner peripheral portion 48B that constitute the terminal portion cover 48 having insulation properties. Although there is the terminal portion opening window 50 from which the terminal portion 32 of the connection terminal 28 is partially exposed, the terminal portion opening window 50 is small with respect to the fingertip of the operator or the like. Thus, touch of the operator or foreign matters to the terminal portion 32 of the connection terminal 28 through the terminal portion opening window 50 is inhibited. Since the connection terminal 28 has a high voltage, particularly high safety requirements are set. For example, the standards of German Verband der Elektrotechnik (VDE) (German Association for Electrical, Electronic and Information Technologies), such as VDE0470, and European Norm, such as IEC/EN61032, offer protection of human finger from touch. The so-called test finger F shown in FIG. 7 is provided for the corresponding test. In the present embodiment, the terminal portion opening window 50 opens with such a size that the test finger F cannot be inserted.

Next, as shown in FIG. 7, the first-connection-portion-side unit 86 of the conductive component 54 is superposed on the first-terminal-portion-side unit 24 from above. In this state, access to the screw portion 84A of the bolt 84, the tube portion 66A of the connection-portion-side relay portion 66, and further the terminal portion 32 exposed through the terminal portion opening window 50 is limited by the guide wall 78, thereby achieving safety of the operator. The screw portion 84A of the bolt 84 is inserted through the insertion hole 51 of the inner peripheral portion 48B of the first-terminal-portion-side unit 24, and then is screwed into the screw hole 46 of the nut 44. At this time, a tool (not shown) can be inserted through the upper surface opening portion 80 of the lid body 70B of the conductive component 54 to fasten the bolt 84 to the nut 44. As a result, as shown in FIG. 6, the tube portion 66A of the connection-portion-side relay portion 66 is inserted through the terminal portion opening window 50 of the first-terminal-portion-side unit 24, and the tube portion 66A of the connection-portion-side relay portion 66 is in contact with the terminal portion 32 of the first-terminal-portion-side unit 24. Then, the bolts are fastened with the terminal portion 32 of the connection terminal 28, the connection-portion-side relay portion 66, and the connection portion 60 of the bus bar 56 sandwiched between the head portion of the bolt 84 and the nut 44.

With this arrangement, the terminal portion 32 of the first-terminal-portion-side unit 24 and the connection portion 60 of the first-connection-portion-side unit 86 of the conductive component 54 are electrically connected via the connection-portion-side relay portion 66. Similarly, the terminal portion 32 of the second-terminal-portion-side unit 26 and the connection portion 60 of the second-connection-portion-side unit 88 of the conductive component 54 are electrically connected via the connection-portion-side relay portion 66. This completes the inter-terminal connection structure 10.

Subsequently, the working effects of the present embodiment will be described. According to the present embodiment, the terminal portions 32 of the connection terminals 28 of the first-terminal-portion-side unit 24 and the second-terminal-portion-side unit 26 are covered by the outer peripheral portion 48A and the inner peripheral portion 48B constituting the terminal portion cover 48 having insulation properties. Therefore, even if the terminal portion opening window 50 that partially exposes the terminal portion 32 is provided, the terminal portion opening window 50 is small with respect to the fingertip of the operator or the like, thereby inhibiting touch of the operator or foreign matters to the terminal portion 32 through the terminal portion opening window 50. Besides, it is possible to conductively connect the connection portions 60 of the bus bar 56 of the connection-portion-side units 86, 88 and the respective terminal portions 32, 32 of the terminal-portion-side units 24, 26 via the connection-portion-side relay portions 66, which are connected to the terminal portions 32 of the terminal-portion-side units 24, 26 through the terminal portion opening windows 50. Therefore, the terminal portion 32 and the connection portion 60 can be electrically connected.

Further, by providing the terminal portion cover 48 having insulation properties on all the terminal portions 32, excellent measures to prevent electric shock can be realized. When connecting the terminals having opposite polarities included in the adjacent cell 16 groups of the two battery modules 12A, 12B as in the present embodiment, both of the terminal portions 32 of the first-terminal-portion-side unit 24 and the second-terminal-portion-side unit 26 serve as live portions. Therefore, by covering both of the terminal portions 32 of the first-terminal-portion-side unit 24 and the second-terminal-portion-side unit 26 with the terminal portion covers 48 having insulation properties, touch of the operator or the like to the live portion is inhibited, thereby improving safety.

By fixing the terminal portion 32 and the connection portion 60 by bolting, the terminal portion 32 and the connection portion 60 can be stably tightened and fixed. Further, the terminal portion opening window 50 is formed in an annular shape around the bolt insertion hole 68, the inner hole of the connection-portion-side relay portion 66 serves as the bolt insertion hole 68, and the connection-portion-side relay portion 66 is constituted by an annular metal member. Therefore, the terminal portion opening window 50 and the connection-portion-side relay portion 66 can be compactly formed, thereby downsizing the inter-terminal connection structure 10. Moreover, by making the connection-portion-side relay portion 66 an annular metal member, the strength of the connection-portion-side relay portion 66 can be surely obtained.

As shown in FIGS. 6 and 7, the lower end portion of the tube portion 66A of the connection-portion-side relay portion 66 connected to the connection portion 60 is surrounded by the guide wall 78, and is not exposed to the outside of the case 70. Therefore, in comparison with the conventional structure in which the connection portion 60 is exposed from the case over the entire lower surface, touch of the operator or the like to the connection portion 60 can also be advantageously inhibited.

The conductive member is constitute by the bus bar 56, and the pair of crank-shaped bent portions 58 bent in the plate thickness direction of the bus bar 56 are provided at the intermediate portion in the longitudinal direction of the bus bar 56. This configuration makes it possible to advantageously absorb the tolerance in the plate thickness direction of the bus bar 56 generated between the terminal portion 32 of the first-terminal-portion-side unit 24 and the terminal portion 32 of the second-terminal-portion-side unit 26 to which the respective connection portions 60 provided at the opposite end portions in the longitudinal direction of the bus bar 56. Further, by providing the pair of crank-shaped bent portions 58 having opposite directions of bending, the two connection portions 60 can be provided at the same position in the plate thickness direction of the bus bar 56. In addition, since the bolt insertion hole 62 of the connection portion 60 of the bus bar 56 has an elliptical shape extending in the longitudinal direction, it is possible to advantageously absorb the tolerance in the longitudinal direction of the bus bar 56 generated between the bus bar 56 and the terminal portion 32 to which the connection portion 60 of the bus bar 56 is connected.

As shown in FIG. 7, in the bolt insertion hole 62 of the connection portion 60 and the bolt insertion hole 68 of the connection-portion-side relay portion 66, there are provided the first spaces a1, a2 permitting displacement of the bolt 84 in the longitudinal direction of the bus bar 56. Meanwhile, in the case main body 70A and the lid body 70B of the conductive component 54, there are provided the second spaces b1, b2, and b3 permitting displacement of the bolt 84 and the connection-portion-side relay portion 66 in the longitudinal direction of the bus bar 56. With this configuration, when bolting the connection portions 60, 60 of the conductive component 54 to the respective terminal portions 32, variability in the remote distances between the terminal portion 32 of the first-terminal-portion-side unit 24 and the terminal portion 32 of the second-terminal-portion-side unit 26, which is generated by the accumulation of dimensional tolerances in the longitudinal direction of the bus bar 56, can be advantageously absorbed by the first space a1, a2 and the second space b1, b2, and b3. The first space a2 also serves as a space for accommodating the inner peripheral portion 48B.

The upper surface of the case 70 constituting the conductive component 54 is provided with the upper surface opening portion 80 that exposes the head portion of the bolt 84 having an insulation coating thereon, and the lower surface of the case 70 is provided with the lower surface opening hole 74 that exposes the screw portion 84A of the bolt 84 and the connection-portion-side relay portion 66. Since the bolt 84 is accommodated in the case 70 in advance, workability at the time of bolting can be improved. Besides, since the head portion of the bolt 84 has an insulation coating thereon, measures to prevent electric shock on the upper surface side of the case are also achieved. Furthermore, since the screw portion 84A of the bolt 84 and the connection-portion-side relay portion 66 are only exposed from the lower surface opening hole 74 provided to the case 70, touch between the operator and the connection portion 60 on the lower surface side of the case 70 is advantageously inhibited.

Since the guide wall 78 is a wall higher than the connection-portion-side relay portion 66, it is possible to more advantageously inhibit the touch of the operator to the connection-portion-side relay portion 66. Besides, the guide wall 78 projects with generally the same dimension as that of the tip part of the screw portion 84A of the bolt 84.

Therefore, the touch between the operator and the screw portion 84A of the bolt 84 at the time of bolting is also advantageously inhibited, thereby improving safety at the time of bolting work.

By the pair of guide walls 78 touching the respective connection terminals 28 of the terminal-portion-side units 24, 26, displacement of the conductive component 54 is inhibited or limited. This will inhibit or prevent the situation in which, for example, the conductive component 54 displaces after the first-connection-portion-side unit 86 is bolted to the first-terminal-portion-side unit 24, and the connection portion 60 of the second-connection-portion-side unit 88 serving as a live portion is exposed to the area that can be touched by the operator or the like, etc.

In addition, by separating the connection-portion-side relay portion 66 and the bus bar 56 serving as the conductive member, the degree of freedom in selecting the materials thereof can be improved. Moreover, since the connection-portion-side relay portion 66 is held by the case 70, it is easy to handle the connection-portion-side relay portion 66, which is relatively small. The connection-portion-side relay portion 66 is accommodated and held in the case 70 by the flange portion 66B side of the connection-portion-side relay portion 66 being engaged with the peripheral edge of the lower surface opening hole 74 from the inside of the case 70. Thus, with a simple structure, it is possible for the connection-portion-side relay portion 66 to project to the outside of the case 70 and to be held by the case 70.

Although Embodiment 1 has been described in detail as a specific example of the present disclosure, the present disclosure is not limited by this specific description. Modifications, improvements, etc. to the extent that the object of the present disclosure can be achieved are included in the present disclosure. For example, the following Variations of the embodiment are also included in the technical scope of the present disclosure. In the following Variations 3 to 12, the second-terminal-portion-side unit 26 and the second-connection-portion-side unit 88 side will be illustrated and described. However, these Variations can also be applied to the first-terminal-portion-side unit 24 and the first-connection-portion-side unit 86, and may be applied to one or both of the first-terminal-portion-side unit 24 and the first-connection-portion-side unit 86 side, and the second-terminal-portion-side unit 26 and the second-connection-portion-side unit 88 side.

Variation 1

Figure 8:
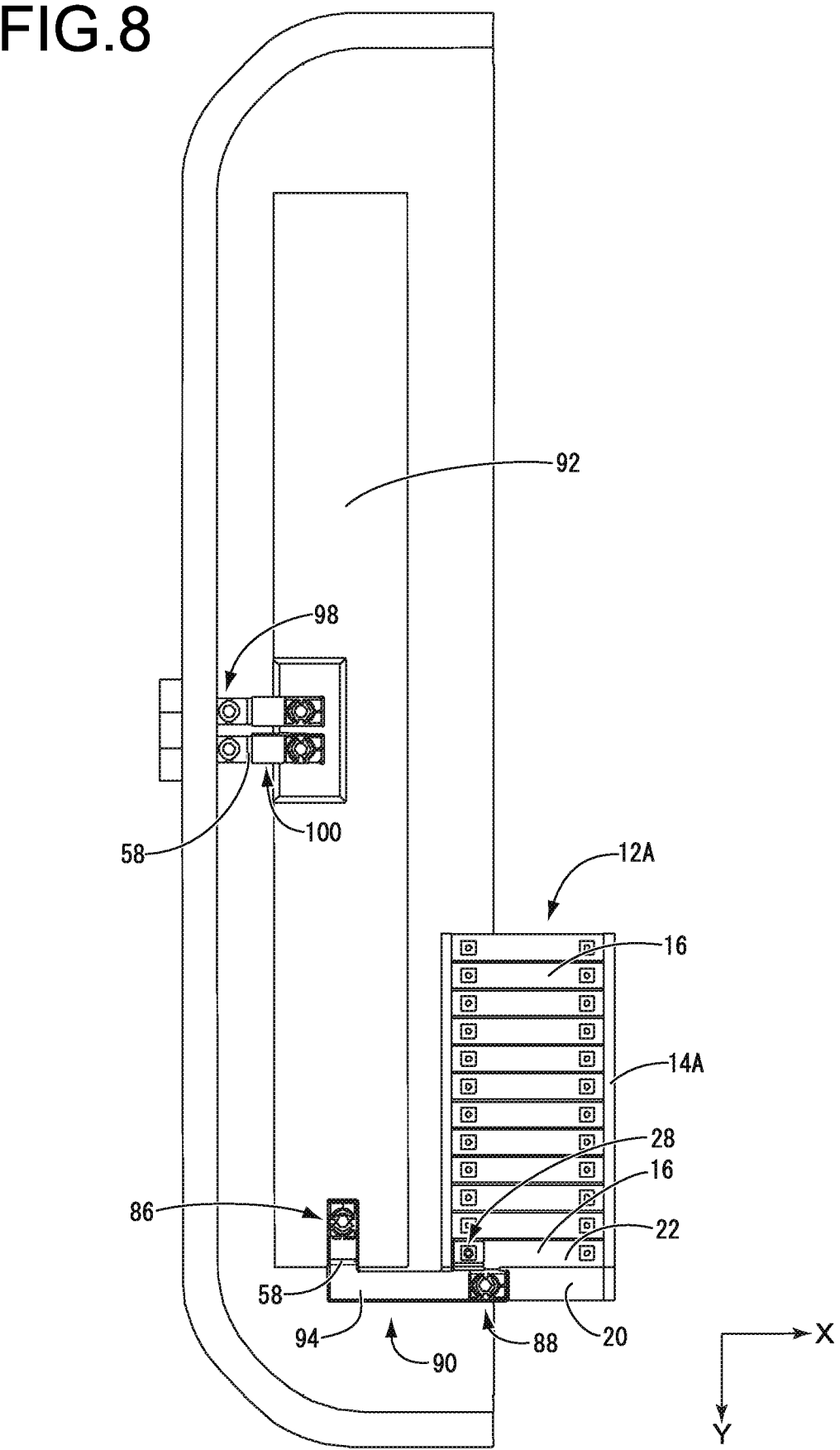
FIG. 8 is a plan view showing a state in which terminal portions of a cell group and a junction box are connected to each other via a bus bar fastened to them by using inter-terminal connection structures according to Variations 1 and 2.
Figure 9:
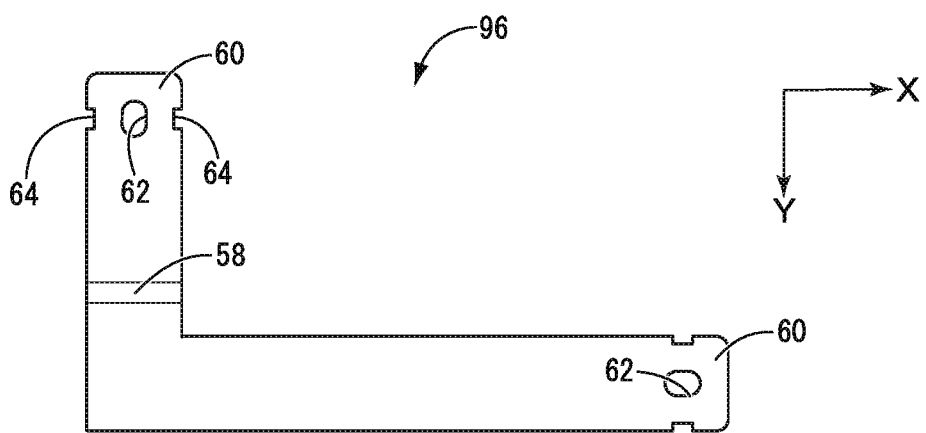
FIG. 9 is an enlarged plan view showing a conductive member for use in the inter-terminal connection structure shown in FIG. 8.

Whereas the inter-terminal connection structure 10 of Embodiment 1 of the present disclosure connects the first battery module 12A and the second battery module 12B, the present disclosure is not limited to such an embodiment. For example, like an inter-terminal connection structure 90 of Variation 1 shown in FIG. 8, the battery module 12 and a junction box 92 may be connected, namely, it is possible to connect the terminal portions of two arbitrary devices. Further, whereas the conductive component 54 is formed so as to extend linearly, for example, as in the inter-terminal connection structure 90 of Variation 1 shown in FIG. 8, a conductive component 94 may be in an L shape, and any shape is adoptable. As shown in FIG. 9, the shapes of the two bolt insertion holes 62 of the connection portions 60, 60 of a bus bar 96 constituting the conductive component 94 each have a generally elliptical shape whose major axis is aligned with the longitudinal direction of the bus bar 96, and the longitudinal directions thereof are orthogonal to each other (the X direction and the Y direction in FIG. 9). As in the exemplified Embodiment 1, by making the bolt insertion hole 68 of the connection-portion-side relay portion 66 in a similar elliptical shape, and providing the first spaces a1, a2 permitting displacement of the bolt 84, as well as by providing the case 70 with the second spaces b1, b2, and b3 permitting displacement of the bolt 84 and the connection-portion-side relay portion 66, tolerance absorption in two orthogonal directions becomes possible.

Variation 2

In addition, instead of both the terminal portions 32, 32 being covered with the terminal portion cover 48 having insulation properties, as in an inter-terminal connection structure 100 of Variation 2 that connects the junction box 92 and an external device connecting terminal 98, only the terminal portion 32 of the second-terminal-portion-side unit 26 on the junction box 92 side may be covered by the terminal portion cover 48 having insulation properties. That is, it is also possible to cover only at least one terminal portion that can be a live portion with the terminal portion cover 48 having insulation properties, thereby preventing electric shock while suppressing the cost.

Variation 3

Figure 10:
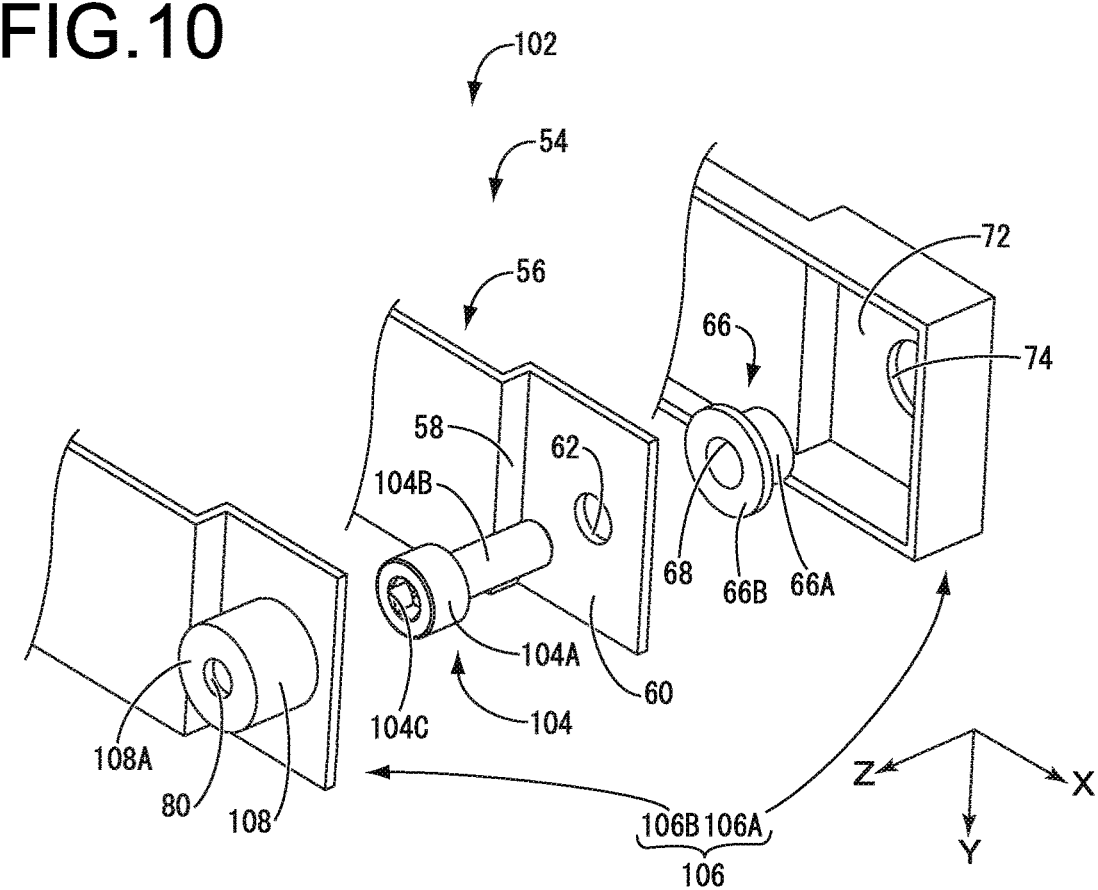
FIG. 10 is an exploded perspective view of a conductive component for use in an inter-terminal connection structure according to Variation 3.
Figure 11:
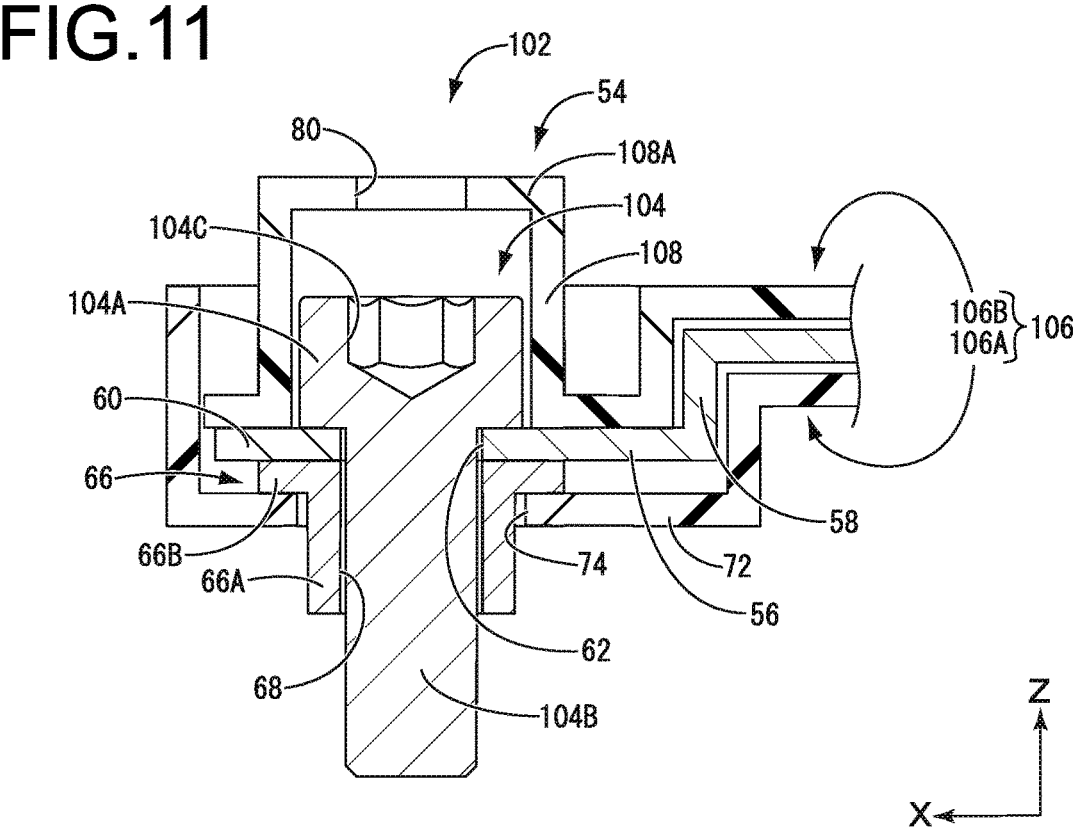
FIG. 11 is an enlarged cross-sectional view in the longitudinal direction (the X direction) of the assembled state of the conductive component shown in FIG. 10.

In the inter-terminal connection structure 10 of Embodiment 1 of the present disclosure, the head portion of the bolt 84 has an insulation coating thereon, but the present disclosure is not limited to such an embodiment. For example, like an inter-terminal connection structure 102 of the Variation 3 shown in FIGS. 10 and 11, it is possible to use an Allen hex socket bolt 104 having no insulation coating on the head portion as the bolt used for the conductive component 54. The Allen hex socket bolt 104 includes a cylindrical head portion 104A and a screw portion 104B having a slightly smaller diameter and extending downward from the head portion 104A. In the center portion of the upper surface of the head portion 104A, there is formed a tool fitting hole 104C opening upward and having a hexagonal cross section with which a tip part of a fastening tool (not shown) is fitted. Besides, among a case main body 106A and a lid body 106B of a case 106 that accommodates and holds the Allen hex socket bolt 104, the end portion in the longitudinal direction (the X direction) of the lid body 106B is provided with a projecting portion 108 having a cylindrical shape with a bottom while projecting upward from the upper surface of the lid body 106B and opening downward. An upper surface opening portion 80 having a circular cross-sectional shape is formed in the central portion of an upper wall 108A of the projecting portion 108. As a result, in plan view, the tool fitting hole 104C is exposed to the outside via the upper surface opening portion 80, and the outer peripheral portion of the head portion 104A is covered by the upper wall 108A of the projecting portion 108 formed on the lid body 106B which is the upper surface of the case 106. As shown in FIG. 11, in the lid body 106B constituting the upper surface of the case 106, the upper wall 108A of the projecting portion 108, which is a part covering the outer peripheral portion of the head portion 104A of the Allen hex socket bolt 104, is remote upward from the head portion 104A.

The tip part of the tool (not shown) used with respect the Allen hex socket bolt 104 when bolting has such a size as to be insertable into the tool fitting hole 104C. The tip part of a tool (not shown) used for bolting the bolt 84 used in the inter-terminal connection structure 10 described above is larger than the head portion of the bolt 84 due to the need to grip the head portion of the bolt 84. Therefore, in the inter-terminal connection structure 102 of Variation 3, the diameter of the upper surface opening portion 80 of the lid body 106B in the case 106 of the conductive component 54 can be made smaller than the diameter of the upper surface opening portion 80 of the lid body 70B of the inter-terminal connection structure 10 described above. Furthermore, in the inter-terminal connection structure 102 of Variation 3, the upper wall 108A of the projecting portion 108 covering the outer peripheral portion of the head portion 104A of the Allen hex socket bolt 104 is remote upward from the head portion 104A of the Allen hex socket bolt 104. With this arrangement, unlike the bolt 84 used in the inter-terminal connection structure 10 described above, even without performing an insulation process on the bolt 84, it is possible to advantageously inhibit or prevent touch of the finger to the head portion of the bolt 84 that serves as a live portion while obtaining a certain size of the upper surface opening portion 80. Although the cross-sectional shape of the tool fitting hole 104C has been described by exemplifying a hexagonal cross section, it is possible to adopt any shapes including a polygonal shape other than a hexagon, a star shape, + and −, which are non-circular cross sections, as well as a circular cross section.

Variation 4

Figure 12:
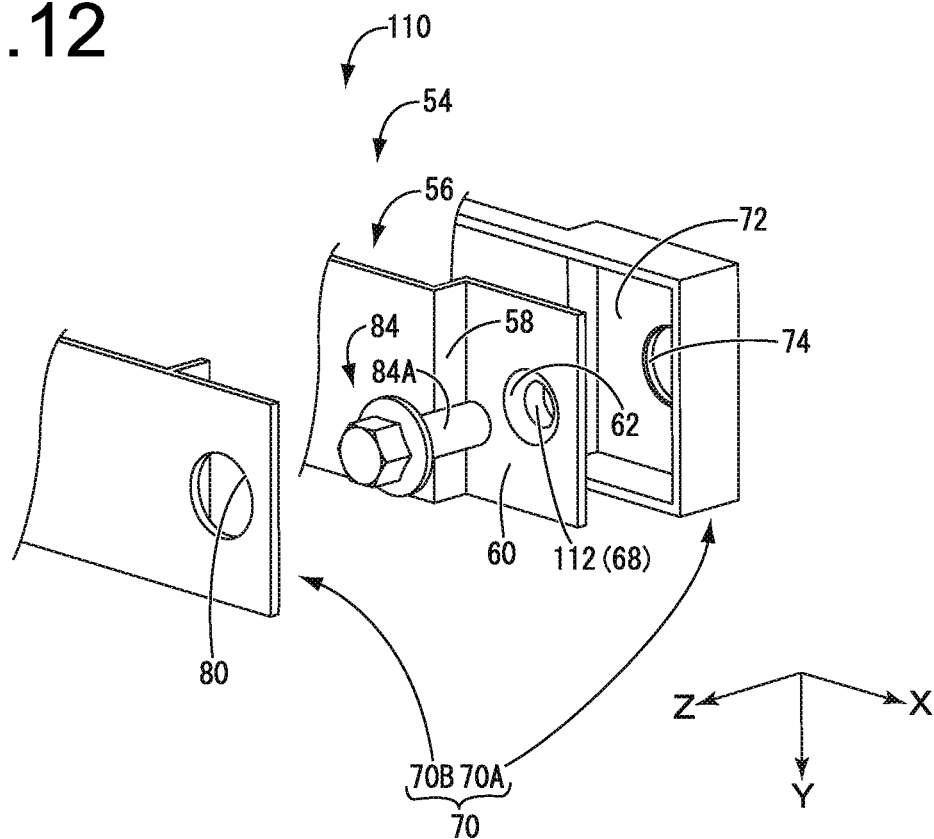
FIG. 12 is an exploded perspective view of a conductive component for use in an inter-terminal connection structure according to Variation 4.
Figure 13:
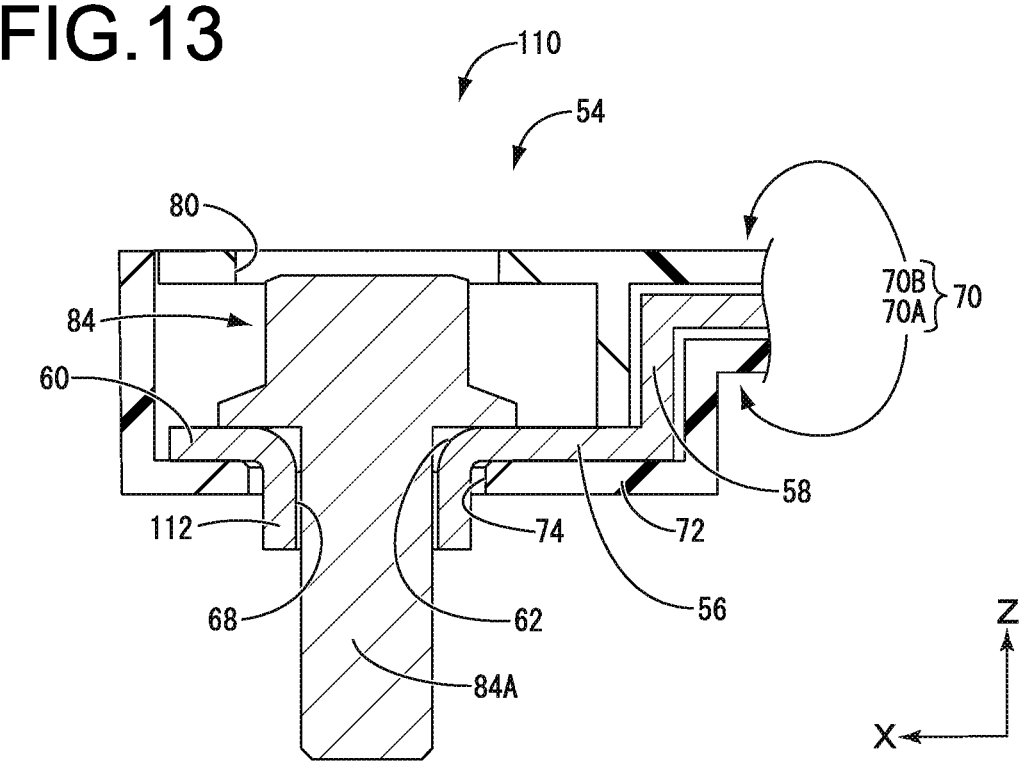
FIG. 13 is an enlarged cross-sectional view in the longitudinal direction (the X direction) of the assembled state of the conductive component shown in FIG. 12.

In the inter-terminal connection structure 10 of Embodiment 1 of the present disclosure, the connection-portion-side relay portion 66 and the bus bar 56 serving as the conductive member are separately formed, but the present disclosure is not limited to such an embodiment. For example, like an inter-terminal connection structure 110 of Variation 4 shown in FIGS. 12 and 13, a connection-portion-side relay portion 112 may be integrally formed with the bus bar 56. This facilitates handling of the connection-portion-side relay portion 112, which is a relatively small component. Therefore, it is possible to improve assembling workability or the like. The connection-portion-side relay portion 112 can be formed by, for example, a burring process. As a result, the upper opening portion of the bolt insertion hole 68 of the connection-portion-side relay portion 112 has a tapered shape that expands outward towards the top. This makes it possible to easily insert the screw portion 84A of the bolt 84 through the bolt insertion hole 68. The method of integrally forming the connection-portion-side relay portion 112 with the bus bar 56 is not limited, but any method can be adopted. For example, the bus bar 56 and the connection-portion-side relay portion 112 may be integrally formed as a die-cast product made of aluminum or the like.

Variation 5

Figure 14:
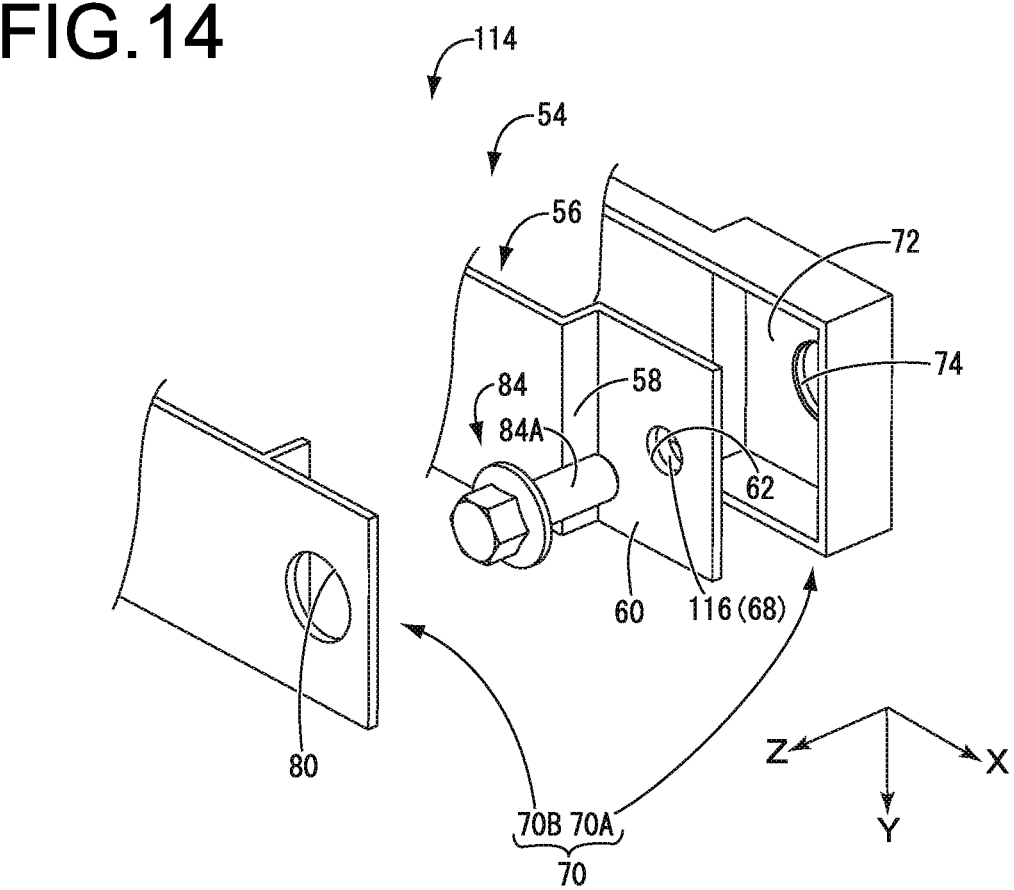
FIG. 14 is an exploded perspective view of a conductive component for use in an inter-terminal connection structure according to Variation 5.
Figure 15:
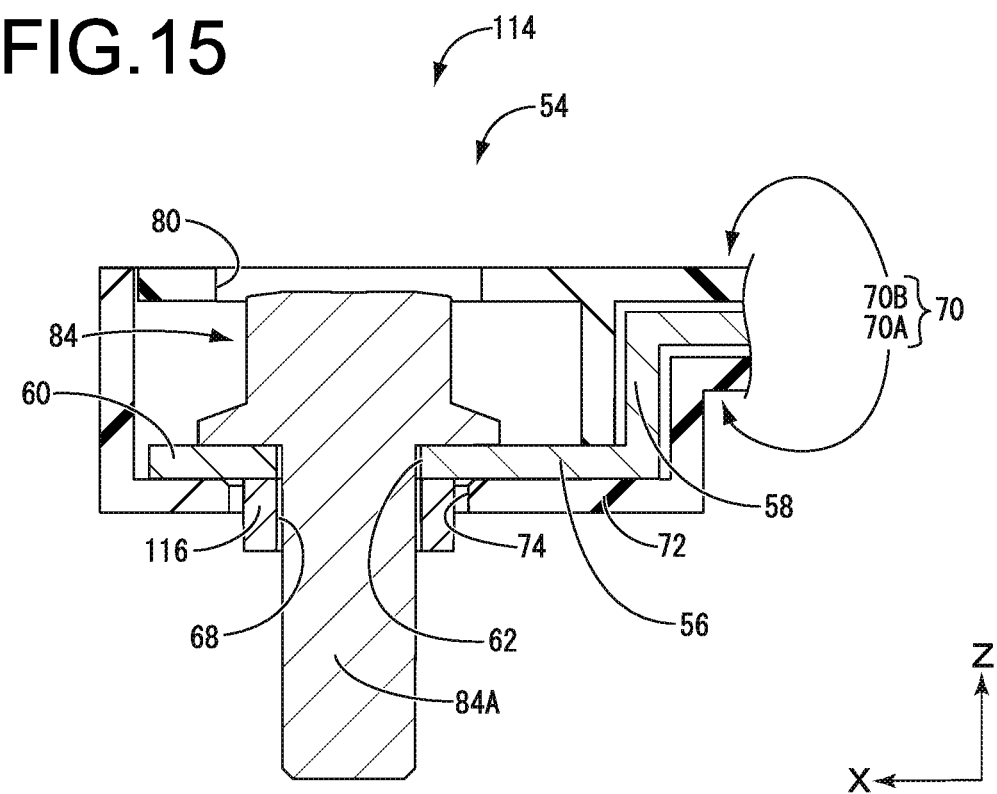
FIG. 15 is an enlarged cross-sectional view in the longitudinal direction (the X direction) of the assembled state of the conductive component shown in FIG. 14.

Alternatively, like an inter-terminal connection structure 114 of Variation 5 shown in FIGS. 14 and 15, the bus bar 56 having a flat-plate shape and a cylindrical connection-portion-side relay portion 116, which are separately formed, may be integrated by using a known means such as welding. This case also facilitates handling of the connection-portion-side relay portion 116, which is a relatively small component. Therefore, it is possible to improve assembling workability or the like.

Variation 6

Figure 16:
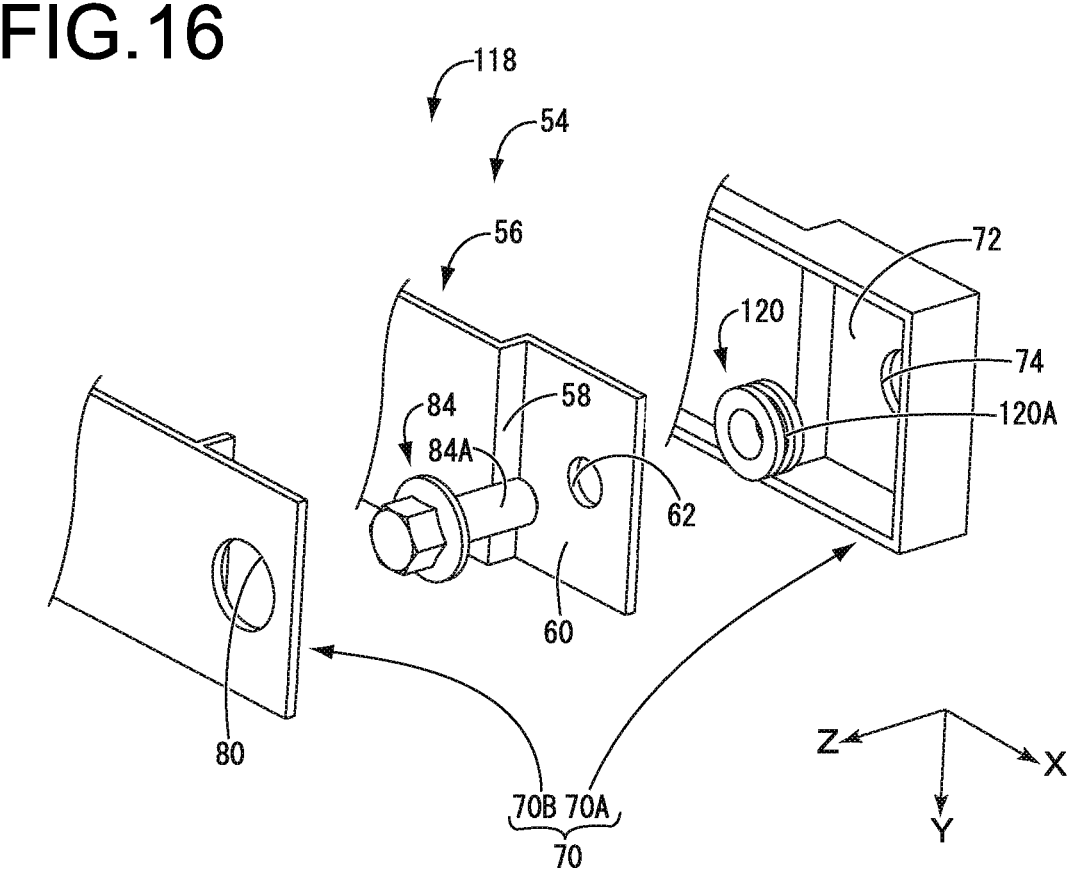
FIG. 16 is an exploded perspective view of a conductive component for use in an inter-terminal connection structure according to Variation 6.
Figure 17:
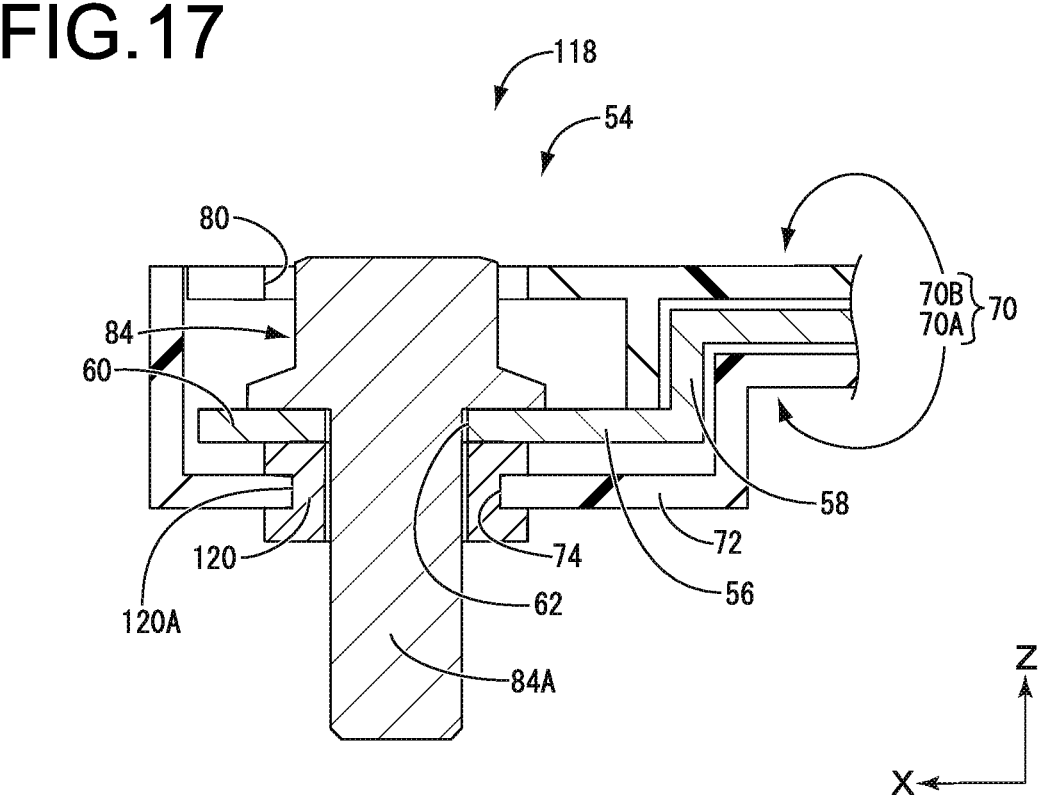
FIG. 17 is an enlarged cross-sectional view in the longitudinal direction (the X direction) of the assembled state of the conductive component shown in FIG. 16.

In the inter-terminal connection structure 10 of Embodiment 1 of the present disclosure, the connection-portion-side relay portion 66 includes the cylindrical tube portion 66A and the flange portion 66B projecting outward from the tube portion 66A, and the connection-portion-side relay portion 66 is held by the case 70 by the flange portion 66B being engaged with the peripheral edge of the lower surface opening hole 74 from the inside of the case 70, but the present disclosure is not limited to such an embodiment. For example, like an inter-terminal connection structure 118 of Variation 6 shown in FIGS. 16 and 17, it would also be acceptable that a connection-portion-side relay portion 120 has a cylindrical shape overall, and a constricted portion 120A opens in the outer peripheral surface of the connection-portion-side relay portion 120 in the axially center portion thereof so as to extend in an annular shape with a rectangular cross section. With this configuration, when the connection-portion-side relay portion 120 is press-fitted into the lower surface opening hole 74 penetrating the case main body 70A, the outer peripheral edge portion of the lower surface opening hole 74 is elastically deformed downward and insertion of connection-portion-side relay portion 120 into the lower surface opening hole 74 is permitted. When the constricted portion 120A of the connection-portion-side relay portion 120 reaches the lower surface opening hole 74, the outer peripheral edge portion of the lower surface opening hole 74 elastically recovers and enters the constricted portion 120A. As a result, the connection-portion-side relay portion 120 can project to the outside of the case main body 70A and be held by the case main body 70A only by the connection-portion-side relay portion 120 being press-fitted into the lower surface opening hole 74 penetrating the case main body 70A, thereby simplifying the structures of the case main body 70A and the connection-portion-side relay portion 120. The connection-portion-side relay portion 66 of the inter-terminal connection structure 10 may be held by the case 70 by being insert-molded in the case main body 70A. This facilitates handling of the connection-portion-side relay portion 66, which is a relatively small component. Therefore, it is possible to improve assembling workability.

Variation 7

Figure 18:
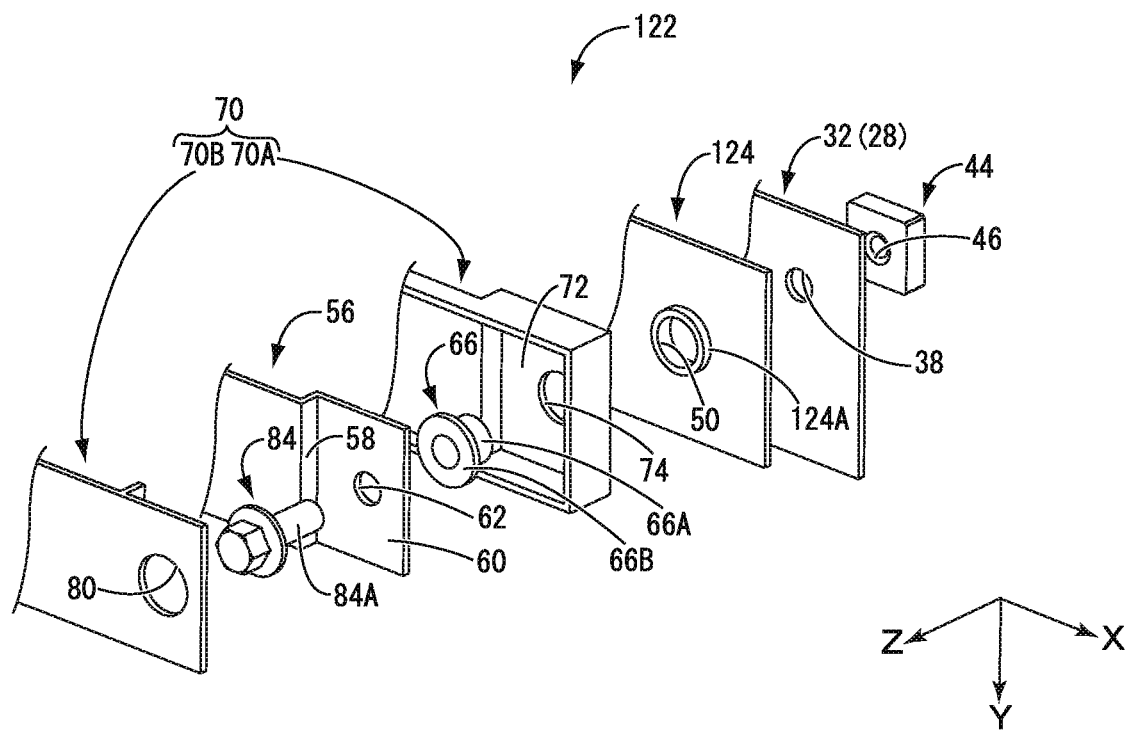
FIG. 18 is an exploded perspective view showing an inter-terminal connection structure according to Variation 7.
Figure 19:
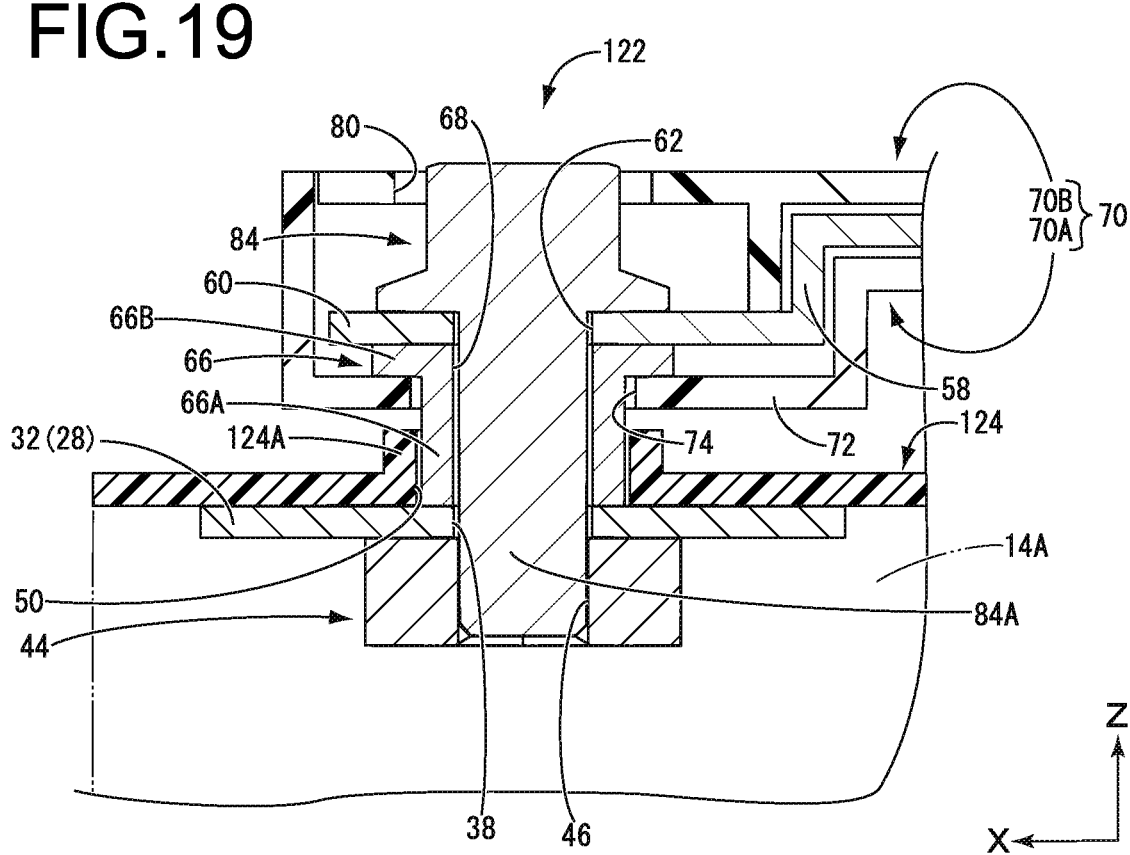
FIG. 19 is an enlarged cross-sectional view in the longitudinal direction (the X direction) of the assembled state of the inter-terminal connection structure shown in FIG. 18.

In the inter-terminal connection structure 10 of Embodiment 1 of the present disclosure, the terminal portion cover 48 comprises the outer peripheral portion 48A constituting the outer peripheral portion of the terminal portion cover 48 and the inner peripheral portion 48B constituting the inner peripheral portion of the terminal portion cover 48, and the outer peripheral portion 48A and the inner peripheral portion 48B define the terminal portion opening window 50 having an annular shape in plan view. However, the shape of the terminal portion opening window 50 is not limited to such an embodiment. For example, in an inter-terminal connection structure 122 of Variation 7 shown in FIGS. 18 and 19, a terminal portion cover 124 has a flat-plate shape and is made of synthetic resin having insulation properties, and includes the terminal portion opening window 50 opening in a circular shape in plan view. The terminal portion opening window 50 opens with such a size as to expose the bolt insertion hole 38 of the terminal portion 32 and the peripheral portion thereof. A cylindrical projecting portion 124A projecting toward the connection-portion-side relay portion 66 is provided to the peripheral edge portion of the terminal portion opening window 50. Since the projecting portion 124A has a height and projects in a direction of separation from the connection terminal 28, the touch of the finger or the like to the connection terminal 28 through the terminal portion opening window 50 is less likely to occur due to the height of the projecting portion 124A. Therefore, by providing the projecting portion 124A, the inner peripheral portion 48B used in the inter-terminal connection structure 10 can be omitted, thereby reducing the number of parts. In the attached state of the inter-terminal connection structure 122, the projecting tip part of the projecting portion 124A is configured so as not to come into contact with the base wall 72 of the case main body 70A. This configuration avoids the situation in which the axial force due to the bolting is dispersed to the terminal portion cover 124 via the projecting portion 124A.

Variation 8

Figure 20:
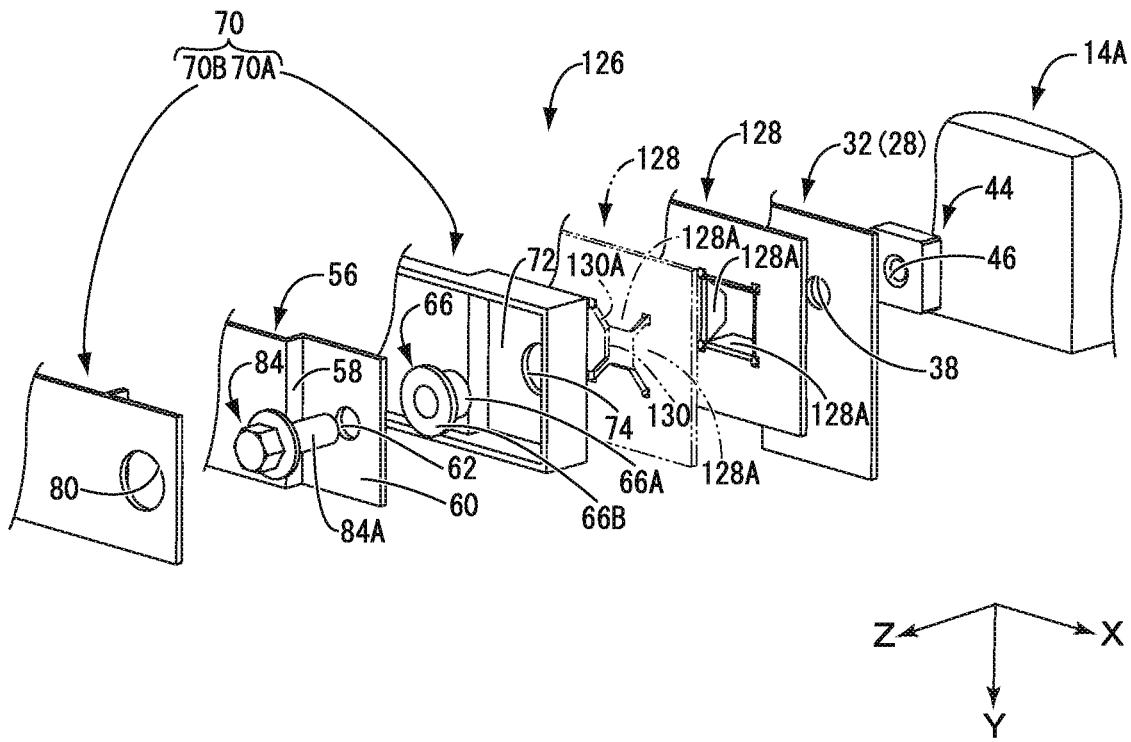
FIG. 20 is an exploded perspective view showing an inter-terminal connection structure according to Variation 8.
Figure 21:
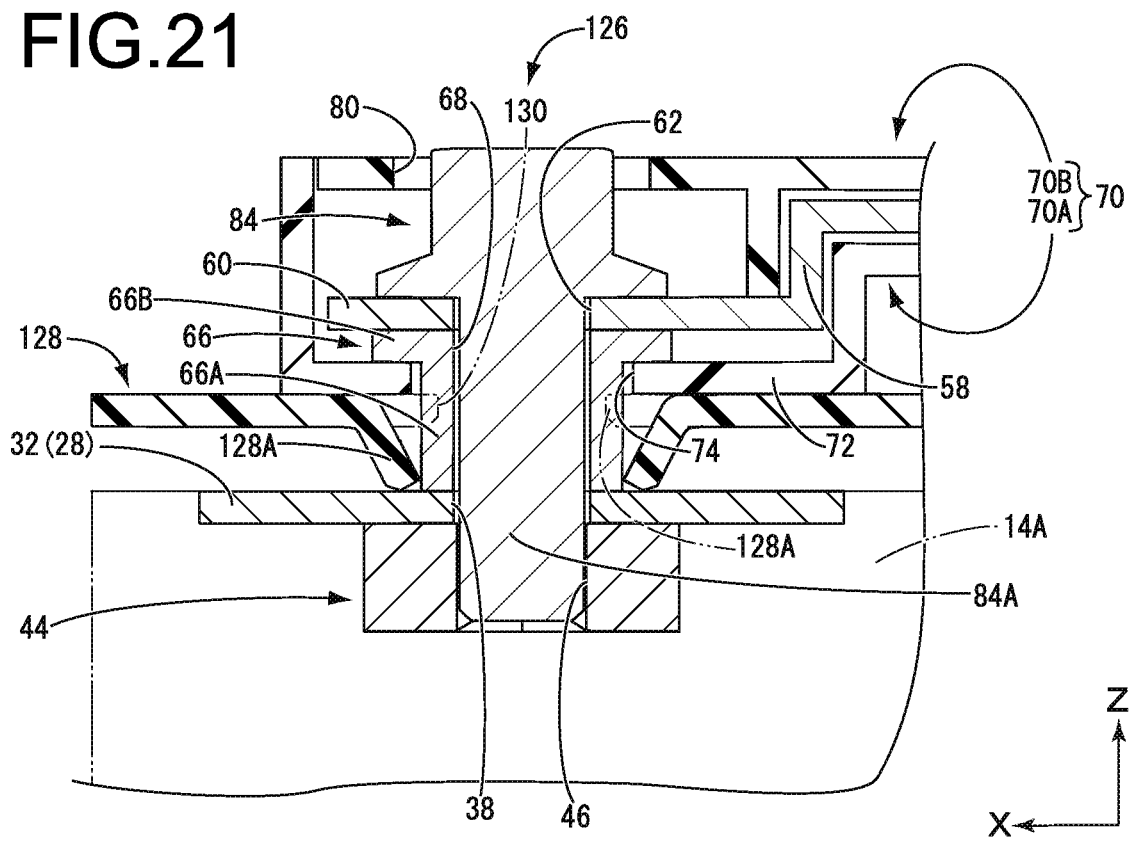
FIG. 21 is an enlarged cross-sectional view in the longitudinal direction (the X direction) of the assembled state of the inter-terminal connection structure shown in FIG. 20.

Furthermore, in an inter-terminal connection structure 126 of Variation 8 shown in FIGS. 20 and 21, the terminal portion cover 128 includes a terminal portion opening window 130 having a rectangular cross-sectional shape, and a slit 130A penetrating the terminal portion cover 128 from the apexes of the terminal portion opening window 130 diagonally outward. With this configuration, the peripheral edge portion of the terminal portion opening window 130 includes four elastic flexible pieces 128A that are elastically deformable in the vertical direction. With the inter-terminal connection structure 126 assembled, the four elastic flexible pieces 128A are elastically deformed by being pressed downward by the tube portion 66A of the connection-portion-side relay portion 66, such that the terminal portion opening window 130 is expanded whereby the tip part of the tube portion 66A of the connection-portion-side relay portion 66 can be conductively connected to the terminal portion 32. In FIGS. 20 and 21, the terminal portion cover 128 before the elastic deformation is shown by the imaginary line, and the terminal portion cover 128 after the elastic deformation is shown by the solid line. Besides, in FIG. 21, the cabinet 14A is shown by the imaginary line. Before the inter-terminal connection structure 126 is assembled, the elastic flexible pieces 128A of the terminal portion cover 128 are not elastically deformed, so that the opening area of the terminal portion opening window 130 can be reduced. Therefore, it is possible to inhibit or prevent the finger from touching the terminal portion 32 with a small number of parts.

Variation 9

Figure 22:
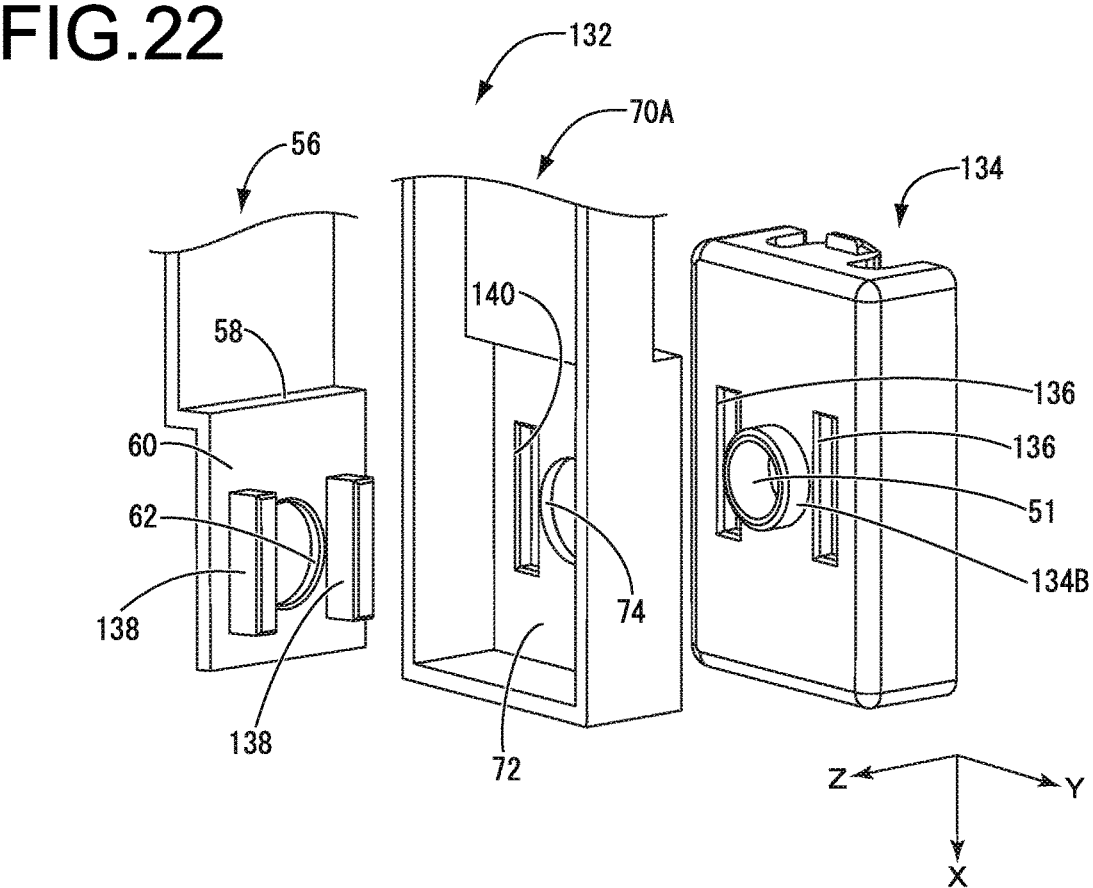
FIG. 22 is an exploded perspective view showing an inter-terminal connection structure according to Variation 9.
Figure 23:
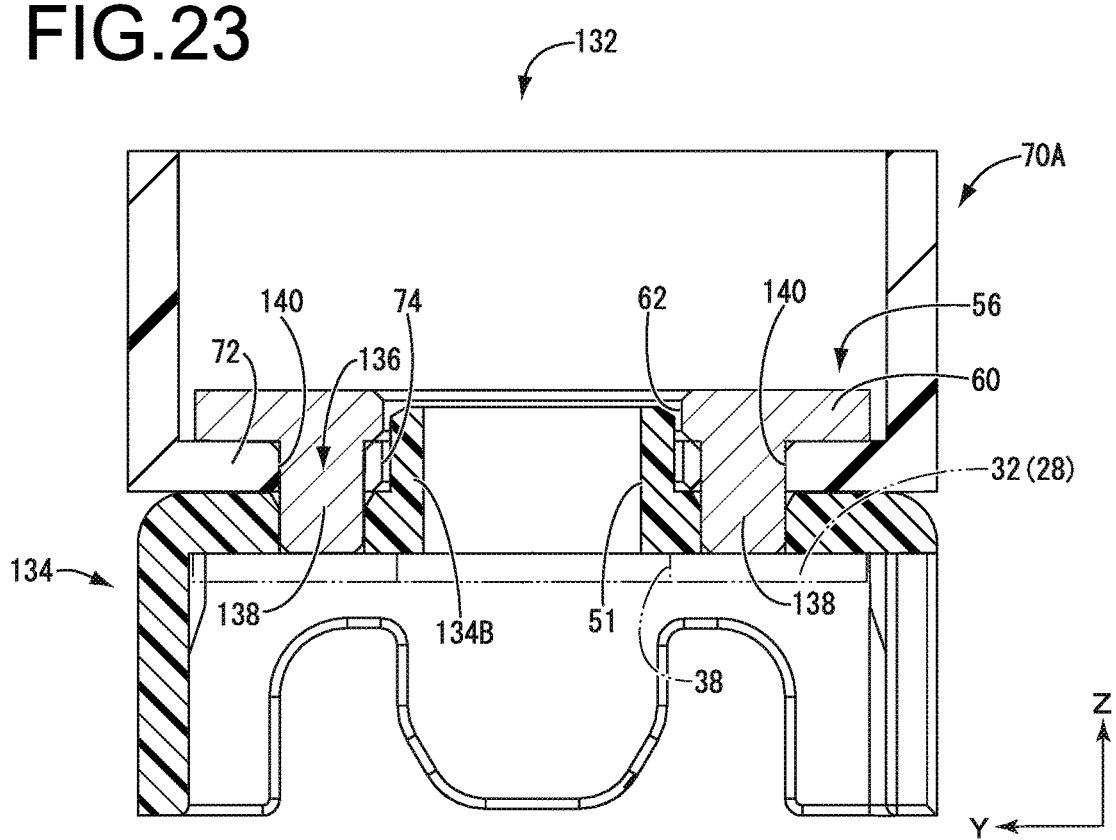
FIG. 23 is an enlarged cross-sectional view in the width direction (the Y direction) of the assembled state of the inter-terminal connection structure shown in FIG. 22.

In the inter-terminal connection structure 10 of Embodiment 1 of the present disclosure, a single connection-portion-side relay portion 66 having a generally cylindrical shape is used, but the shape and number of the connection-portion-side relay portion are not limited to such an embodiment. For example, in an inter-terminal connection structure 132 of Variation 9 shown in FIGS. 22 and 23, in the second-connection-portion-side unit 88 of the bus bar 56, two connection-portion-side relay portions 138 are formed so as to project with a rectangular cross section and to be remote from each other. The base wall 72 of the case main body 70A is penetrated by two through holes 140 through which the two connection-portion-side relay portions 138 are inserted and which are remote from each other. Meanwhile, the terminal portion cover 134 includes two terminal portion opening windows 136 of rectangular shape through which the two connection-portion-side relay portions 138 are inserted and which are remote from each other. In FIG. 22, to facilitate understanding, only the bus bar 56 is rotated so that the back surface side is displayed. Since the plurality of connection-portion-side relay portions 138 can be arranged at a distance from each other in this way, the degree of freedom in arranging the connection-portion-side relay portions 138, selecting the materials thereof, and the like can be improved. The plurality of connection-portion-side relay portions 138 may be provided integrally with the bus bar 56, or may be provided separately therefrom. Besides, in the inter-terminal connection structure 10 in which the terminal portion opening window 50 is provided in an annular shape, it is necessary to provide the inner peripheral portion 48B of the terminal portion cover 48 that covers the inner peripheral surface of the bolt insertion hole 38 of the connection terminal 28 separately from another part of the terminal portion cover 48. In the inter-terminal connection structure 132 of Variation 9, the terminal portion opening windows 136 provided to the terminal portion cover 134 are provided in two rectangular shapes that are remote from each other. Thus, an inner peripheral portion 134B that covers the inner peripheral surface of the bolt insertion hole 38 of the connection terminal 28 from above can be provided integrally with another part of the terminal portion cover 134. This configuration improves the handleability of the inner peripheral portion 134B, which is relatively small.

Variation 10

Figure 24:
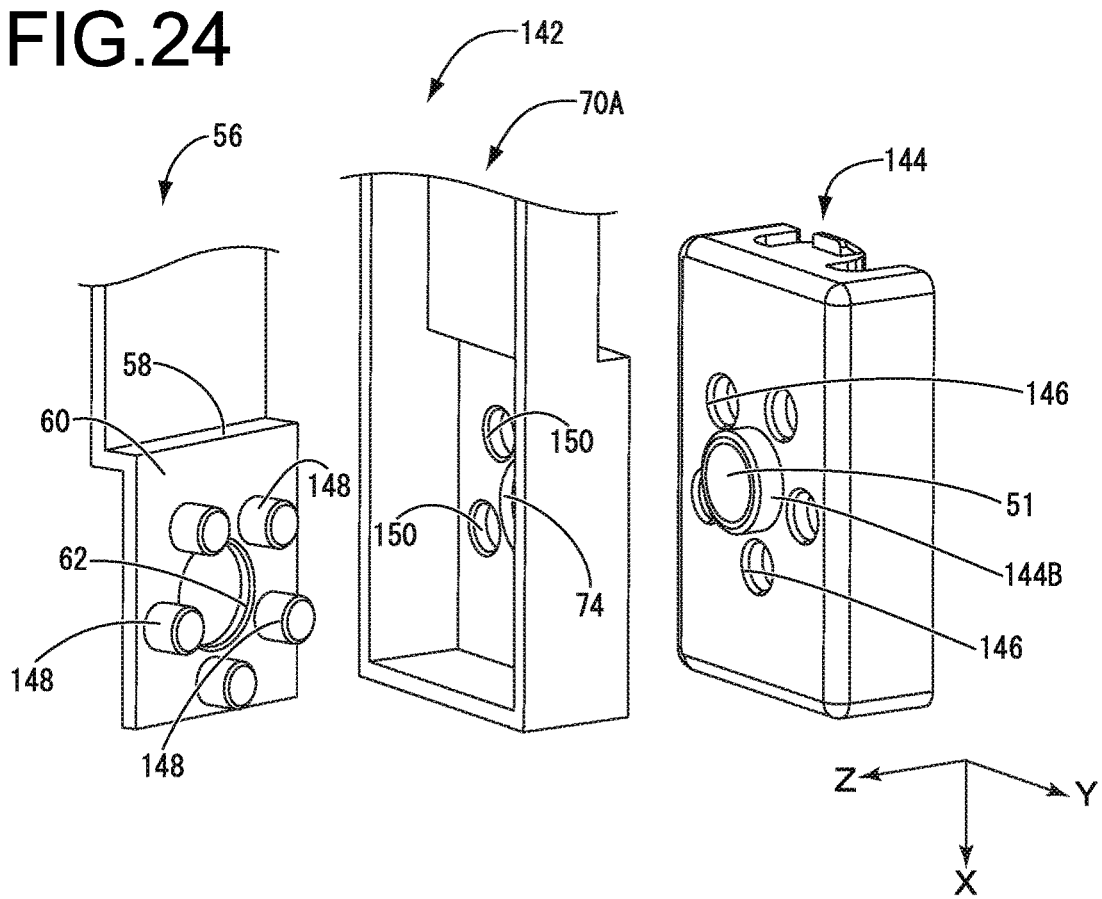
FIG. 24 is an exploded perspective view showing an inter-terminal connection structure according to Variation 10.
Figure 25:
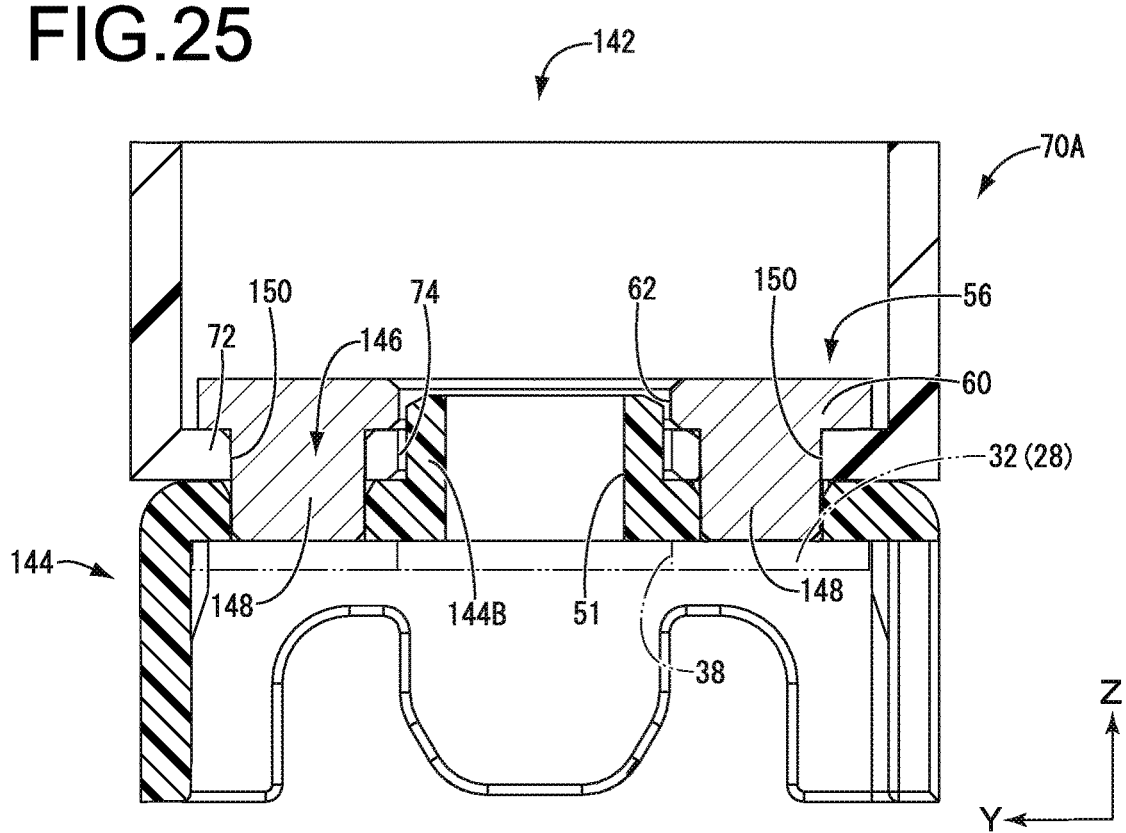
FIG. 25 is an enlarged cross-sectional view in the width direction (the Y direction) of the assembled state of the inter-terminal connection structure shown in FIG. 24.

In an inter-terminal connection structure 142 of Variation 10 shown in FIGS. 24 and 25, in the second-connection-portion-side unit 88 of the bus bar 56, five connection-portion-side relay portions 148 are formed so as to project with a circular cross section and are remote from one another in the circumferential direction of the bolt insertion holes 62. The base wall 72 of the case main body 70A is penetrated by five through holes 150 through which the five connection-portion-side relay portions 148 are inserted, and which are remote from one another. Meanwhile, the terminal portion cover 144 includes five circular terminal portion opening windows 146 of circular shape through which the five connection-portion-side relay portions 148 are inserted and which are remote from one another. In FIG. 24, to facilitate understanding, only the bus bar 56 is rotated so that the back surface side is displayed. In the inter-terminal connection structure 142 as well, degree of freedom in arranging the connection-portion-side relay portions 148, selecting the materials thereof, and the like can be improved. The plurality of connection-portion-side relay portions 148 may be provided integrally with the bus bar 56, or may be provided separately therefrom. Besides, in the terminal portion cover 144, an inner peripheral portion 144B that covers the inner peripheral surface of the bolt insertion hole 38 of the connection terminal 28 from above can be provided integrally with another part of the terminal portion cover 144, thereby reducing the number of parts and improving the handleability.

Variation 11

Figure 26:
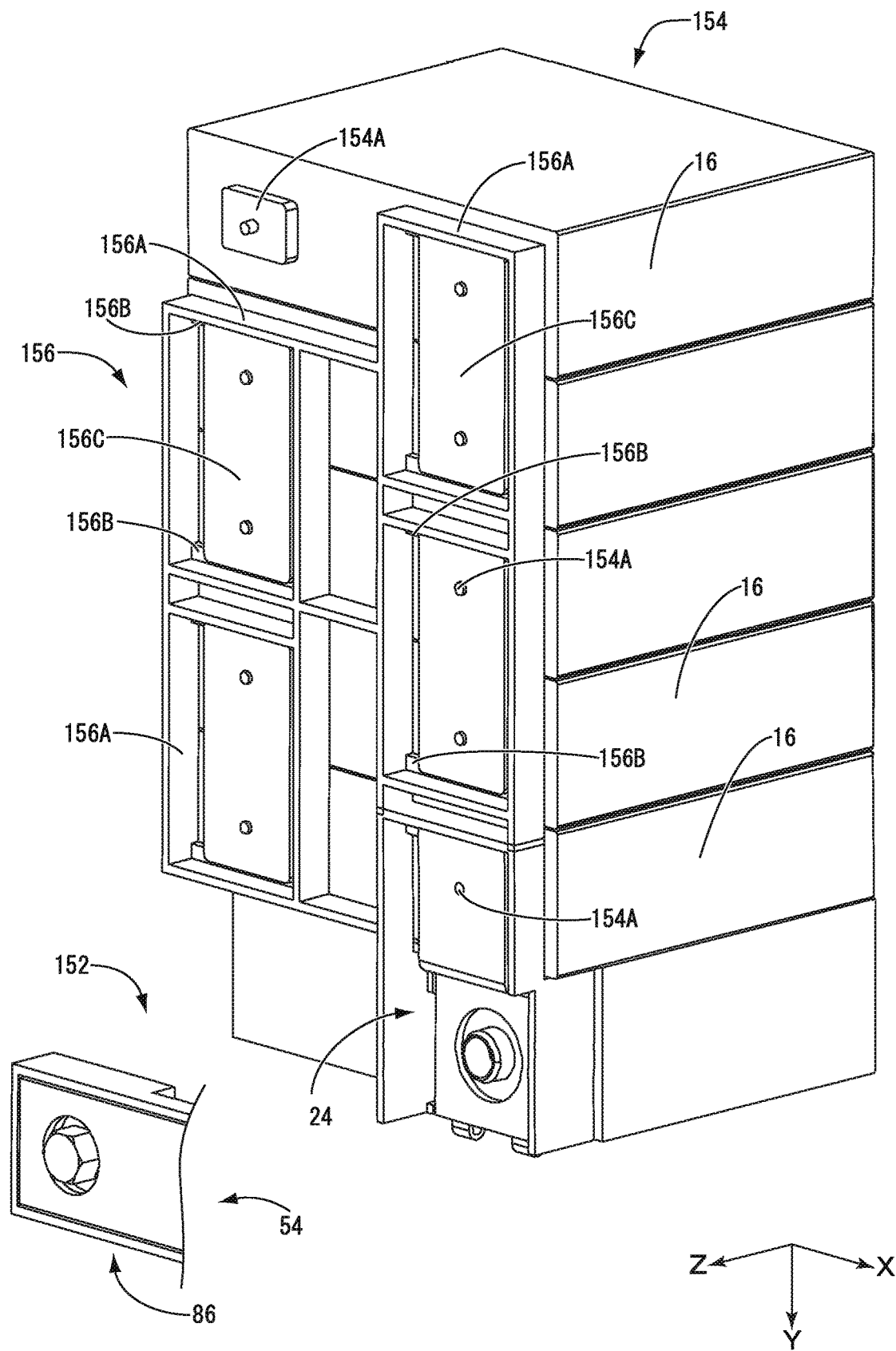
FIG. 26 is an exploded perspective view showing an inter-terminal connection structure according to Variation 11.

The inter-terminal connection structure 10 of Embodiment 1 of the present disclosure illustrates an example in which, the first-terminal-portion-side unit 24 and the second-terminal-portion-side unit 26 that are separately formed are attached to the first battery module 12A and the second battery module 12B, respectively, so as to constitute the inter-terminal connection structure 10. However, like an inter-terminal connection structure 152 of Variation 11 of the present disclosure shown in FIG. 26, the first-terminal-portion-side unit 24 and the second-terminal-portion-side unit 26 may be provided to a bus bar module 156 attached to a battery module 154. The battery module 154 accommodates a plurality of rechargeable cells 16 (five in FIG. 26) in a cabinet (not shown). The bus bar module 156 has a grid-like rectangular frame shape, and includes rectangular frameworks 156A and rectangular, flat plate-shaped bus bar support protrusions 156B each projecting inward from a lower end portion facing in the front-back direction in the corresponding rectangular framework 156A. A rectangular, flat plate-shaped bus bar 156C is arranged in each framework 156A, attached to the battery module 154, and then electrically connected to electrodes 154A of the cells 16. With this arrangement, a plurality of cells 16 are connected in series. Among the electrodes 154A of the plurality of cells 16, the upper left electrode 154A has the lowest voltage (for example, 0V), and the lower right electrode 154A has the highest positive voltage. The upper left electrode 154A is electrically connected to, for example, an external part having the ground voltage by a member (not shown). As shown in FIG. 26, to the lower right electrode 154A, for example, the first-terminal-portion-side unit 24 is attached. In this way, the first-connection-portion-side unit 86 of the conductive component 54 may be connected to the first-terminal-portion-side unit 24 provided to the bus bar module 156.

Variation 12

Figure 27:
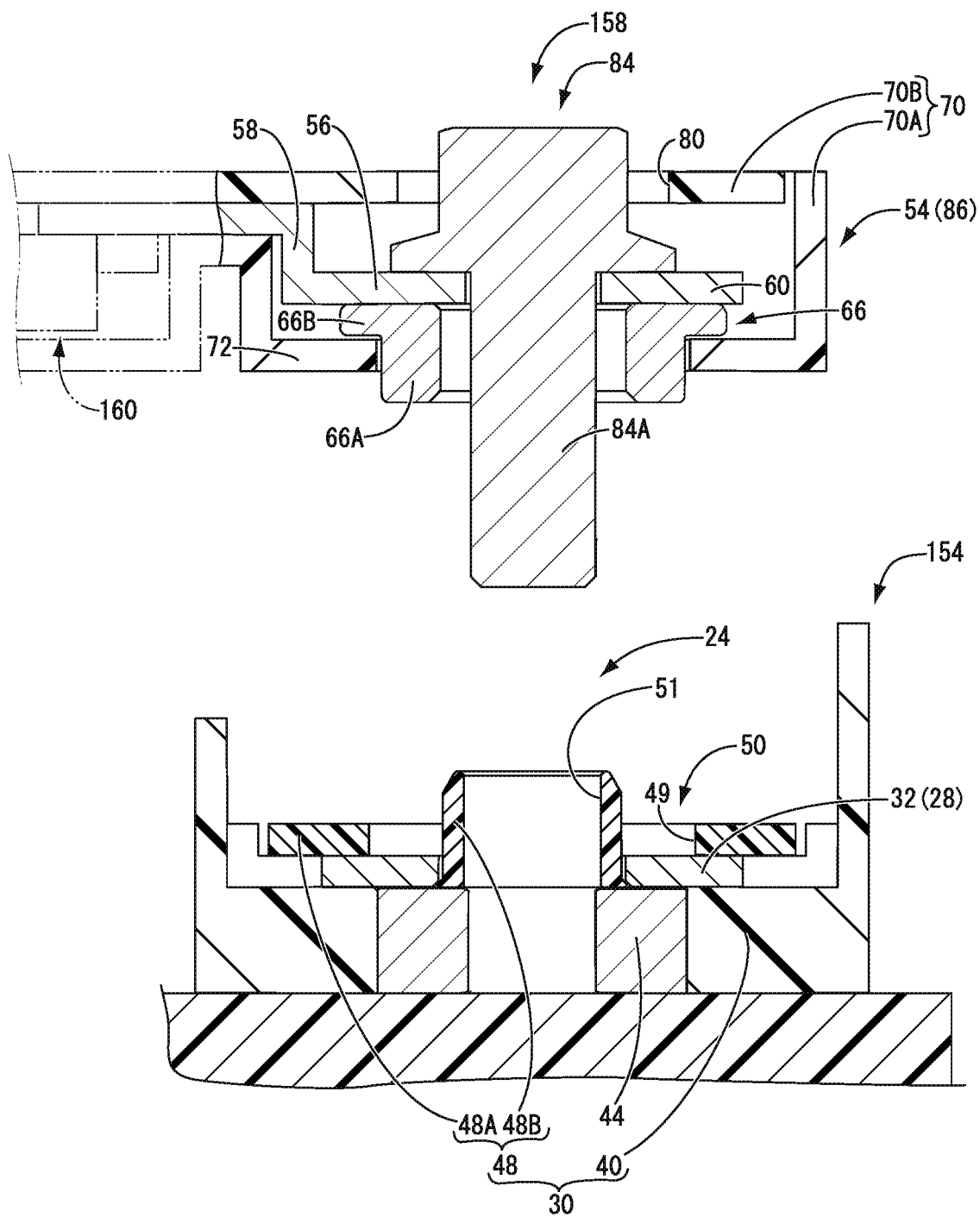
FIG. 27 is an enlarged cross-sectional view in the longitudinal direction (the X direction) showing an inter-terminal connection structure according to Variation 12.

In the above-described Embodiment 1 and Variations 1 to 11 thereof, the conductive component is described by exemplifying a structure in which the bus bar 56 which is the conductive member is accommodated in the cases 70, 106. However, the present disclosure is not limited to such an embodiment. For example, like an inter-terminal connection structure 158 of Variation 12 of the present disclosure shown in FIG. 27, the conductive component can be similarly applied to an inter-terminal connection structure in which the conductive component includes a wire harness 160 having connection portions at the opposite end portions, and the wire harness 160 conductively connects two devices, for example, the terminal portion of the first-terminal-portion-side unit 24 of the battery module 154 and the terminal portion of an external device (not shown). In the inter-terminal connection structure 158 of Variation 12 of the present disclosure shown in FIG. 27, the inter-terminal connection structure 158 of the present disclosure is used as the inter-terminal connection structure in which the wire harness 160 connects the terminal portion 32 of the first-terminal-portion-side unit 24 of the battery module 154 serving as a live portion and the terminal portion of the external device (not shown). That is, in the first-terminal-portion-side unit 24, the terminal portion 32 is held therein in an accommodated state, the terminal portion 32 is covered by the terminal portion cover 48 having insulation properties, and the terminal portion opening window 50 that partially exposes the terminal portion 32 is provided by the terminal portion cover 48. Besides, the connection portion 60 of the first-connection-portion-side unit 86 on one end side of the wire harness 160 connected to the first-terminal-portion-side unit 24 is covered by the case 70 having insulation properties, and the connection-portion-side relay portion 66 provided to the first-connection-portion-side unit 86 projects from the case 70 to the outside. The first-connection-portion-side unit 86 provided to one end portion of the wire harness 160 is bolted to the first-terminal-portion-side unit 24 of the battery module 154, so that the connection-portion-side relay portion 66 provided to the first-connection-portion-side unit 86 is inserted through the terminal portion opening window 50 provided to the first-terminal-portion-side unit 24, and the tube portion 66A of the connection-portion-side relay portion 66 is held in contact with the terminal portion 32 of the first-terminal-portion-side unit 24. With this arrangement, the first-terminal-portion-side unit 24 and the connection portion 60 of the first-connection-portion-side unit 86 of the wire harness 160 are electrically connected via the connection-portion-side relay portion 66. With Variation 12 as well, touch to terminal portion 32 of the first-terminal-portion-side unit 24 of the battery module 154, which is the live portion, can be inhibited or prevented by the terminal portion cover 48. Further, since the connection-portion-side relay portion 66 is provided to the first-connection-portion-side unit 86 of the wire harness 160 connected to the first-terminal-portion-side unit 24 of the battery module 154, the electrical connection between the terminal portion 32 and the connection portion 60 can be realized without problems.

Variation 13

The inter-terminal connection structure shown in the above-described Embodiment 1 and Variations 1 to 12 illustrate examples in which the terminal portions 32, 32 of the first and/or second terminal-portion-side units 24, 26 are covered by the terminal portion cover 48 having insulation properties, so as to take measures against electric shock with respect to the terminal portions 32, 32. However, it would also be possible to take measures against electric shock on the connection portion side by covering the connection portions 60, 60 of the conductive component with a connection portion cover. Specifically, for example, the inter-terminal connection structure 90 (Variation 1) shown in FIG. 8 connects the terminal portion 32 of the first-terminal-portion-side unit 24 of the first battery module 12A and the terminal portion of the junction box 92. Here, when the connection portion 60 of the second-connection-portion-side unit 88 of the conductive component 94, namely a first one of the connection portions, is connected to the terminal portion 32 of the first-terminal-portion-side unit 24, namely a first one of the terminal portions, the connection portion 60 of the first-connection-portion-side unit 86, namely a second one of the connection portions before connection to the terminal portion of the junction box 92, namely a second one of the terminal portions, becomes a live portion. Therefore, with reference to FIGS. 28 to 33, description will be given in detail below about Variation 13, in which measures against electric shock are taken with respect to the connection portion 60 of the first-connection-portion-side unit 86 of the conductive component 94 shown in FIG. 8, which can be a live portion and is connected to the terminal portion 32 of the junction box 92. In an inter-terminal connection structure 162 of Variation 13, the connection portion 60 of a first-connection-portion-side unit 164 of a conductive component 163 is covered by the base wall 72 of a case main body 174A of an end portion case 174 that constitutes the connection portion cover serving as an insulating cover described later, so as to take measures against electric shock with respect to the connection portion 60. Described more specifically, the connection portion 60 of the first-connection-portion-side unit 164 of the conductive component 163 is connected to a terminal portion 187 provided to a first-terminal-portion-side unit 168 of the junction box 92, serves as a live portion with a second-connection-portion-side unit (not shown) of the conductive component 163 connected to the terminal portion 32 of the battery module 12 or the like shown in FIG. 8. The conductive component 163 includes a bus bar 170 constituting the conductive member and the end portion case 174 covering the connection portions 60, 60 provided to the bus bar 170. The end portion case 174 accommodates a nut 172 having an insulating covering 171 thereon.

Bus Bar 170

The bus bar 170 constituting the conductive member comprises a plate-shaped metal such as copper, copper alloy, aluminum, or aluminum alloy. The bus bar 170 includes the connection portions 60, 60 having the same shape formed at the opposite end portions in the longitudinal direction thereof, a generally elliptical bolt insertion hole 62 whose major axis is aligned with the longitudinal direction and which is provided in the center, and positioning concave portions 64 formed on the opposite sides in the width direction thereof. In Variation 13 of the present disclosure, the case having insulation properties that accommodates the bus bar 170 includes an insulating covering 175 that covers the intermediate portion in the longitudinal direction of the bus bar 170, and the end portion case 174 that covers the connection portion 60. Therefore, the case having insulation properties that accommodates the bus bar 170 can be provided more compactly and at a lower cost in comparison with the case where the case that accommodates the entire bus bar 170. Besides, it is sufficient to attach the end portion case 174 only to the end portion of the bus bar 170, thereby improving workability in comparison with the case where the bus bar 170 is accommodated in an elongated case.

End Portion Case 174

Figure 30:
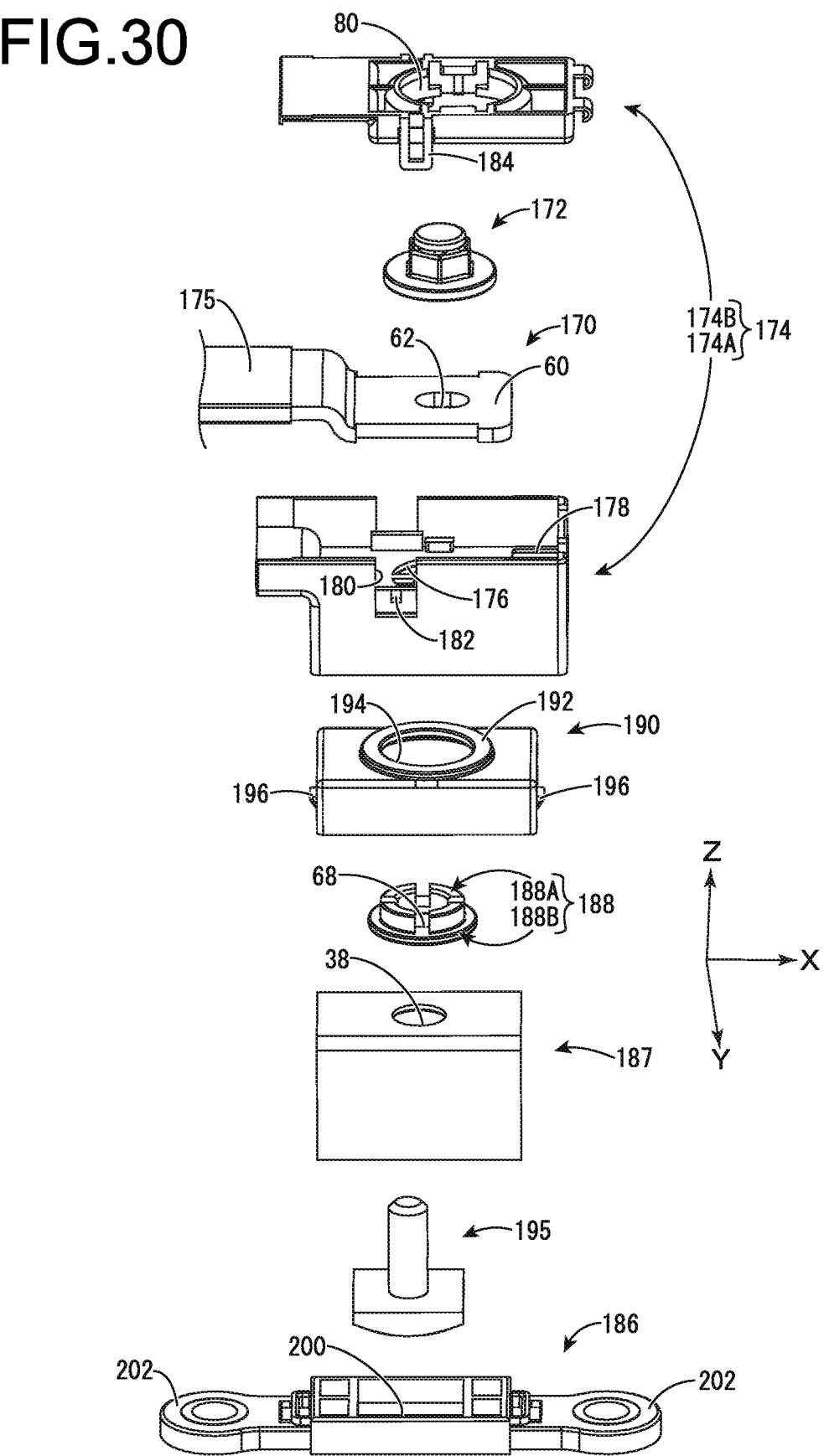
FIG. 30 is an exploded perspective view of the inter-terminal connection structure shown in FIG. 28.
Figure 31:
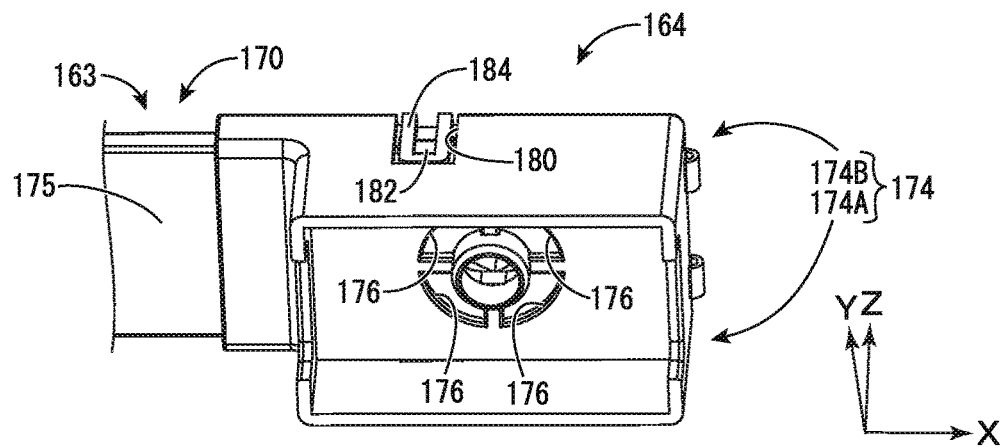
FIG. 31 is a perspective view of the connection portion of the inter-terminal connection structure shown in FIG. 28 as viewed from below.
Figure 32:
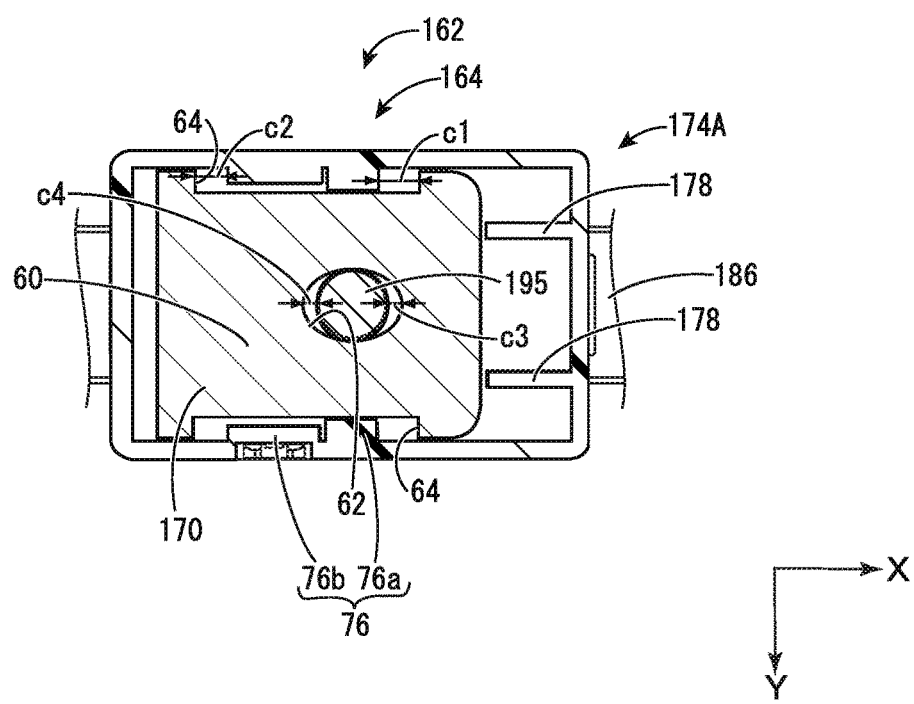
FIG. 32 is a cross-sectional view seen from above when the connection portion of the inter-terminal connection structure shown in FIG. 28 is cut in the horizontal direction.

As shown in FIG. 30, for example, the end portion case 174 having insulation properties that accommodates the connection portion 60 of the bus bar 170 includes the case main body 174A and a lid body 174B.

Both the case main body 174A and the lid body 174B are made of synthetic resin having insulation properties and are formed separately from each other. The case main body 174A and the lid body 174B may be integrally formed. In Variation 13, description will be given about the case where the end portion case 174 is provided to the first-connection-portion-side unit 164, but it would also be possible to provide the end portion case 174 to the second-connection-portion-side unit 88 as explained in Variations 14 and 15 described later.

Figure 33:
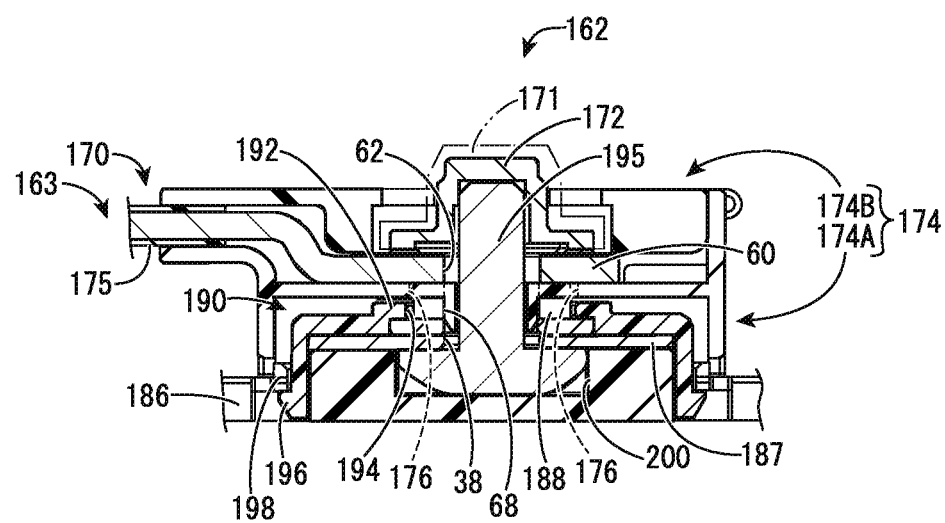
FIG. 33 is a cross-sectional view in the length direction (the X direction) of the inter-terminal connection structure shown in FIG. 28.
Figure 34:
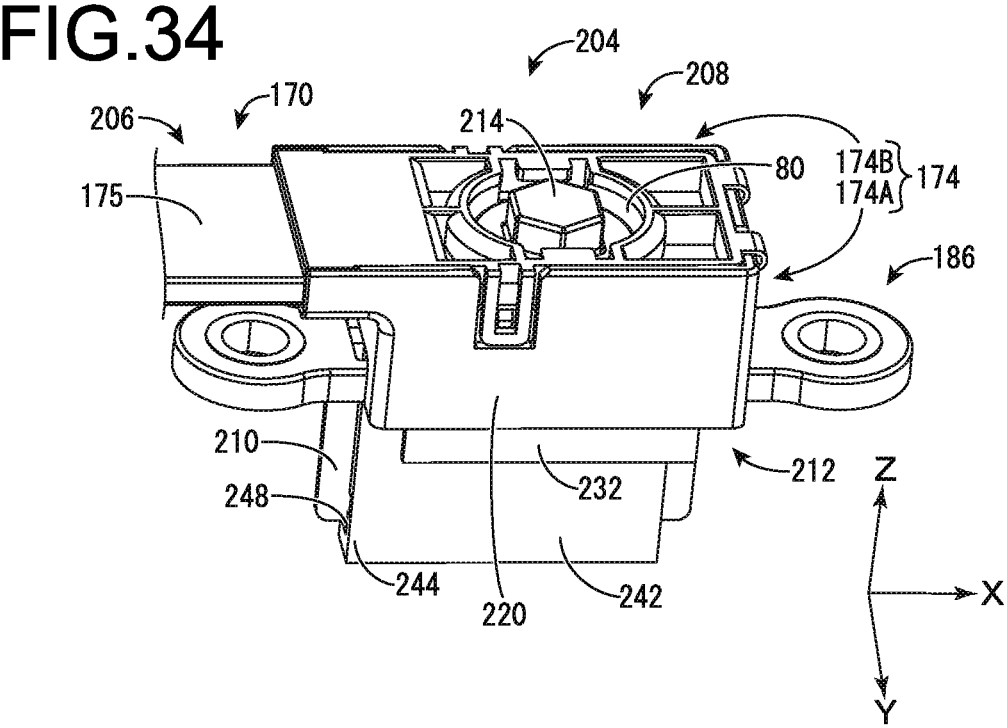
FIG. 34 is an overall perspective view showing an inter-terminal connection structure according to Variation 14.
Figure 35:
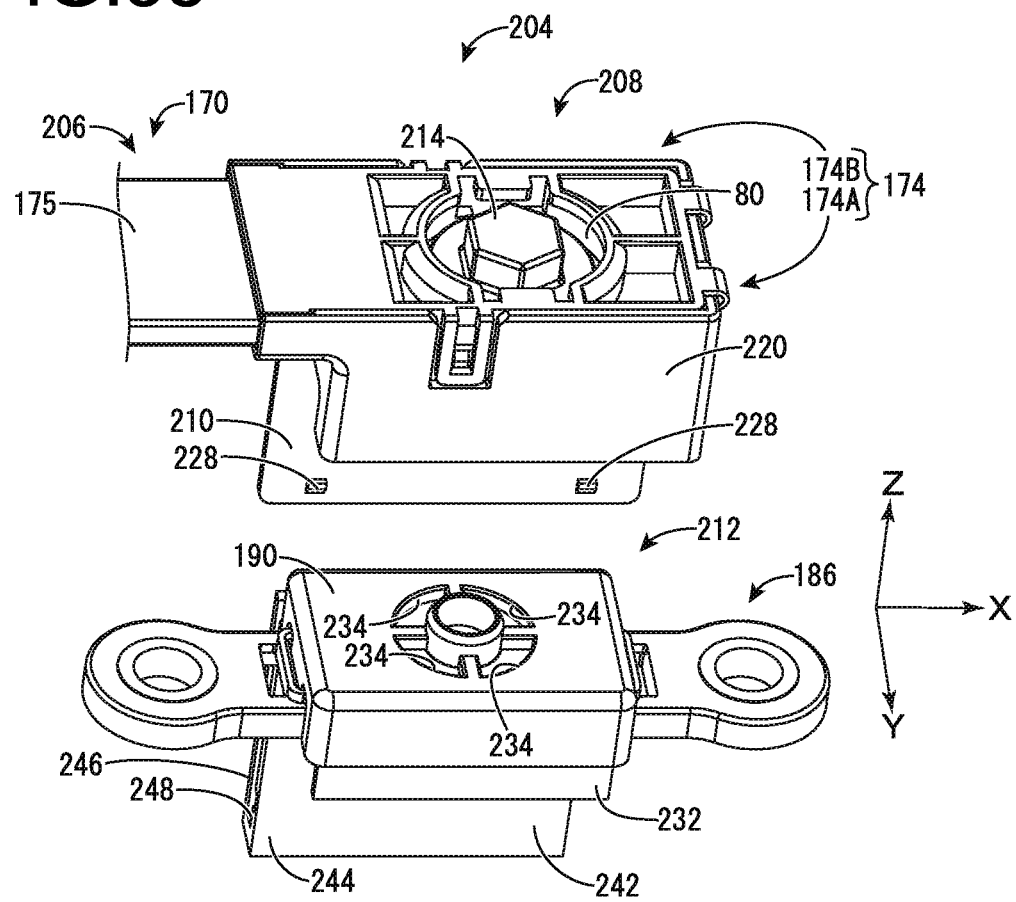
FIG. 35 is an exploded perspective view in which the inter-terminal connection structure shown in FIG. 34 is disassembled into a terminal portion and a connection portion.

The case main body 174A has a generally rectangular box shape extending in the longitudinal direction, and one end portion in the longitudinal direction (the left end portion in FIG. 30) is made shallow depending on the shape of the bus bar 170 accommodated therein. Connection portion opening windows 176 serving as the opening windows are formed in the central portion of the base wall 72 of the case main body 174A in the longitudinal direction at four locations that are remote from one another in the circumferential direction (see FIG. 31). The connection portion opening windows 176 are provided for a tube portion 188A of a terminal-portion-side relay portion 188, which will be described later, to be inserted therethrough and connected to the bus bar 170. Positioning protrusions 76a, 76b engaging with the positioning concave portions 64 of the bus bar 170 are formed on the opposite sides in the width direction of the base wall 72 of the case main body 174A so as to project inward. Besides, on one side in the longitudinal direction of the base wall 72 (the right side in FIG. 32), two positioning ridges 178 are formed so as to be remote from each other in the width direction and extend toward the other side in the longitudinal direction (the left side in FIG. 32). Since gaps c1, c2 are formed in the longitudinal direction between the positioning concave portions 64 of the bus bar 170 and the positioning protrusions 76a, 76b, displacement of the case main body 174A with respect to the bus bar 170 in the longitudinal direction of the bus bar 170 is permitted. That is, the displacement end of the case main body 174A with respect to the bus bar 170 to the left, which is one side in the longitudinal direction of the bus bar 170, is defined by contact of the positioning concave portion 64 with the positioning protrusion 76 provided to the case main body 174A. Meanwhile, the displacement end of the case main body 174A with respect to the bus bar 170 to the right, which is the other side in the longitudinal direction of the bus bar 170, is defined by contact of the edge portion of the bus bar 170 with the positioning ridge 178 provided to the case main body 174A. In this way, the case main body 174A is attached to the bus bar 170 displaceably in the longitudinal direction of the bus bar 170. Furthermore, the bolt insertion hole 62 penetrating the connection portion 60 of the bus bar 170 has an elongated hole shape that is elongated in the longitudinal direction of the bus bar 170, and includes displacement permitting gaps c3, c4 provided on the opposite sides of a bolt 195 inserted through the bolt insertion hole 62 while permitting displacement of the end portion case 174 with respect to the bus bar 170 in the longitudinal direction. Moreover, as shown in FIG. 33, the nut 172 is held and accommodated in the end portion case 174. With this arrangement, the nut 172, together with the end portion case 174, is displaceable with respect to the bus bar 170 in the longitudinal direction. Therefore, by displacing the end portion case 174 in the longitudinal direction of the bus bar 170 with respect to a bolt 195 and the terminal-portion-side relay portion 188 projecting from the first-terminal-portion-side unit 168, which will be described later, and aligning the bolt 195 and the terminal-portion-side relay portion 188 with the bolt insertion hole 62 and the connection portion opening window 176, the tolerance of the distance between the first and second terminal-portion-side units 168, 26 can be advantageously absorbed, thereby facilitating connection between the terminal portions 187, 32. In addition, notched portions 180 opening upward are formed at the opposite end portions in the width direction of the central portion in the longitudinal direction of the case main body 174A, and an engaging projection portion 182 projecting outward is provided to the lower end portion of the corresponding notched portion 180.

As shown in FIG. 30, the lid body 174B constituting the upper surface of the end portion case 174 has a rectangular box shape that extends in the longitudinal direction and opens downward overall. The upper surface opening portion 80 is formed at the central portion in the longitudinal direction of the lid body 174B, where the nut 172 and the tip part of the bolt 195 fastened to the nut 172 is positioned. In the present Variation, the nut 172 has a bag shape including a wall portion that covers the tip part of the bolt 195, and the surface of the nut 172 has an insulating covering thereon shown in FIG. 33. The insulating covering 171 is formed, for example, by means of fluororesin coating, nylon powder coating, or the like. Besides, engaging frameworks 184 extending downward are formed at the opposite end portions in the width direction of the central portion in the longitudinal direction of the lid body 174B, and by engaging the engaging framework 184 with the engaging projection portion 182 of the case main body 174A, the lid body 174B is configured to be fixed to the case main body 174A in an attached state.

First-Terminal-Portion-Side Unit 168

As shown in FIG. 30, the first-terminal-portion-side unit 168 includes a bolt 195, a holder 186 that holds the head portion of the bolt 195, a terminal portion 187 connected to a circuit on the downstream side, the terminal-portion-side relay portion 188 serving as the relay portion, and an insulating cover 190 having insulation properties that covers the terminal portion 187 and the terminal-portion-side relay portion 188. The terminal portion 187 comprises a plate-shaped metal such as copper, copper alloy, aluminum, or aluminum alloy, and has a shape in which the intermediate portion in the width direction is bent in an L shape, while being penetrated by the bolt insertion hole 38.

Terminal-Portion-Side Relay Portion 188

As shown in FIG. 30, the terminal-portion-side relay portion 188 is constituted by an annular metal member, and is made of, for example, a metal such as copper, copper alloy, aluminum, aluminum alloy, and iron. The terminal-portion-side relay portion 188 includes a generally cylindrical tube portion 188A and a flange portion 188B projecting to the outer peripheral side from the lower end portion of the tube portion 188A in a flange shape, and the inside of the terminal-portion-side relay portion 188 serves as the bolt insertion hole 68 through which the screw portion of the bolt 195 is inserted. The tube portion 188A is divided into four in the circumferential direction by a slit formed in the axial direction. The flange portion 188B projects from the lower side in the axial direction of the bolt insertion hole 68 in a stepped shape with a constant dimension about the entire circumference of the outer wall of the terminal-portion-side relay portion 188. By the flange portion 188B coming into contact with the peripheral edge portion of the through hole of the insulating cover 190, which will be described later, the terminal-portion-side relay portion 188 is prevented from being detached from the insulating cover 190.

The shape of the terminal-portion-side relay portion 188 is not limited to the illustrated one, but any shape can be adopted. For example, the terminal-portion-side relay portion 188 and the connection terminal 28 may be integrally formed. Alternatively, the terminal-portion-side relay portion 188 may be held by the insulating cover 190 by being press-fitted into the through hole penetrating the insulating cover 190. Further, a plurality of terminal-portion-side relay portions 188 may project from the connection terminal 28 so as to be remote from each other.

Insulating Cover 190

As shown in FIG. 30, the insulating cover 190 having insulation properties has a generally rectangular box shape overall, and a through hole is formed in the central portion of the upper surface of the insulating cover 190. The peripheral edge portion of the through hole projects upward, then extends inward to form a cylindrical tube portion 192 having an opening window 194 in its central portion. The flange portion 188B of the terminal-portion-side relay portion 188 is accommodated and stably held in the tube portion 192, and the tube portion 188A is inserted through the opening window 194 of the tube portion 192 to be exposed upward. A fixing bolt 195 is arranged below the terminal-portion-side relay portion 188, and the screw portion of the bolt 195 is inserted through the inner hole of the terminal-portion-side relay portion 188 to project upward. Besides, engaging protrusions 196 project outward from the lower end portions of the outer walls on the opposite sides in the longitudinal direction of the insulating cover 190. The engaging protrusions 196 engage with engage target portions 198 of the holder 186, so that the first-terminal-portion-side unit 168 is held in an attached state. The holder 186 has a generally band-like flat-plate shape extending in the longitudinal direction. The holder 186 includes an accommodating recess 200 that opens upward in its central portion for holding the head portion of the bolt 84, and fixing portions 202 provided at the opposite end portions in the longitudinal direction thereof for fixing the holder 186.

Assembly of the Inter-Terminal Connection Structure 162 of Variation 13 of the Present Disclosure First, the connection portion 60 of the bus bar 170 is accommodated in the case main body 174A, the positioning protrusion 76 of the case main body 174A is arranged in the positioning concave portion 64 of the bus bar 170, and the end portion in the longitudinal direction of the bus bar 170 is arranged so as to be located short of the positioning ridges 178 of the case main body 174A. Next, with the screw hole of the nut 172 aligned with the center of the bolt insertion hole 62 of the bus bar 170, the case main body 174A is covered by the lid body 174B, thereby holding the nut 172 in the upper surface opening portion 80 of the lid body 174B in a stably arranged state. This arrangement completes the first-connection-portion-side unit 164 of the conductive component 163. Subsequently, the holder 186 is prepared, the head portion of the bolt 195 is held in the accommodating recess 200 of the holder 186, and the screw portion of the bolt 195 is inserted into the bolt insertion hole 38 of the terminal portion 187, so that the terminal portion 187 is placed on the head portion of the bolt 195. Subsequently, the bolt insertion hole 68 of the terminal-portion-side relay portion 188 is aligned and arranged on the bolt insertion hole 38, and the insulating cover 190 is overlapped from above so that these members are stably accommodated between the insulating cover 190 and the holder 186. This arrangement completes the first-terminal-portion-side unit 168. Finally, by attaching the first-connection-portion-side unit 164 to the first-terminal-portion-side unit 168, the connection portion 60 of the conductive component 163 and the terminal portion 187 are conductively connected via the terminal-portion-side relay portion 188, thereby completing one connection of the inter-terminal connection structure 162. The other connection is the same as that of Embodiment 1 and Variations 1 to 12 described above, so that descriptions will be omitted. As a result, the connection portion 60 of the first-connection-portion-side unit 164, which is the second one of the two connection portions, is covered by the base wall of the case main body 174A of the end portion case 174, which is the connection portion cover having insulation properties, and is partially exposed via the connection portion opening window 176 provided to the base wall. The terminal-portion-side relay portion 188 connected to the terminal portion 187 is provided to the first-terminal-portion-side unit 168, which includes the terminal portion 187 to be fastened to the connection portion 60 covered by the base wall of the case main body 174A, so that the terminal-portion-side relay portion 188 is inserted through the connection portion opening window 176 to be connected to the connection portion 60.

Next, the working effects of the present Variation 13 will be described. According to the present Variation 13, it is assumed that the connection portion 60 of the second-connection-portion-side unit (not shown) of the conductive component 163 is connected to the terminal portion 32 of the first-terminal-portion-side unit 24 of the first battery module 12A shown in FIG. 8. Here, since the terminal portion 32 of the first-terminal-portion-side unit 24 of the first battery module 12A, which serves as a live portion, is covered by the terminal portion cover 48 as shown in Embodiment 1, touch of the operator or the like to the terminal portion 32 can be inhibited, thereby realizing the required measures against electric shock. The connection portion 60 of the first-connection-portion-side unit 164 of the conductive component 163 becomes a live portion after the connection portion 60 of the second-connection-portion-side unit (not shown) is fastened to the terminal portion 32 of the first-terminal-portion-side unit 24 of the first battery module 12A. In the present Variation, since the connection portion 60 of the first-connection-portion-side unit 164 is covered by the connection portion cover constituted by the base wall of the case main body 174A, it is possible inhibit the operator or the like from touching the connection portion 60 serving as the live portion. This makes it possible to perform the fastening work between the two terminal portions 187, 32 by the conductive component 163 under better measures against electric shock.

Besides, in the first-connection-portion-side unit 164 of the conductive component 163, the nut 172 for fastening is accommodated in the end portion case 174. In the first-terminal-portion-side unit 168, both the bolt 195 for fastening and the terminal-portion-side relay portion 188 are arranged and accommodated below the opening window 194 of the insulating cover 190. With this arrangement, the first-terminal-portion-side unit 168 and the first-connection-portion-side unit 164 can be unitized including components for fastening, thereby advantageously improving handleability of the components and workability. In particular, in the longitudinal direction of the bus bar 170, the end portion case 174 is displaceably attached to the bus bar 170, and the bolt insertion hole 62 penetrating the connection portion 60 of the bus bar 170 includes the displacement permitting gaps c3, c4 permitting displacement of the end portion case 174 and the nut 172 accommodated therein with respect to the bus bar 170 in the longitudinal direction. Therefore, when fastening the connection portion 60 and the terminal portion 187 using the bolt 195 and the nut 172, the tolerance of the remote distance between the two terminal portions 32, 187 can be easily absorbed by the displacement of the end portion case 174 with respect to the bus bar 170. Furthermore, since the nut 172 located in the upper surface opening portion 80 of the end portion case 174 has an insulating covering thereon, measures to prevent electric shock on the upper surface side of the end portion case 174 are compatibly achieved. In addition, the terminal portion 187 is covered by the insulating cover 190, and the tip part of the bolt 195 and the tip part of the terminal-portion-side relay portion 188 project through the opening window 194 of the insulating cover 190. Measures against electric shock are taken by providing to the terminal portion or the like of the electrical junction box connected to the battery module 12 which does not serve as a live portion.

Variation 14

Next, Variation 14 will be described with reference to FIGS. 34 to 39 in which, in the inter-terminal connection structure of the present disclosure shown in the above-described Embodiment 1 and Variations 1 to 13 thereof, the case of the conductive component is provided with a connection blocking portion 210 described later that blocks the connection to the terminal portion. The following description indicates an example in which the connection blocking portion 210 is provided on one connection portion side of the conductive component. However, a similar connection blocking portion 210 may also be provided on the other connection portion side of the conductive component. That is, in an inter-terminal connection structure 204 of Variation 14, the connection blocking portion 210 is provided to a connection-portion-side unit 208 including the connection portion 60, which is one connection portion of the conductive component 206. In a conductive component 206 of Variation 14, similarly to Variation 13, the case of the conductive component 206 includes the insulating covering 175 covering the intermediate portion in the longitudinal direction of the bus bar 170 that constitutes the conductive member, and the end portion case 174 covering the connection portion 60 provided to one end portion of the bus bar 170. Further, a terminal-portion-side unit 212 to which the connection-portion-side unit 208 of the conductive component 206 is attached also has a structure similar to that of the first-terminal-portion-side unit 168 shown in Variation 13. Therefore, the same structures as those of Embodiment 1 and Variations 1 to 13 thereof will be designated by the same reference numerals in the drawings, and detailed description thereof will be omitted.

Connection-Portion-Side Unit 208

The end portion case 174 accommodating the connection portion 60 of the conductive component 206 is displaceable with respect to the bus bar 170 in the longitudinal direction of the bus bar 170, which is the same as the Variation 13. However, Variation 14 is different in the point that a bolt 214 and a connection-portion-side relay portion 216 serving as the relay portion are accommodated and held inside the end portion case 174. The bolt 214 and the connection-portion-side relay portion 216, together with the end portion case 174, are displaceable with respect to the bus bar 170 in the longitudinal direction. The lower surface opening hole 74 penetrates the base wall of the case main body 174A in the plate thickness direction. The connection-portion-side relay portion 216 is constituted by an annular metal member, and includes a generally cylindrical tube portion 216A and a flange portion 216B projecting to the outer peripheral side from the upper end portion of the tube portion 216A in a flange shape. The inside of the connection-portion-side relay portion 216 serves as a bolt insertion hole 218 through which a screw portion 214A of the bolt 214 is inserted. The tube portion 216A is divided into four in the circumferential direction by a slit formed in the axial direction. With this arrangement, the tip part of the connection-portion-side relay portion 216 and the tip part of the bolt 214 accommodated and held in the end portion case 174 project to the outside through the lower surface opening hole 74 and the bolt insertion hole 218. The head portion of the bolt 214 having an insulating covering thereon is exposed via the upper surface opening portion 80 provided to the lid body 174B of the end portion case 174, and a tool for fastening the bolt can be connected to the head portion of the bolt 214.

Figure 36:
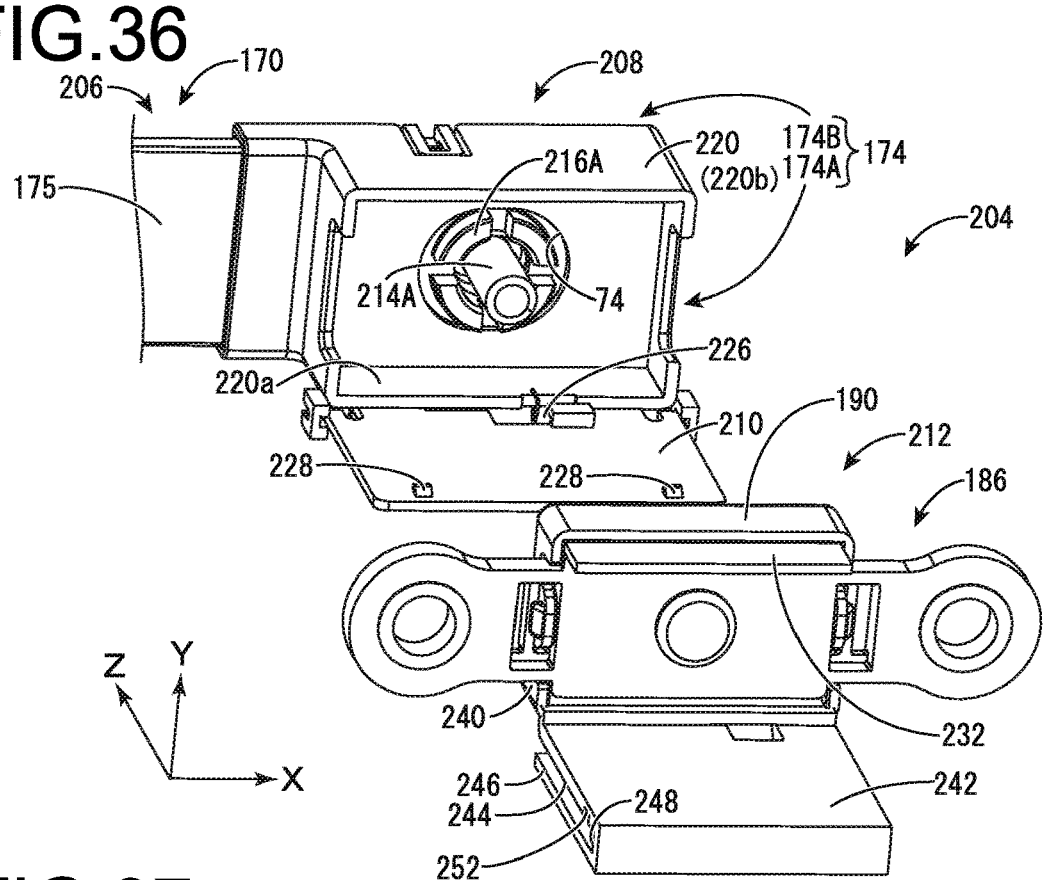
FIG. 36 is a perspective view of the inter-terminal connection structure shown in FIG. 35 as viewed from below.
Figure 37:
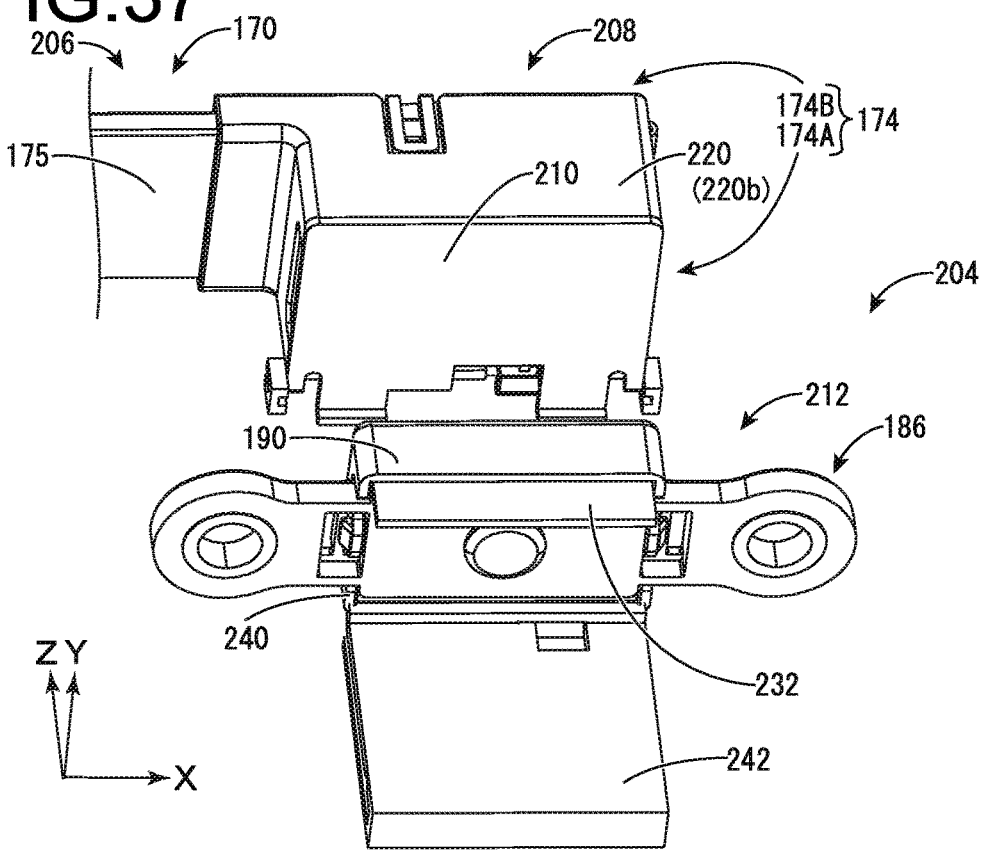
FIG. 37 is a perspective view of the inter-terminal connection structure shown in FIG. 36, showing a state in which a shutter is closed.
Figure 38:
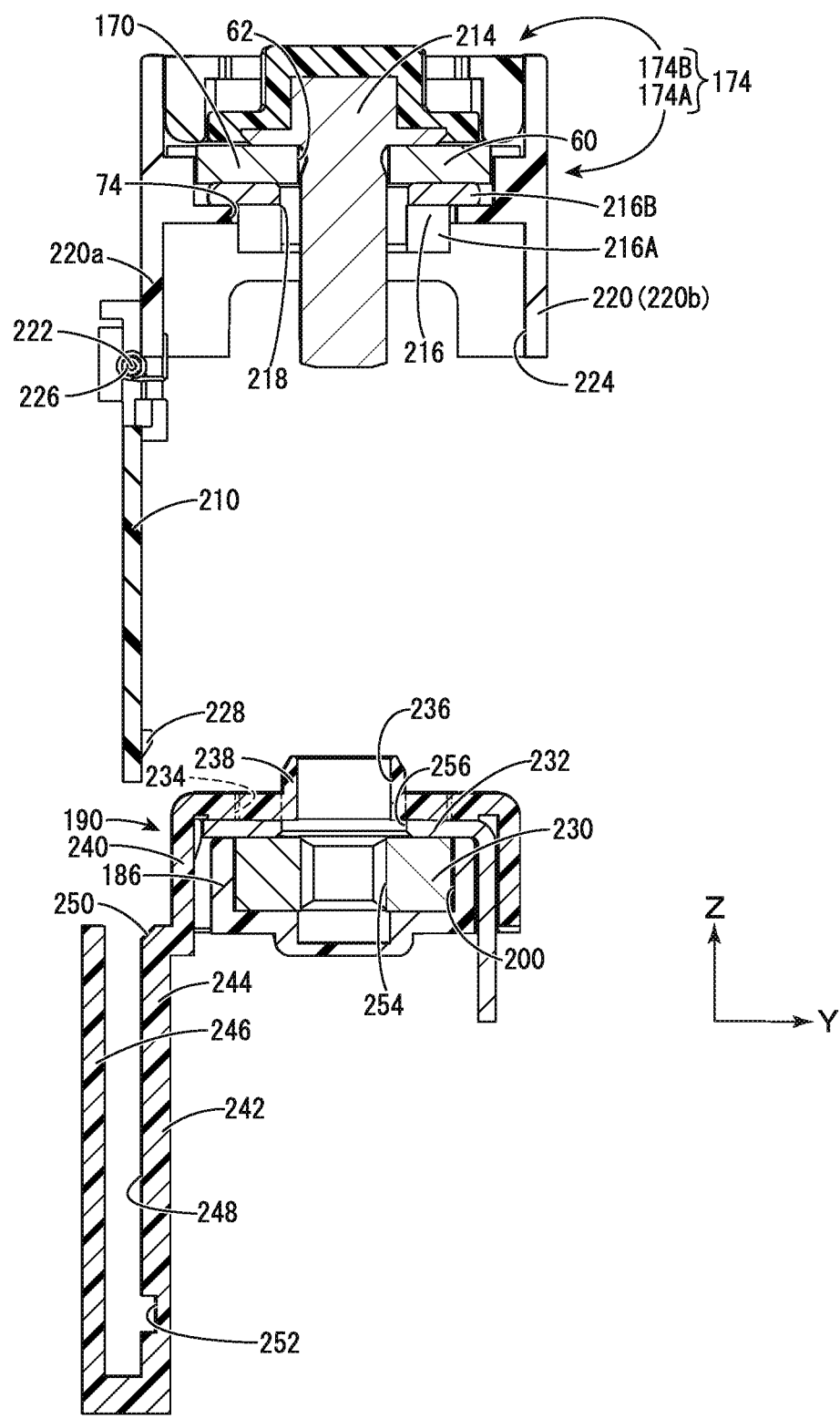
FIG. 38 is a cross-sectional view in the width direction (the Y direction) of the inter-terminal connection structure shown in FIG. 35.

As shown in FIGS. 36 and 38, the case main body 174A of the end portion case 174 includes a peripheral wall portion 220 that projects downward beyond the tip part of the bolt 214 from the base wall penetrated by the lower surface opening hole 74. The peripheral wall portion 220 includes a pair of side walls 220a, 220b, and at the projecting end portion of the side wall 220a on one side (the left side in FIG. 38), the connection blocking portion 210 of flat plate shape is rotatably supported around a rotation shaft 222. The connection blocking portion 210 is rotatable between a permitting position that permits the connection between the connection-portion-side unit 208 and the terminal-portion-side unit 212 shown in FIG. 36, and a blocking position that blocks the connection between the connection-portion-side unit 208 and the terminal-portion-side unit 212 shown in FIG. 37. At the permitting position of FIG. 36, the connection blocking portion 210 extends further downward from the projecting end portion of the side wall 220a, and the tip part of the tube portion 216A of the connection-portion-side relay portion 216 and the tip of the bolt 214 projecting from the lower surface opening hole 74 of the base wall of the case main body 174A are exposed via a lower surface opening portion 224 of the end portion case 174 defined by the projecting end portion of the peripheral wall portion 220. At the blocking position of FIG. 37, the connection blocking portion 210 covers the lower surface opening portion 224 of the end portion case 174, and covers the tip part of the tube portion 216A of the connection-portion-side relay portion 216 and the tip of the bolt 214 projecting from the lower surface opening hole 74 of the base wall of the case main body 174A. The connection blocking portion 210 is urged by a spring member 226 to the blocking position shown in FIG. 37, and by rotationally displacing the connection blocking portion 210 toward the permitting position shown in FIG. 36 against the urging force of the spring member 226, the connection blocking portion 210 is displaceable to the permitting position that permits the connection between the connection-portion-side unit 208 and the terminal-portion-side unit 212. At the edge portion of the connection blocking portion 210 separated from the side wall 220a, there are provided fitting portions 228, 228 that are fitted to fit target portions 252, 252 provided to the connection-portion-side unit 208 described later.

Terminal-Portion-Side Unit 212

The terminal-portion-side unit 212 includes a nut 230, a terminal portion 232 constituted by a metal flat plate bent in an L shape, and a holder 186 for holding them. The insulating cover 190 having insulation properties is attached to the holder 186, and the insulating cover 190 covers the nut 230 and the terminal portion 232 arranged on the nut 230, so that the nut 230 and the terminal portion 232 are stably accommodated between the insulating cover 190 and the holder 186. The upper surface of the insulating cover 190 constitutes a terminal portion cover serving as the insulating cover that covers the terminal portion 232, and in the central portion of the insulating cover 190, terminal portion opening windows 234 serving as the opening windows are formed at four locations that are remote from one another in the circumferential direction (see FIG. 35), through which the tube portion 216A of the connection-portion-side relay portion 216 is inserted to be connected to the terminal portion 232. Furthermore, on the inner peripheral side of the terminal portion opening windows 234, an inner peripheral tube portion 238 including a bolt insertion hole 236 is formed so as to project. A gutter-shaped accommodating portion 242 that accommodates and holds the connection blocking portion 210 is provided to a side wall 240 of the insulating cover 190 so as to project downward. As shown in FIG. 38, a gap 248 capable of accommodating the connection blocking portion 210 is provided so as to open upward between the opposed faces of an inside wall portion 244 and an outside wall portion 246 constituting the accommodating portion 242. At the upper end portion of the inside wall portion 244, provided is a guide surface 250 that comes into contact with the fitting portions 228 of the connection blocking portion 210 and guides the connection blocking portion 210 to the gap 248. The fit target portions 252 of concave shape opening toward the gap are provided on the lower side of the inside wall portion 244 so that the fitting portions 228 of the connection blocking portion 210 are fitted therein.

Assembly of the Inter-Terminal Connection Structure 204 of Variation 14 of the Present Disclosure First, the connection-portion-side relay portion 216 is accommodated in the case main body 174A, and the tip part of the connection-portion-side relay portion 216 is inserted through the annular lower surface opening hole 74 to project from the base wall of the case main body 174A. Subsequently, the bolt insertion hole 62 of the connection portion 60 of the bus bar 170 is aligned with the bolt insertion hole 218 of the connection-portion-side relay portion 216, and placed on the connection-portion-side relay portion 216. Then, the screw portion 214A of the bolt 214 is inserted through the bolt insertion holes 62, 218, and the head portion of the bolt 214 is placed on the connection portion 60 of the bus bar 170. In this state, by covering the case main body 174A with the lid body 174B, the connection portion 60, the connection-portion-side relay portion 216, and the bolt 214 are stably held in the end portion case 174. This arrangement completes the connection-portion-side unit 208 of the conductive component 206. At this time, the connection blocking portion 210 is located at the blocking position shown in FIG. 37 due to the urging force of the spring member 226. Subsequently, the holder 186 is prepared, the nut 230 is held in the accommodating recess 200 of the holder 186, the terminal portion 232 is placed on the upper surface of the nut 230, and a bolt insertion hole 254 of the nut 230 and a bolt insertion hole 256 of the terminal portion 232 are aligned with each other. Then, the insulating cover 190 is attached to the holder 186 from above, so that the bolt insertion hole 236 of the inner peripheral tube portion 238 provided to the upper surface of the insulating cover 190 is aligned with the bolt insertion hole 254 of the nut 230 and the bolt insertion hole 256 of the terminal portion 232. In this state, the nut 230 and the terminal portion 232 are stably held between the holder 186 and the insulating cover 190. This arrangement completes the terminal-portion-side unit 212 is completed.

Figure 39:
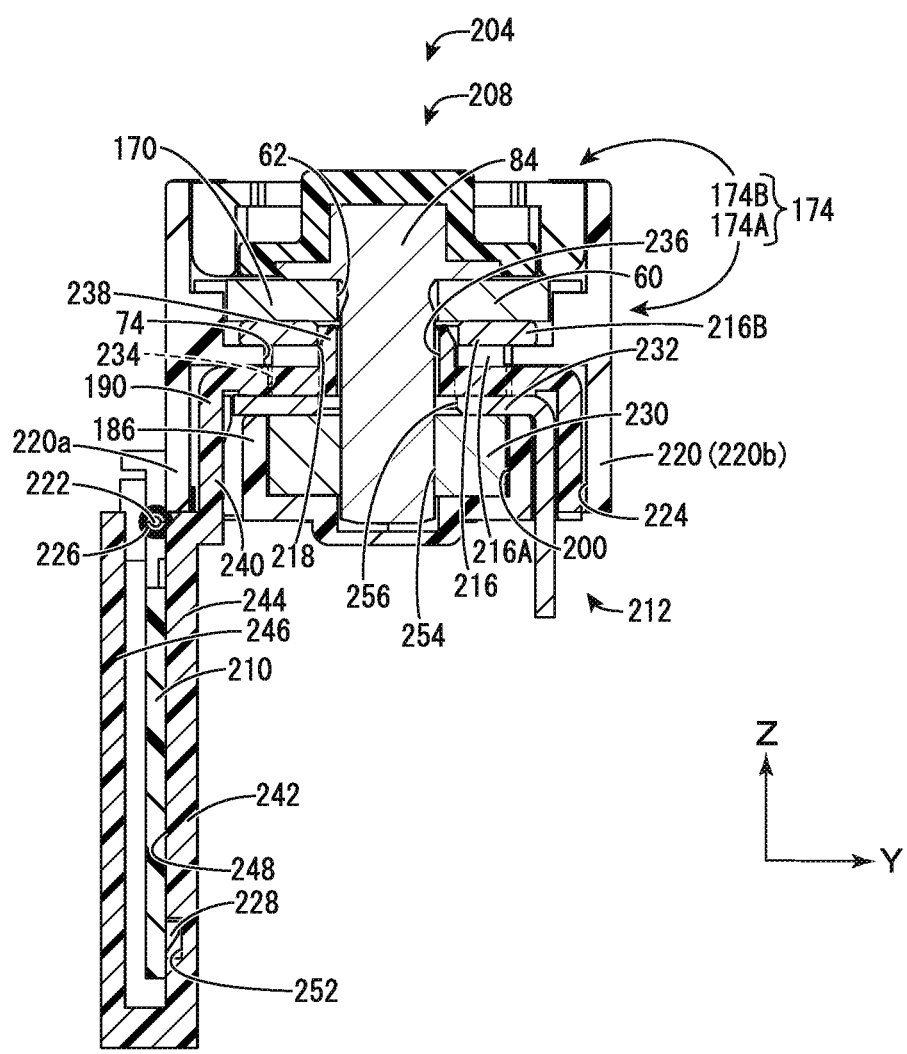
FIG. 39 is a cross-sectional view in the width direction (the Y direction) of the inter-terminal connection structure shown in FIG. 34.

Finally, the connection-portion-side unit 208 is attached to the terminal-portion-side unit 212. At that time, first, in the connection-portion-side unit 208, as shown in FIG. 38, the connection blocking portion 210 is displaced to the permitting position against the urging force of the spring member 226. Next, the connection blocking portion 210 is inserted into the gap 248 of the accommodating portion 242 provided to the insulating cover 190 from above. At that time, the fitting portion 228 provided to the connection blocking portion 210 comes into contact with the guide surface 250 provided to the inside wall portion 244 of the accommodating portion 242, so that the connection blocking portion 210 is smoothly guided to the gap 248 of the accommodating portion 242. At the same time, the screw portion 214A of the bolt 214 of the connection-portion-side unit 208 is aligned with each of the bolt insertion holes 236, 254, 256 on the terminal-portion-side unit 212 side in advance, and the screw portion 214A of the bolt 214 is smoothly inserted into each of the bolt insertion holes 236, 254, 256. Then, by screwing the bolt 214 into the nut 230 with a tool (not shown), the connection blocking portion 210 is further pushed into the gap 248 of the accommodating portion 242, and as shown in FIG. 39, the fitting portions 228 of the connection blocking portion 210 are fitted in the fit target portions 252 provided to the accommodating portion 242 of the terminal-portion-side unit 212. In Variation 14, the fitting portions 228 and the fit target portions 252 are configured to be fitted in a proper connection position of the connection portion 60 of the conductive component 206 and the terminal portion 232. Thus, the operator is able to readily confirm that the connection portion 60 of the conductive component 206 and the terminal portion 232 have been properly connected by detecting the fit between the fitting portions 228 and the fit target portions 252. By so doing, the connection portion 60 of the conductive component 206 and the terminal portion 232 are conductively connected via the connection-portion-side relay portion 216, thereby completing one connection of the inter-terminal connection structure 204.

Next, the working effects of the present Variation 14 will be described. According to the present Variation 14, the connection blocking portion 210 is provided to the end portion case 174 constituting the case of the conductive component 206 and the connection blocking portion 210 is urged to the blocking position shown in FIG. 37, so that the bolt 214 and the connection-portion-side relay portion 216 are covered by the connection blocking portion 210. Therefore, even if the connection-portion-side unit 208 of the conductive component 206 falls to the terminal-portion-side unit 212 due to misoperation during the connection work between the terminal portions, the connection portion 60 is surely prevented from being erroneously connected to the terminal portion 232. As a result, it is possible to prevent a trouble before it happens that the other connection portion of the conductive component 206 accidentally becomes a live portion. Moreover, the connection blocking portion 210 is displaceable to the permitting position that permits the connection between the connection portion 60 and the terminal portion 232, and when actually connecting the connection portion 60 and the terminal portion 232, the work of displacing the connection blocking portion 210 to the permitting position shown in FIGS. 36 and 38 is involved. Therefore, it is possible to call attention when the operator performs the connection work between the connection portion 60 and the terminal portion 232, thereby reliably preventing a trouble that the other connection portion of the conductive component 206 accidentally becomes a live portion.

In addition, according to the present Variation 14, the fitting portions 228 provided to the connection blocking portion 210 of the connection-portion-side unit 208 fit in the fit target portions 252 provided to the accommodating portion 242 of the terminal-portion-side unit 212, so as to concomitantly serve as a fixing structure of the connection-portion-side unit 208 and the terminal-portion-side unit 212. Therefore, excellent connection stability between the connection portion 60 and the terminal portion 232 can be surely obtained with a small number of parts.

Variation 15

Figure 40A:
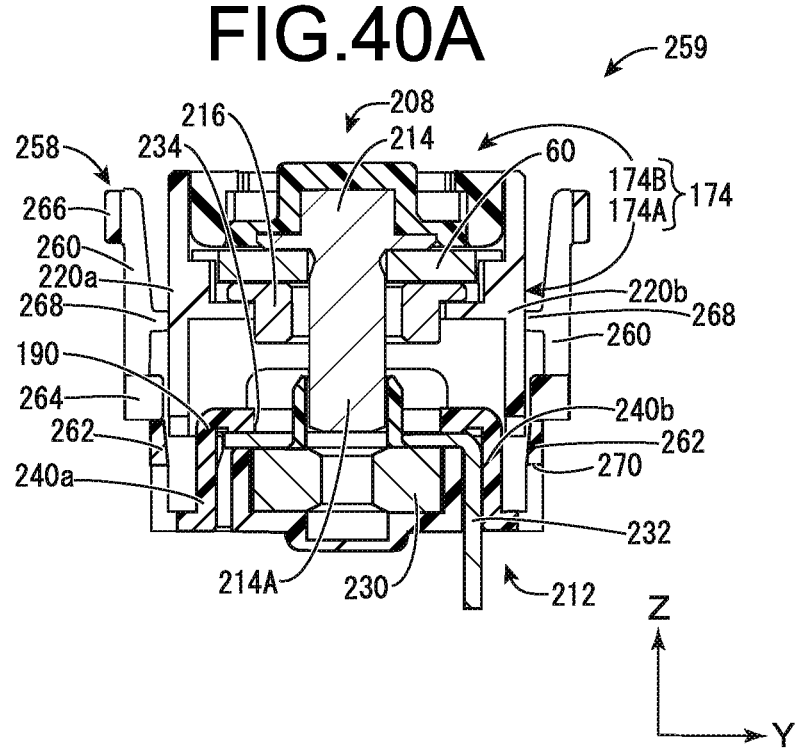
FIG. 40A is a cross-sectional view in the width direction (the Y direction) of an inter-terminal connection structure according to Variation 15, showing a state in which a connection blocking portion is in a blocking position.
Figure 40B:
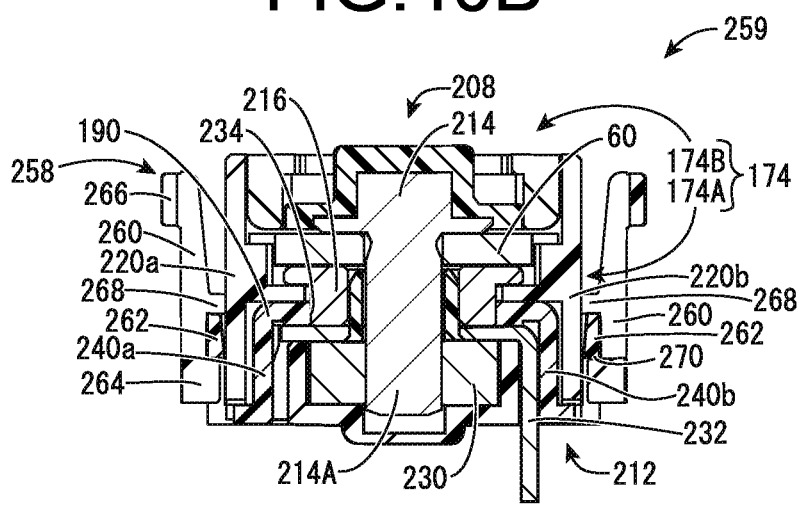
FIG. 40B is a view of the inter-terminal connection structure shown in FIG. 40A, showing a state in which the connection blocking portion is in a permitting position.

Next, FIGS. 40A and 40B show an inter-terminal connection structure 259 serving as Variation 15 of the present disclosure, which includes a connection blocking portion 258 which is another embodiment of the connection blocking portion shown in the above-described Variation 14. The same structures as those of Variation 14 will be designated by the same reference numerals in the drawings, and detailed description thereof will be omitted. The connection blocking portion 258 of Variation 15 includes a pair of elastic lock pieces 260, 260 projecting from the outer surfaces of the side walls 220a, 220b of the case main body 174A of the end portion case 174. A pair of lock frameworks 262, 262 project from the outer surfaces of side walls 240a, 240b of the insulating cover 190. The elastic lock pieces 260 extend with a predetermined length in the vertical direction of the side walls 220a, 220b, and include fitting portions 264 that project toward the side walls 220a, 220b at their lower end portions, as well as pressing portions 266 that project in a direction of separation from the side walls 220a, 220b at their upper end portions. The elastic lock pieces 260, 260 are linked to the side walls 220a, 220b via a linking portion 268 at a position near the lower end portion. Therefore, in the initial state in which no load is applied, the fitting portions 264 approach the side walls 220a, 220b, and the pressing portions 266 is remote from the side walls 220a, 220b. The lock frameworks 262 include hole-shaped fit target portions 270 in which the fitting portions 264 fit.

At the blocking position of the elastic lock piece 260 constituting the connection blocking portion 258 shown in FIG. 40A, the fitting portion 264 of the elastic lock piece 260 comes into contact with the upper end surface of the lock framework 262, so as to block the connection-portion-side unit 208 from approaching the terminal-portion-side unit 212. In this state, the screw portion 214A of the bolt 214 does not reach the terminal portion 232, and the connection-portion-side relay portion 216 is remote from the terminal portion opening window 234. Therefore, the connection between the connection portion 60 and the terminal portion 232 is surely blocked. Next, when connecting the connection portion 60 and the terminal portion 232, the operator presses the pressing portion 266 of the elastic lock piece 260 and displaces the fitting portion 264 to the permitting position where the fitting portion 264 overrides the upper end surface of the lock framework 262 and can move downward. In this state, by screwing the bolt 214 into the nut 230 with a tool (not shown), the fitting portion 264 moves further downward, and as shown in FIG. 40B, the fitting portion 264 of the elastic lock piece 260 fits in the fit target portion 270 provided to the lock framework 262, so that it is possible to detect that the connection portion 60 and the terminal portion 232 are properly connected. In this way, in Variation 15 as well, the elastic lock piece 260 constituting the connection blocking portion 258 is displaceable from the blocking position that blocks the connection between the connection portion 60 and the terminal portion 232 to the permitting position that permits the connection between the connection portion 60 and the terminal portion 232 by the operator, thereby achieving the same working effects as those of Variation 14.

Variation 16

Hereinafter, Variation 16 of the present disclosure will be described with reference to FIGS. 41 to 50. In the above-described Embodiment 1 and Variations 1 to 15, at least one terminal portion is provided with the insulating cover (the terminal portion cover), and the connection portion to be fastened to the said terminal portion is provided with the relay portion (the connection-portion-side relay portion). However, in an inter-terminal connection structure 280 of Variation 16, neither of the terminal portions is provided with the insulating cover. That is, in the inter-terminal connection structure 280 of Variation 16, one connection portion (a first connection portion 282) is provided with a connection portion cover 284 serving as the insulating cover, and one terminal portion (a first terminal portion 286) to be fastened to the first connection portion 282 is provided with a terminal-portion-side relay portion 288 serving as a relay portion.

Figure 41:
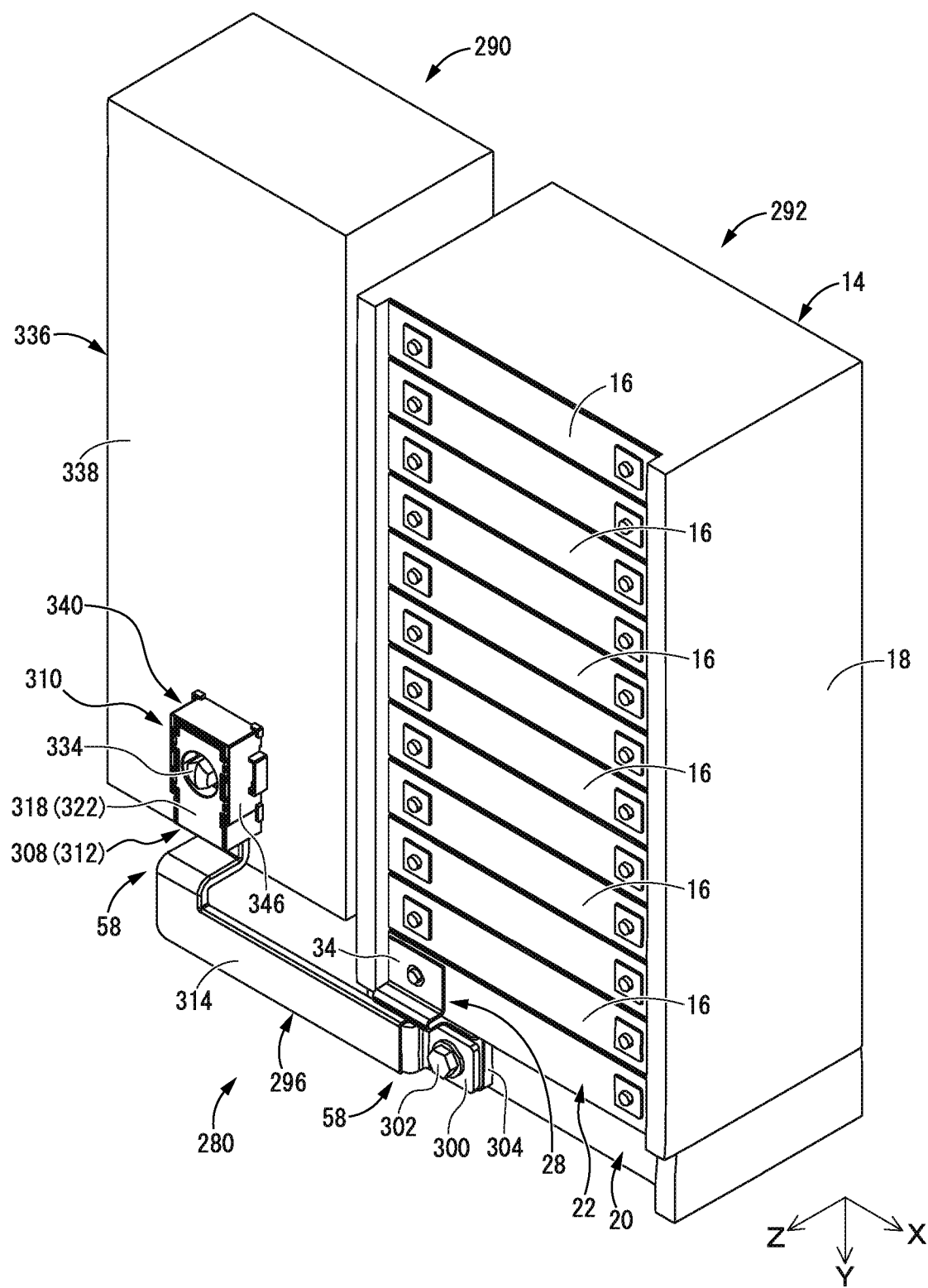
FIG. 41 is an overall perspective view showing an inter-terminal connection structure according to Variation 16.
Figure 42:
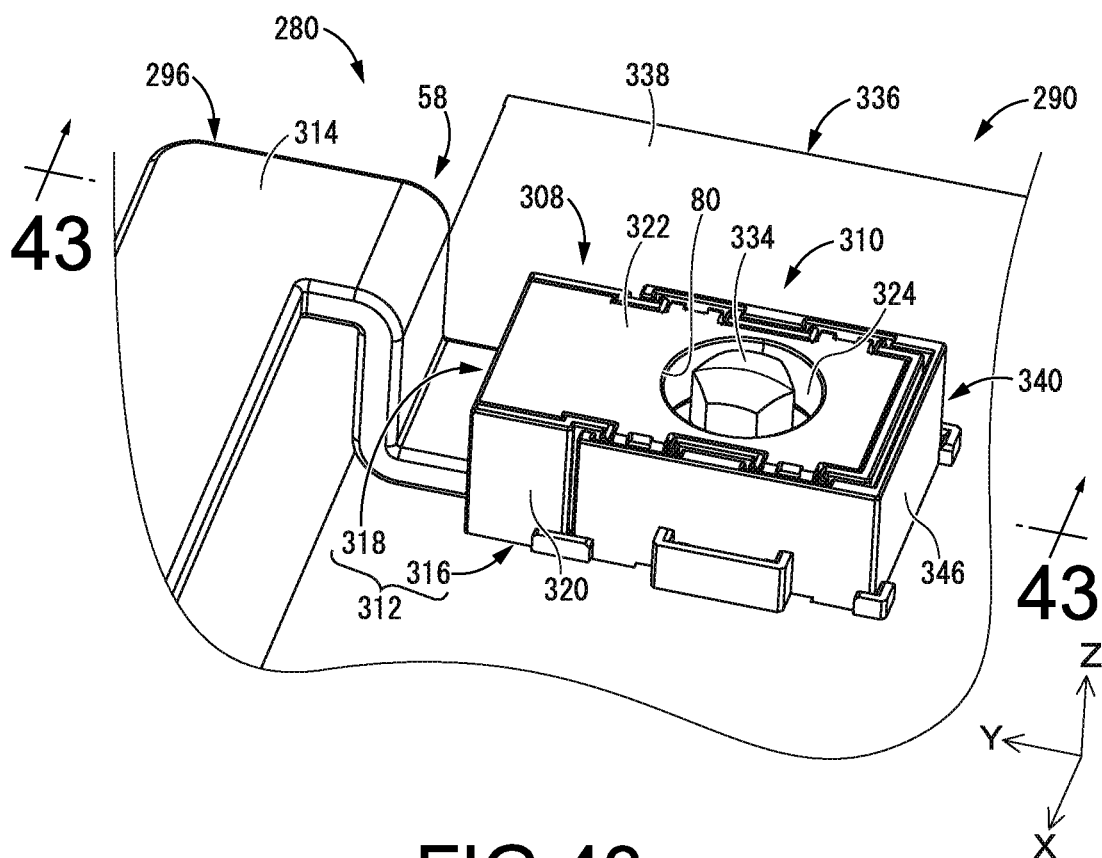
FIG. 42 is a perspective view showing a fastened portion between one terminal portion and a connection portion in the inter-terminal connection structure shown in FIG. 41.
Figure 43:
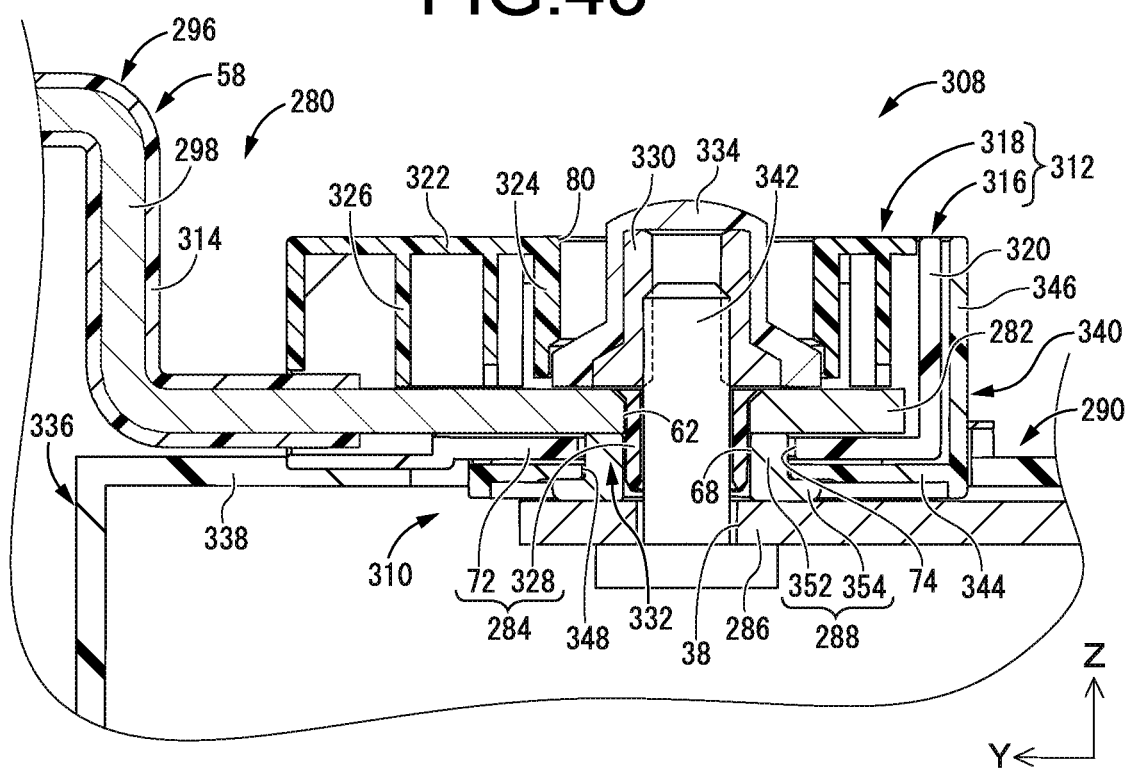
FIG. 43 is a cross-sectional view taken along line 43-43 of FIG. 42.
Figure 44:
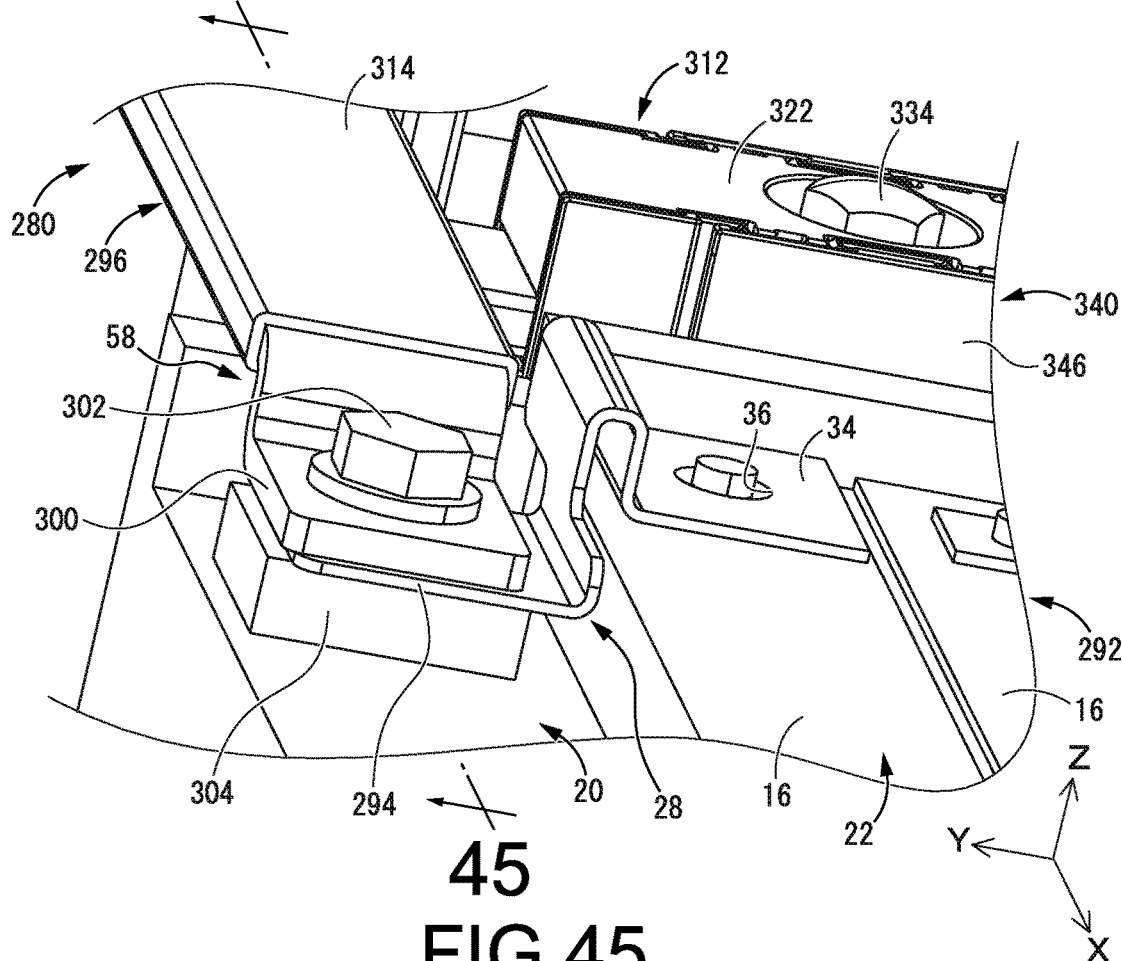
FIG. 44 is a perspective view showing a fastened portion between the other terminal portion and a connection portion in the inter-terminal connection structure shown in FIG. 41.
Figure 45:
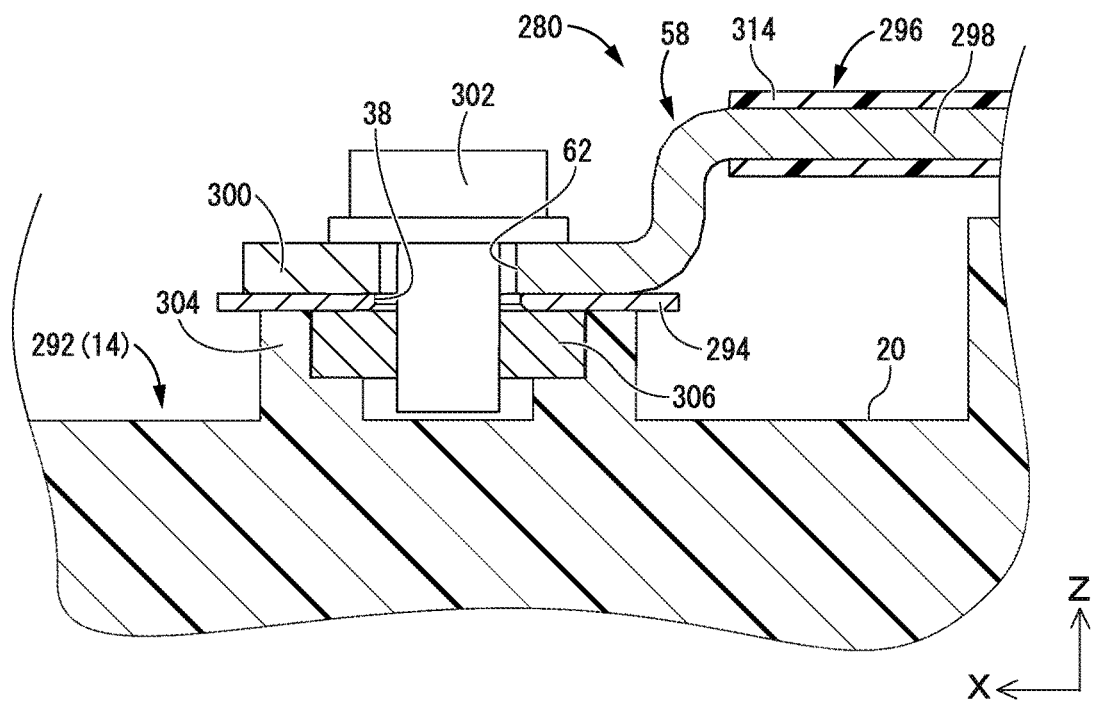
FIG. 45 is a cross-sectional view taken along line 45-45 of FIG. 44.

Specifically, as shown in FIG. 41, the inter-terminal connection structure 280 of Variation 16 is a structure that electrically connects the terminal portion (the first terminal portion 286) of a junction box 290 and the terminal portion (a second terminal portion 294) of a battery module 292 via a conductive component 296. The conductive component 296 includes a bus bar 298 serving as a conductive member, and the opposite end portions in the length direction of the bus bar 298 comprise first and second connection portions 282, 300 that are fastened to the first and second terminal portions 286, 294. The structure of the fastened portion between the first connection portion 282 and the first terminal portion 286 is shown in FIGS. 42 and 43, while the structure of the fastened portion between the second connection portion 300 and the second terminal portion 294 is shown in FIGS. 44 and 45.

As is apparent from FIGS. 42 to 45, measures against electric shock are taken with respect to the fastened portion between the first connection portion 282 and the first terminal portion 286 (the connected portion between one end portion of the conductive component 296 and the junction box 290). Meanwhile, the fastened portion between the second connection portion 300 and the second terminal portion 294 (the connected portion between the other end portion of the conductive component 296 and the battery module 292) is fastened by a bolt 302. The battery module 292 in Variation 16 has the same structure as that in the first or second battery module 12A, 12B in the preceding Embodiment 1. Thus, components and parts that are substantially identical with those in the first or second battery module 12A, 12B will be assigned like symbols in the drawings and not described in any detail.

The battery module 292 includes the cabinet 14, and the cabinet 14 accommodates a plurality of cells 16 that are connected in series. The connection terminal 28 is fastened to the cell 16 on the front side, and the connection terminal 28 includes the second terminal portion 294 serving as the terminal portion. Besides, the cabinet 14 of the battery module 292 integrally or separately includes a nut holding portion 304, and a nut 306 is arranged in the nut holding portion 304.

Figure 46:
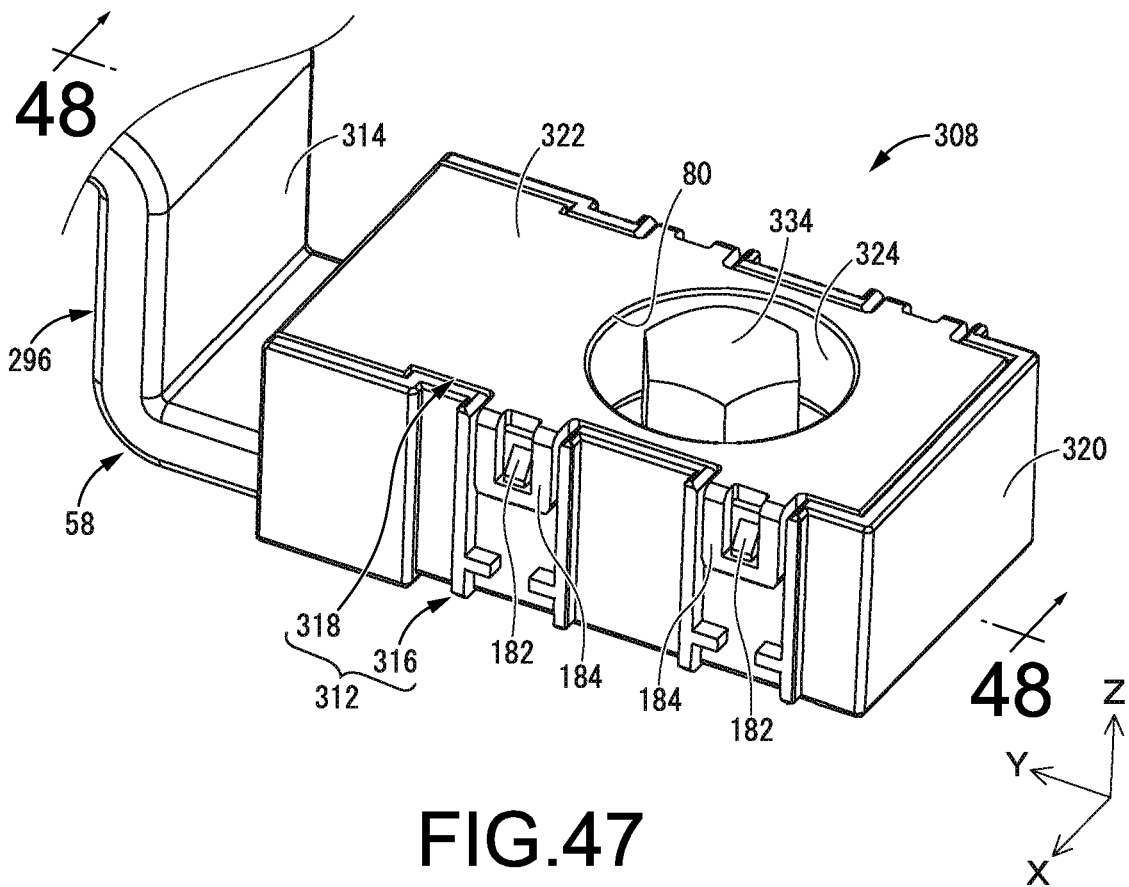
FIG. 46 is a perspective view showing a connection-portion-side unit constituting the fastened portion between the one terminal portion and the connection portion shown in FIG. 42.
Figure 47:
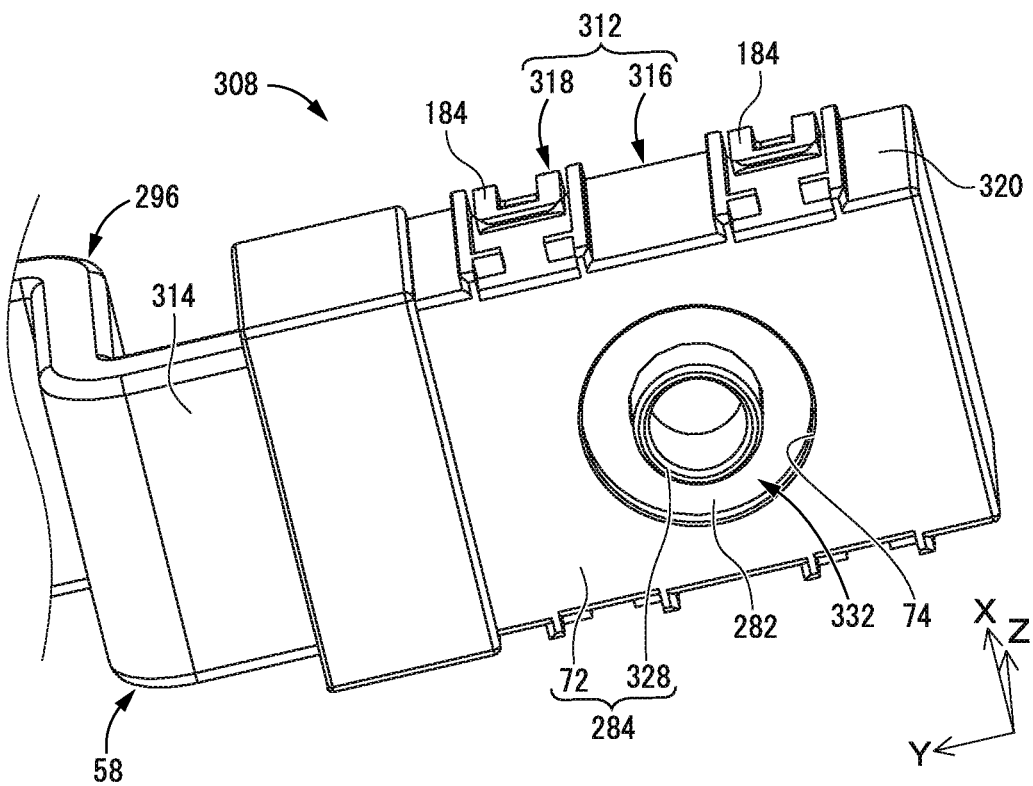
FIG. 47 is a perspective view of the connection-portion-side unit shown in FIG. 46 as viewed from below.
Figure 48:
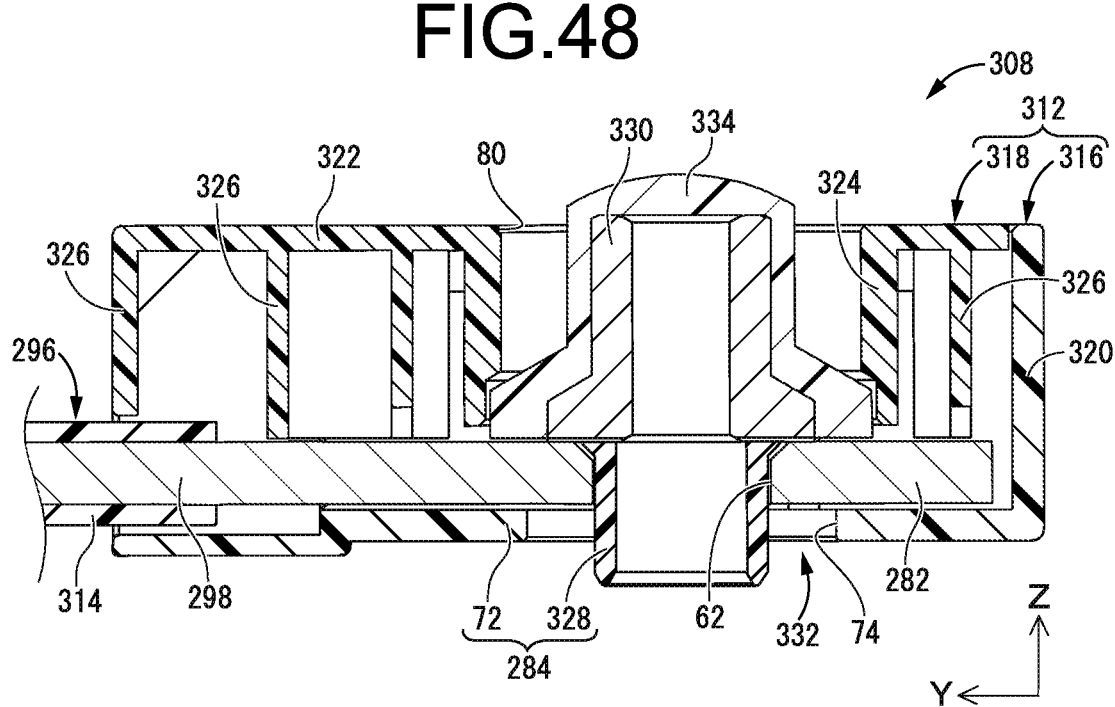
FIG. 48 is a cross-sectional view taken along line 48-48 of FIG. 46.
Figure 49:
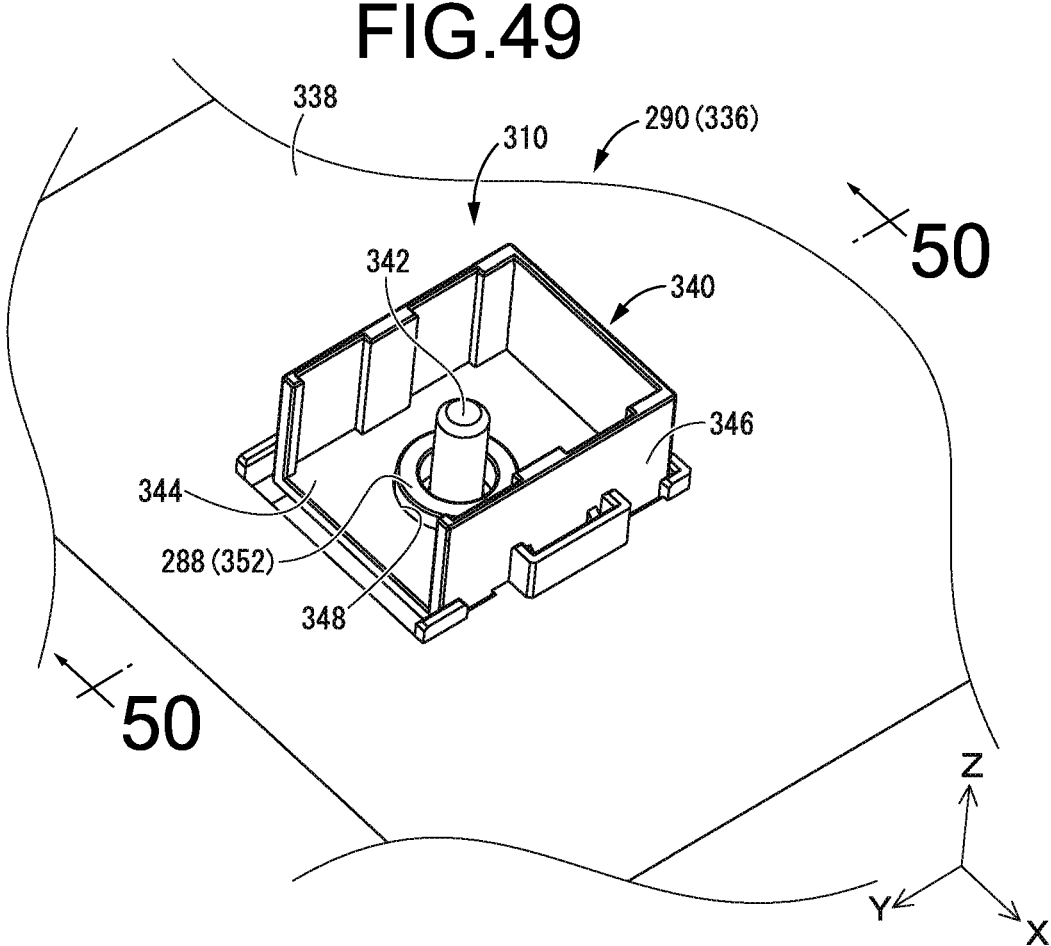
FIG. 49 is a perspective view showing a terminal-portion-side unit constituting the fastened portion between the one terminal portion and the connection portion shown in FIG. 42.
Figure 50:
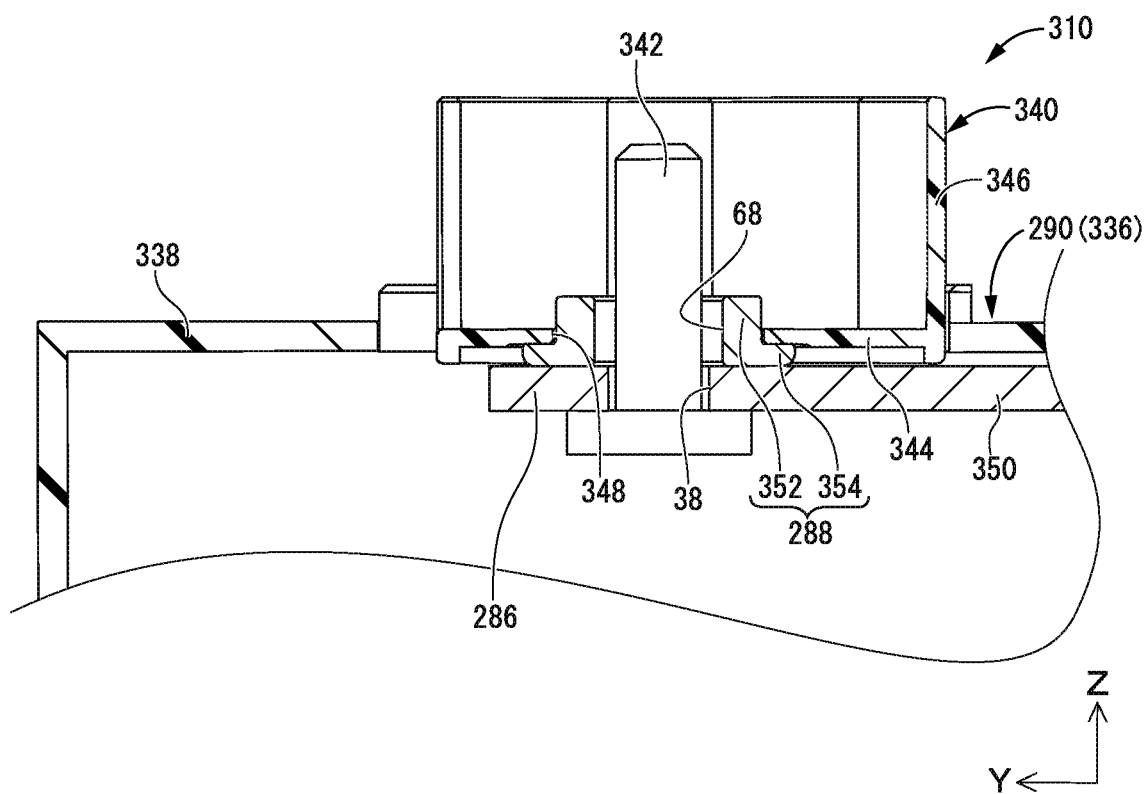
FIG. 50 is a cross-sectional view taken along line 50-50 of FIG. 49.

The fastened portion between the first connection portion 282 and the first terminal portion 286 (the connected portion between one end portion of the conductive component 296 and the junction box 290) includes a structure for measures against electric shock similar to that of the preceding Variation 13. That is, one end portion of the conductive component 296 is provided with a first-connection-portion-side unit 308 including the first connection portion 282, while the junction box 290 is provided with a first-terminal-portion-side unit 310 including the first terminal portion 286. The first-connection-portion-side unit 308 is shown in FIGS. 46 to 48, while the first-terminal-portion-side unit 310 is shown in FIGS. 49 and 50.

First-Connection-Portion-Side Unit 308

The first-connection-portion-side unit 308 includes an end portion case 312 having insulation properties that accommodates the first connection portion 282, which is one end portion of the bus bar 298. That is, the case having insulation properties and accommodating the bus bar 298 includes an insulating covering 314 that covers the intermediate portion in the length direction of the bus bar 298, and the end portion case 312 accommodating the first connection portion 282 that is one end portion in the length direction of the bus bar 298. Further, the end portion case 312 includes a case main body 316 and a lid body 318.

The case main body 316 includes the base wall 72 covering the lower side of the first connection portion 282, and a peripheral wall 320 projecting upward from the outer peripheral edge portion of the base wall 72. The peripheral wall 320 covers three outer sides of the first connection portion 282, and is provided on the rear side of the first connection portion 282 (on the right in FIG. 48) and on the opposite sides in the left-right direction of the first connection portion 282. Besides, a plurality of engaging projection portions 182 projecting outward are provided on the opposite sides in the left-right direction of the peripheral wall 320. The peripheral wall 320 is provided with concave and convex portions on the opposite sides in the left-right direction thereof, which facilitates positioning when attaching the first-connection-portion-side unit 308 and the first-terminal-portion-side unit 310, which will be described later.

Further, on the base wall 72, the lower surface opening hole 74 of circular shape is provided at a position corresponding to the bolt insertion hole 62 provided to the first connection portion 282. The inside diameter dimension of the lower surface opening hole 74 is larger than the inside diameter dimension of the bolt insertion hole 62 of the first connection portion 282. Thus, with the end portion case 312 attached to the first connection portion 282, the lower surface of the first connection portion 282 (the bus bar 298) is exposed through the lower surface opening hole 74. The base wall 72 includes positioning protrusions such as the positioning protrusion 76 shown in FIG. 5 of the preceding Embodiment 1 and the positioning protrusions 76a, 76b shown in FIG. 32 of the preceding Variation 13. Besides, positioning concave portions corresponding to the positioning protrusions provided on the base wall 72 are provided at the opposite end portions in the left-right direction of the first connection portion 282. By these positioning protrusions engaging with the positioning concave portions, relative displacement between the first connection portion 282 and the end portion case 312 is limited to some extent when the first connection portion 282 and the end portion case 312 are assembled.

Also, the lid body 318 includes an upper base wall 322 of flat-plate shape. In the upper base wall 322, a cylindrical portion 324 extending in the vertical direction is provided at a position corresponding to the bolt insertion hole 62 of the first connection portion 282 and the lower surface opening hole 74 of the base wall 72, and penetrates the upper base wall 322 in the vertical direction. The upper opening portion of the cylindrical portion 324 comprises an upper surface opening portion 80 opening onto the upper surface of the end portion case 312. Furthermore, on the upper base wall 322, a pressing projection portion 326 projecting downward is provided at a position away from the cylindrical portion 324. When the first connection portion 282 and the end portion case 312 are assembled, the pressing projection portion 326 inhibits the first connection portion 282 from displacing upward with respect to the base wall 72. In the outer peripheral edge of the lid body 318, the engaging framework 184 projecting downward from the upper base wall 322 is provided at a position corresponding to the engaging projection portion 182 of the case main body 316.

Moreover, the first-connection-portion-side unit 308 includes an inner peripheral tube portion 328 and a nut 330. The inner peripheral tube portion 328 has a cylindrical shape overall, and is formed of synthetic resin, while having insulation properties. The inner peripheral tube portion 328 is inserted into the bolt insertion hole 62 of the first connection portion 282 and attached thereto. Specifically, the outside diameter dimension at the upper end portion of the inner peripheral tube portion 328 is larger than that of the other portions. The inner peripheral tube portion 328 is inserted through the bolt insertion hole 62 from above, and the upper end portion of the inner peripheral tube portion 328 comes into contact with the opening peripheral edge portion on the upper side of the bolt insertion hole 62, so that the inner peripheral tube portion 328 is prevented from falling out of the first connection portion 282. The inner peripheral tube portion 328 may be or does not have to be fixed to the first connection portion 282 with an adhesive or the like.

By the inner peripheral tube portion 328 being attached to the first connection portion 282, the lower end of the inner peripheral tube portion 328 projects outward (downward) from the end portion case 312 through the lower surface opening hole 74. Therefore, in Variation 16, the connection portion cover 284 that covers the first connection portion 282 includes the base wall 72 of the case main body 316 and the inner peripheral tube portion 328. Besides, the lower surface opening hole 74 of the base wall 72 and the inner peripheral tube portion 328 constitute a connection portion opening window 332 serving as the opening window of annular shape. With this arrangement, the lower surface of the first connection portion 282 is exposed in an annular shape through the connection portion opening window 332. However, the inner peripheral tube portion 328 projects outward (downward) from the end portion case 312, thereby inhibiting the operator from touching the first connection portion 282.

Furthermore, the nut 330 is arranged on the inner peripheral side of the cylindrical portion 324 of the lid body 318. Specifically, an insulating covering 334 is fixed to the nut 330 from above. The lower end of the insulating covering 334 has an increased outside diameter dimension, and by the insulating covering 334 being inserted into the portion at the lower end of the cylindrical portion 324 where the inner diameter dimension is increased, the nut 330 and the insulating covering 334 are prevented from becoming dislodged upward. The nut 330 and the insulating covering 334 are exposed to the outside through the upper surface opening portion 80 provided to the lid body 318, and tightening operation or the like of the nut 330 can be performed from the outside by using a jig or the like.

First-Terminal-Portion-Side Unit 310

The junction box 290 includes an upper case 336 and a lower case (not shown), and the first-terminal-portion-side unit 310 is provided to an upper base wall 338 of the upper case 336. The first-terminal-portion-side unit 310 includes the first terminal portion 286, the terminal-portion-side relay portion 288, an insulating cover 340, and a bolt 342.

The insulating cover 340 includes a base wall 344 of flat-plate shape and a peripheral wall 346 projecting upward from the outer peripheral edge portion of the base wall 344. The peripheral wall 346 is provided on three sides of the base wall 344, namely on the rear side and on the left and right sides of the base wall 344. That is, the peripheral wall 346 opens forward. Further, the inner surfaces of the peripheral wall 346 on the opposite sides in the left-right direction are provided with concave and convex portions corresponding to the outer surfaces on the opposite sides in the left-right direction of the end portion case 312 of the first-connection-portion-side unit 308. Furthermore, a through hole 348 penetrates the generally central portion of the base wall 344 in the vertical direction. Besides, convex portions (not shown) projecting outward are provided on the opposite sides in the left-right direction of the lower end of the peripheral wall 346, and concave portions (not shown) are provided on the upper base wall 338 of the upper case 336. Then, by means of concave and convex fitting of these concave and convex portions, the insulating cover 340 is fixed to the upper base wall 338 of the upper case 336. The method of fixing the insulating cover 340 to the upper base wall 338 is not limited to the concave and convex fitting.

Further, an electrical circuit (not shown) is accommodated inside the junction box 290, and a bus bar 350 electrically connected to the electrical circuit is fixed in the junction box 290 by a fixing means (not shown). The end portion of the bus bar 350 comprises the first terminal portion 286, and the first terminal portion 286 is penetrated by the bolt insertion hole 38 in the vertical direction. The first terminal portion 286 is located below the base wall 344 of the insulating cover 340, and the through hole 348 provided to the base wall 344 and the bolt insertion hole 38 provided to the first terminal portion 286 are aligned with each other in the vertical direction.

The terminal-portion-side relay portion 288 is provided between the base wall 344 of the insulating cover 340 and the bus bar 350 (the first terminal portion 286). Specifically, the terminal-portion-side relay portion 288 is an annular member overall, and is made of metal. The terminal-portion-side relay portion 288 includes an upper tube portion 352 and a lower flange portion 354, and the flange portion 354 of annular shape projects to the outer peripheral side from the lower end of the tube portion 352. The tube portion 352 of the terminal-portion-side relay portion 288 is inserted through the through hole 348 of the base wall 344, and the flange portion 354 is clasped vertically between the base wall 344 and the bus bar 350. With this arrangement, the terminal-portion-side relay portion 288 and the first terminal portion 286 are in contact with each other.

The bolt insertion hole 68 penetrating the center of the terminal-portion-side relay portion 288 in the vertical direction is aligned with the bolt insertion hole 38 of the first terminal portion 286, and the bolt 342 is inserted through the both bolt insertion holes 68, 38 from below and projects upward. The bolt 342 may be fixed to the bus bar 350 with an adhesive or the like, or may be fixed to the bus bar 350, the junction box 290, or the like by a fixing means (not shown). The outside diameter dimension of the bolt 342 is larger than the inside diameter dimension of the bolt insertion hole 68 of the terminal-portion-side relay portion 288. An annular space is formed between the terminal-portion-side relay portion 288 and the bolt 342 with a predetermined width dimension in the radial direction. In Variation 16, the upper end of the bolt 342 does not project above the insulating cover 340, thereby reducing the risk of unintentional touch to the bolt 342 and damage to the bolt 342.

Assembly of the Inter-Terminal Connection Structure 280 of Variation 16 of the Present Disclosure Hereinafter, a specific example of the assembly process of the inter-terminal connection structure 280, that is, the process of connecting the junction box 290 and the battery module 292 with the conductive component 296 will be described. The assembly process of the inter-terminal connection structure 280 is not limited to the following description.

First, the bus bar 298 having the insulating covering 314 thereon, the inner peripheral tube portion 328, the nut 330 having the insulating covering 334 thereon, the case main body 316, and the lid body 318 are prepared. Then, the first connection portion 282, which is one end portion of the bus bar 298, is inserted into the case main body 316 from above, and the positioning protrusions (76) provided to the base wall 72 and the positioning concave portions (64) provided to the first connection portion 282 are engaged with each other. After that, the inner peripheral tube portion 328 is inserted through the bolt insertion hole 62 of the first connection portion 282. Subsequently, the nut 330 having the insulating covering 334 thereon is placed on the inner peripheral tube portion 328 (the first connection portion 282) from above so that the inner hole of the inner peripheral tube portion 328 and the inner hole of the nut 330 communicate with each other. With this state, the lid body 318 is covered on the case main body 316 from above to engage the engaging projection portions 182 and the engaging frameworks 184. With this arrangement, the end portion case 312 is attached to the first connection portion 282, thereby completing the first-connection-portion-side unit 308.

Further, with the electrical circuit (not shown) and the bus bar 350 fixed to the upper case 336, the terminal-portion-side relay portion 288 is placed above the first terminal portion 286 with their respective bolt insertion holes 38, 68 are aligned with each other. After that, the insulating cover 340 is covered on the terminal-portion-side relay portion 288 from above and is fixed to the upper case 336. Then, by inserting and fixing the bolt 342 from below the first terminal portion 286 and by attaching the lower case (not shown) to the upper case 336, the junction box 290 including the first-terminal-portion-side unit 310 is completed.

Subsequently, the battery module 292 is prepared, and the second terminal portion 294 and the second connection portion 300, which is the other end portion of the bus bar 298, are overlapped with each other to align their respective bolt insertion holes 38, 62. Then, the bolt 302 is inserted through these bolt insertion holes 38, 62 and is fastened to the nut 306. With this arrangement, the second terminal portion 294 and the second connection portion 300 are fastened, that is, the battery module 292 and the conductive component 296 are electrically connected.

Next, the end portion case 312 of the first-connection-portion-side unit 308 is inserted into the insulating cover 340 of the first-terminal-portion-side unit 310, and the bolt 342 of the first-terminal-portion-side unit 310 is brought into contact with the opening portion of the nut 330 through the inner peripheral tube portion 328 of the first-connection-portion-side unit 308. After that, the bolt 342 is fastened to the nut 330 by tightening the nut 330 from the outside with a jig (not shown) through the upper surface opening portion 80 of the end portion case 312. With this arrangement, as shown in FIG. 43, the tube portion 352 of the terminal-portion-side relay portion 288 is inserted through the connection portion opening window 332 provided to the lower surface of the end portion case 312, and the tube portion 352 touches and is in connection with the first connection portion 282. That is, by fastening the first terminal portion 286 and the first connection portion 282, the junction box 290 and the conductive component 296 are electrically connected. As a result, the junction box 290 and the battery module 292 are electrically connected by the conductive component 296, thereby completing the inter-terminal connection structure 280.

In the inter-terminal connection structure 280 of Variation 16, when the battery module 292 and the other end portion of the conductive component 296 are bolted together, the first connection portion 282, which is one end portion of the conductive component 296, becomes a live portion. Here, the first connection portion 282 is provided with the connection portion cover 284, which reduces the risk that the operator accidentally touches the first connection portion 282. Besides, the connection portion cover 284 is provided with the connection portion opening window 332, so that the first connection portion 282 is partially exposed. When the first connection portion 282 and the first terminal portion 286 are fastened, the terminal-portion-side relay portion 288 that touches the first terminal portion 286 touches the first connection portion 282 through the connection portion opening window 332. Thus, electrical connection between the first connection portion 282 and the first terminal portion 286 is also ensured.

Therefore, in the inter-terminal connection structure of the present disclosure, two fastened portions are provided by the two connection portions and the two terminal portions. Here, it is sufficient to provide the structure for measures against electric shock according to the present disclosure to at least one fastened portion, and there may be a fastened portion for which no measures against electric shock are provided. That is, it is sufficient to provide the insulating cover to any one of the two connection portions and the two terminal portions, which are four in total, and to provide the relay portion to the terminal portion or the connection portion fastened to the connection portion or the terminal portion provided with the insulating cover.

Others (1) In the inter-terminal connection structure 10 of Embodiment 1 of the present disclosure, the bolt 84 and the nut 44 are used as the fastening members. However, it would also be acceptable to use the bolt only, and to screw the screw portion. Alternatively, any known fastening member can be adopted.

(2) Besides, in the inter-terminal connection structure 10 of Embodiment 1 of the present disclosure, a pair of crank-shaped bent portions 58, 58 are provided. However, as shown in the inter-terminal connection structures 90, 100 of Variations 1 and 2, only a single crank-shaped bent portion 58 may be provided. Alternatively, any number of crank-shaped bent portions 58 can be provided so as to bend in the same plate thickness direction or in the opposite plate thickness direction. This makes it possible to support various shapes of inter-terminal connection structures.

(3) Furthermore, in the inter-terminal connection structure 10 of Embodiment 1 of the present disclosure, the guide wall 78 is formed so as to project with generally the same dimension as that of the tip part of the screw portion 84A of the bolt 84. However, it would also be possible to adopt a dimension depending on the shape or the like of the battery module side.

(4) In addition, in the inter-terminal connection structure 10 of Embodiment 1 of the present disclosure, the connection-portion-side relay portion 66 includes the cylindrical tube portion 66A projecting from the flange portion 66B, and the terminal portion opening window 50 has an annular shape corresponding to the tube portion 66A, but the present disclosure is not limited to such an embodiment. For example, it would also be acceptable to provide a plurality of projecting portions to one connection-portion-side relay portion 66, and to form a plurality of terminal portion opening windows through which the respective projecting portions are inserted. Specifically, in the connection-portion-side relay portion 66, the projecting end portion of the tube portion 66A projecting from the flange portion 66B may be divided by a slit into a plurality of arcuate projecting portions in the circumferential direction, and the terminal portion opening window 50 may be formed in a shape corresponding to each arcuate projecting portion. Further, the planar shape of the flange portion 66B is not limited to the annular shape, but any shape can be adopted. The shapes of a single or a plurality of projecting portions projecting from the flange portion 66B, and the terminal portion opening window through which the said projecting portions are inserted may adopt any shape such as a rectangular shape.

(5) It is preferable for the connection portion opening window 176 provided to the end portion case 174 constituting the connection portion cover to have such a size as to permit the insertion of the terminal-portion-side relay portion 188 as well as to prevent the insertion of the operator's finger. Besides, any configuration can be adopted as the configuration for applying an insulating covering on the nut 172 located in the upper surface opening portion 80 of the end portion case 174 and the bolt 195 fastened to the nut 172, and in addition to the exemplified insulating covering, for example, a bag-shaped nut cover or the like can be adopted.

KEYS TO SYMBOLS

10 inter-terminal connection structure (Embodiment 1)
12 battery module
12A first battery module
12B second battery module
14 cabinet
14A cabinet
14B cabinet
16 cell
18 peripheral wall
20 upper end portion
22 upper end portion
24 first-terminal-portion-side unit
26 second-terminal-portion-side unit
28 connection terminal
30 housing
32 terminal portion
34 terminal fastening portion
36 through hole
38 bolt insertion hole (terminal portion side)
40 terminal holding portion 42 accommodating portion
44 nut
46 screw hole
48 terminal portion cover (insulating cover)
48A outer peripheral portion
48B inner peripheral portion
49 through hole
50 terminal portion opening window (opening window)
51 insertion hole
52 projecting portion
53 tapered surface
54 conductive component
56 bus bar (conductive member)
58 crank-shaped bent portion
60 connection portion
62 bolt insertion hole
64 positioning concave portion
66 connection-portion-side relay portion (relay portion)
66A tube portion
66B flange portion
68 bolt insertion hole
70 case
70A case main body
70B lid body
72 base wall
74 lower surface opening hole (opening hole)
76 positioning protrusion
78 guide wall
80 upper surface opening portion
84 bolt
84A screw portion
86 first-connection-portion-side unit
88 second-connection-portion-side unit
90 inter-terminal connection structure (Variation 1)
92 junction box
94 conductive component
96 bus bar
98 external device connecting terminal
100 inter-terminal connection structure (Variation 2)
102 inter-terminal connection structure (Variation 3)
104 Allen hex socket bolt
104A head portion
104B screw portion
104C tool fitting hole
106 case
106A case main body
106B lid body
108 projecting portion
108A upper wall
110 inter-terminal connection structure (Variation 4)
112 connection-portion-side relay portion
114 inter-terminal connection structure (Variation 5)
116 connection-portion-side relay portion
118 inter-terminal connection structure (Variation 6)
120 connection-portion-side relay portion
120A constricted portion
122 inter-terminal connection structure (Variation 7)
124 terminal portion cover
124A projecting portion
126 inter-terminal connection structure (Variation 8)
128 terminal portion cover
128A elastic flexible piece
130 terminal portion opening window
130A slit
132 inter-terminal connection structure (Variation 9)
134 terminal portion cover
134B inner peripheral portion
136 terminal portion opening window
138 connection-portion-side relay portion
140 through hole
142 inter-terminal connection structure (Variation 10)
144 terminal portion cover
144B inner peripheral portion
146 terminal portion opening window
148 connection-portion-side relay portion
150 through hole
152 inter-terminal connection structure (Variation 11)
154 battery module
154A electrode
156 bus bar module
156A framework
156B bus bar support protrusion
156C bus bar
158 inter-terminal connection structure (Variation 12)
160 wire harness
162 inter-terminal connection structure (Variation 13)
163 conductive component
164 first-connection-portion-side unit
168 first-terminal-portion-side unit
170 bus bar (conductive member)
171 insulating covering
172 nut
174 end portion case (insulating cover, connection portion cover)
174A case main body (insulating cover, connection portion cover)
174B lid body
175 insulating covering
176 connection portion opening window (opening window)
178 positioning ridge
180 notched portion
182 engaging projection portion
184 engaging framework
186 holder
187 terminal portion
188 terminal-portion-side relay portion (relay portion)
188A tube portion
188B flange portion
190 insulating cover
192 tube portion
194 opening window
195 bolt
196 engaging protrusion
198 engage target portion
200 accommodating recess
202 fixing portion
204 inter-terminal connection structure (Variation 14)
206 conductive component
208 connection-portion-side unit
210 connection blocking portion
212 terminal-portion-side unit
214 bolt
214A screw portion
216 connection-portion-side relay portion (relay portion)
216A tube portion
216B flange portion
218 bolt insertion hole
220 peripheral wall portion
220a side wall
220b side wall
222 rotation shaft
224 lower surface opening portion
226 spring member 228 fitting portion
230 nut
232 terminal portion
234 terminal portion opening window (opening window)
236 bolt insertion hole
238 inner peripheral tube portion
240 side wall
240a side wall
240b side wall
242 accommodating portion
244 inside wall portion
246 outside wall portion
248 gap
250 guide surface
252 fit target portion
254 bolt insertion hole (nut 230)
256 bolt insertion hole
258 connection blocking portion
259 inter-terminal connection structure (Variation 15)
260 lock piece
262 lock framework
264 fitting portion
266 pressing portion
268 linking portion
270 fit target portion
280 inter-terminal connection structure (Variation 16)
282 first connection portion (connection portion)
284 connection portion cover (insulating cover)
286 first terminal portion (terminal portion)
288 terminal-portion-side relay portion (relay portion)
290 junction box
292 battery module
294 second terminal portion (terminal portion)
296 conductive component
298 bus bar (conductive member)
300 second connection portion (connection portion)
302 bolt
304 nut holding portion
306 nut
308 first-connection-portion-side unit
310 first-terminal-portion-side unit
312 end portion case
314 insulating covering
316 case main body
318 lid body
320 peripheral wall
322 upper base wall
324 cylindrical portion
326 pressing projection portion
328 inner peripheral tube portion
330 nut
332 connection portion opening window
334 insulating covering
336 upper case
338 upper base wall
340 insulating cover
342 bolt
344 base wall
346 peripheral wall
348 through hole
350 bus bar
352 tube portion
354 flange portion
a1, a2 first space
b1, b2, b3 second space
c1, c2 gap
c3, c4 displacement permitting gap

The invention claimed is:

1. An inter-terminal connection structure comprising:
a plurality of terminal portions;
a conductive component via which the plurality of terminal portions are electrically connected, the conductive component including
a conductive member including a plurality of connection portions being fastened to the respective terminal portions in a connected state, and
a case having insulation properties while accommodating the conductive member;
a connection portion cover having insulation properties while covering at least one connection portion of the connection portions, the at least one connection portion requiring measures against electric shock;
a connection portion opening window provided to the connection portion cover and partially exposing the at least one connection portion covered by the connection portion cover; and
a terminal-portion-side relay portion provided to the terminal portion fastened to the at least one connection portion covered by the connection portion cover while being inserted through the connection portion opening window to be connected to the at least one connection portion covered by the connection portion cover, wherein the connection portion opening window has such a size that the connection portion opening window permits insertion of the terminal-portion-side relay portion while preventing insertion of a finger of an operator.

2. The inter-terminal connection structure according to claim 1, wherein the conductive member comprises a bus bar, the plurality of connection portions comprise two connection portions that are provided to opposite end portions in a longitudinal direction of the bus bar, and the bus bar includes a crank-shaped bent portion bent in a plate thickness direction of the bus bar.

3. The inter-terminal connection structure according to claim 1, wherein
the plurality of connection portions comprise two connection portions that are provided to opposite end portions in a longitudinal direction of the conductive member, and
the case of the conductive component includes an insulating covering that covers an intermediate portion in the longitudinal direction of the conductive member, and an end portion case that covers at least one of the two connection portions exposed from the insulating covering.

4. The inter-terminal connection structure according to claim 1, wherein
the terminal portion and the at least one connection portion are configured to be fastened by using a bolt,
the connection portion opening window is formed in an annular shape around a bolt insertion hole of the at least one connection portion, and
the terminal-portion-side relay portion has an annular shape and is arranged around a bolt insertion hole of the terminal portion.

5. The inter-terminal connection structure according to claim 1, wherein
the connection portion opening window of annular shape is defined between an inner peripheral portion of the connection portion cover and an outer peripheral portion of the terminal portion cover that is remote radially outward from the inner peripheral portion, and the inner peripheral portion covers an inner peripheral surface of the bolt insertion hole of the terminal portion, while the outer peripheral portion covers a surface of the terminal portion around the bolt insertion hole.

6. The inter-terminal connection structure according to claim 1, wherein
the terminal portion provided with the terminal-portion-side relay portion is covered by an insulating cover,
the insulating cover includes a base wall arranged above the terminal portion, and a peripheral wall projecting upward from an outer peripheral edge portion of the base wall, and
the terminal-portion-side relay portion is inserted through a through hole provided to the base wall and projects to an outside, and the terminal portion is surrounded by the peripheral wall.

7. The inter-terminal connection structure according to claim 6, wherein the peripheral wall of the insulating cover surrounding the terminal portion is a wall higher than the terminal-portion-side relay portion.

8. The inter-terminal connection structure according to claim 7, wherein displacement of the conductive component is limited by the peripheral wall being in contact with a member provided on a side of the at least one connection portion.

9. The inter-terminal connection structure according to claim 6, wherein the terminal-portion-side relay portion and the terminal portion are separately formed, and the terminal-portion-side relay portion is held between the base wall of the insulating cover and the terminal portion.

10. The inter-terminal connection structure according to claim 9, wherein
the terminal-portion-side relay portion includes a tube portion and a flange portion projecting to an outer peripheral side from one end portion of the tube portion, and
the terminal-portion-side relay portion is held by the insulating cover by the tube portion of the terminal-portion-side relay portion being inserted through the through hole provided to the base wall of the insulating cover and projecting to the outside and by the flange portion of the terminal-portion-side relay portion being engaged with a peripheral edge of the through hole from an inside of the base wall.

11. The inter-terminal connection structure according to claim 1, wherein the terminal portion and the at least one connection portion are configured to be fastened by using a bolt, and the connection portion cover includes an inner peripheral tube portion covering an inner peripheral surface of a bolt insertion hole provided to the at least one connection portion.

12. The inter-terminal connection structure according to claim 11, wherein the inner peripheral tube portion of the at least one connection portion cover is integrated with another part of the connection portion cover.

13. The inter-terminal connection structure according to claim 1, wherein
the terminal portion and the at least one connection portion are configured to be fastened by using a bolt and a nut,
the nut having an insulating covering thereon is accommodated in the case of the conductive component, the nut being exposed to an outside through an upper surface opening portion provided to an upper surface of the case, and
a maximum outside diameter dimension of the nut including the insulating covering is larger than an inside diameter dimension of the upper surface opening portion of the case.

14. The inter-terminal connection structure according to claim 13, wherein
a tip part of the bolt fastened to the nut has an insulating covering thereon and is exposed to the outside through the upper surface opening portion of the case,
the connection portion cover comprises a base wall of the case, and the connection portion opening window penetrates the base wall, and
the bolt and the terminal-portion-side relay portion are arranged in the terminal portion.

15. The inter-terminal connection structure according to claim 1, wherein
the terminal portion and the at least one connection portion are configured to be fastened by using a bolt,
a bolt insertion hole provided to the at least one connection portion includes a first space permitting displacement of the bolt in a predetermined direction,
the case of the conductive component includes a second space permitting displacement of the at least one connection portion with respect to the case in the predetermined direction, and
in the case, the at least one connection portion is displaceable with respect to the bolt in the predetermined direction, the bolt being positioned with respect to the case.

16. The inter-terminal connection structure according to claim 15, wherein
the plurality of connection portions comprises two connection portions that are provided to opposite end portions in a longitudinal direction of the conductive member,
the case of the conductive component includes an insulating covering that covers an intermediate portion in the longitudinal direction of the conductive member, and an end portion case that covers at least one of the two connection portions exposed from the insulating covering,
the end portion case includes the second space extending in the predetermined direction, and the end portion case is attached to the conductive member displaceably in the predetermined direction, and
the bolt insertion hole of the connection portion at least one of the two connection portions includes the first space extending in the predetermined direction.

* * * * *